United States Patent [19]

Wakabayashi et al.

[11] Patent Number: 5,365,292
[45] Date of Patent: Nov. 15, 1994

[54] INDICATOR DEVICE FOR CAMERA

[75] Inventors: Hiroshi Wakabayashi, Yokohama; Daiki Tsukakara, Hiratuka; Yuji Katano, Kawasaki; Hitoshi Aoki, Tokyo, all of Japan

[73] Assignee: Nikon Corporation, Tokyo, Japan

[21] Appl. No.: 11,851

[22] Filed: Feb. 1, 1993

[30] Foreign Application Priority Data

| Feb. 5, 1992 | [JP] | Japan | 4-020139 |
| Feb. 24, 1992 | [JP] | Japan | 4-036486 |
| Feb. 24, 1992 | [JP] | Japan | 4-036487 |
| Mar. 12, 1992 | [JP] | Japan | 4-012331[U] |
| May 28, 1992 | [JP] | Japan | 4-137225 |
| May 28, 1992 | [JP] | Japan | 4-137226 |
| Jun. 2, 1992 | [JP] | Japan | 4-141414 |
| Jun. 15, 1992 | [JP] | Japan | 4-155327 |

[51] Int. Cl.$^5$ .............. G03B 17/18; G03B 17/24; G03B 17/36; G03B 29/00
[52] U.S. Cl. .............. 354/76; 354/106; 354/217; 354/289.1
[58] Field of Search ........ 354/289.1, 289.11, 289.12, 354/105, 106, 465, 471, 474, 217, 75, 76, 268; 368/113, 295

[56] References Cited

U.S. PATENT DOCUMENTS

| 2,552,275 | 5/1951 | Harvey | 354/289.1 X |
| 2,930,300 | 3/1960 | Danders et al. | 354/289.1 X |
| 3,512,353 | 5/1970 | Blum | 368/295 X |
| 5,195,062 | 3/1993 | Sase et al. | 368/113 X |
| 5,218,399 | 6/1993 | Izumi et al. | 354/471 |

Primary Examiner—W. B. Perkey
Attorney, Agent, or Firm—Oliff & Berridge

[57] ABSTRACT

An indicator device for a camera for displaying the value of an item of information related to photographic conditions includes an indicator means, which includes a scale plate with a central point, a number of index marks being inscribed on the scale plate around the perimeter of a circle which has the central point as its center and the angular positions of the index marks relative to the central point being a subset of the angular positions derived by subdividing the circumference of the circle into sixty equal divisions, and an indicating pointer which is rotatable around the central point against the scale plate. The indicating pointer is rotationally driven against the scale plate by a drive means such as a stepper motor.

Thereby, by intuitive analogy with the face of a clock, a user can perceive the value of the item of information from the angular position of the pointer relative to the index marks. Optionally several indicating pointers may be provided and may be driven by the drive means so as together to display the value of a single item of information related to photographic conditions by their angular positions relative to the index marks, considered together.

68 Claims, 74 Drawing Sheets

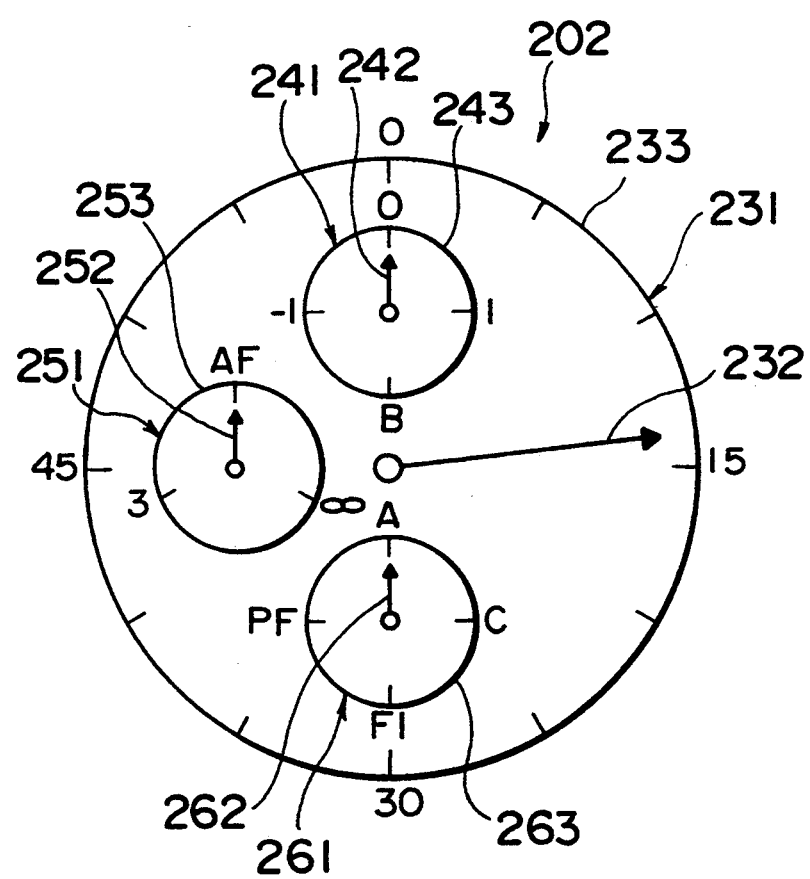

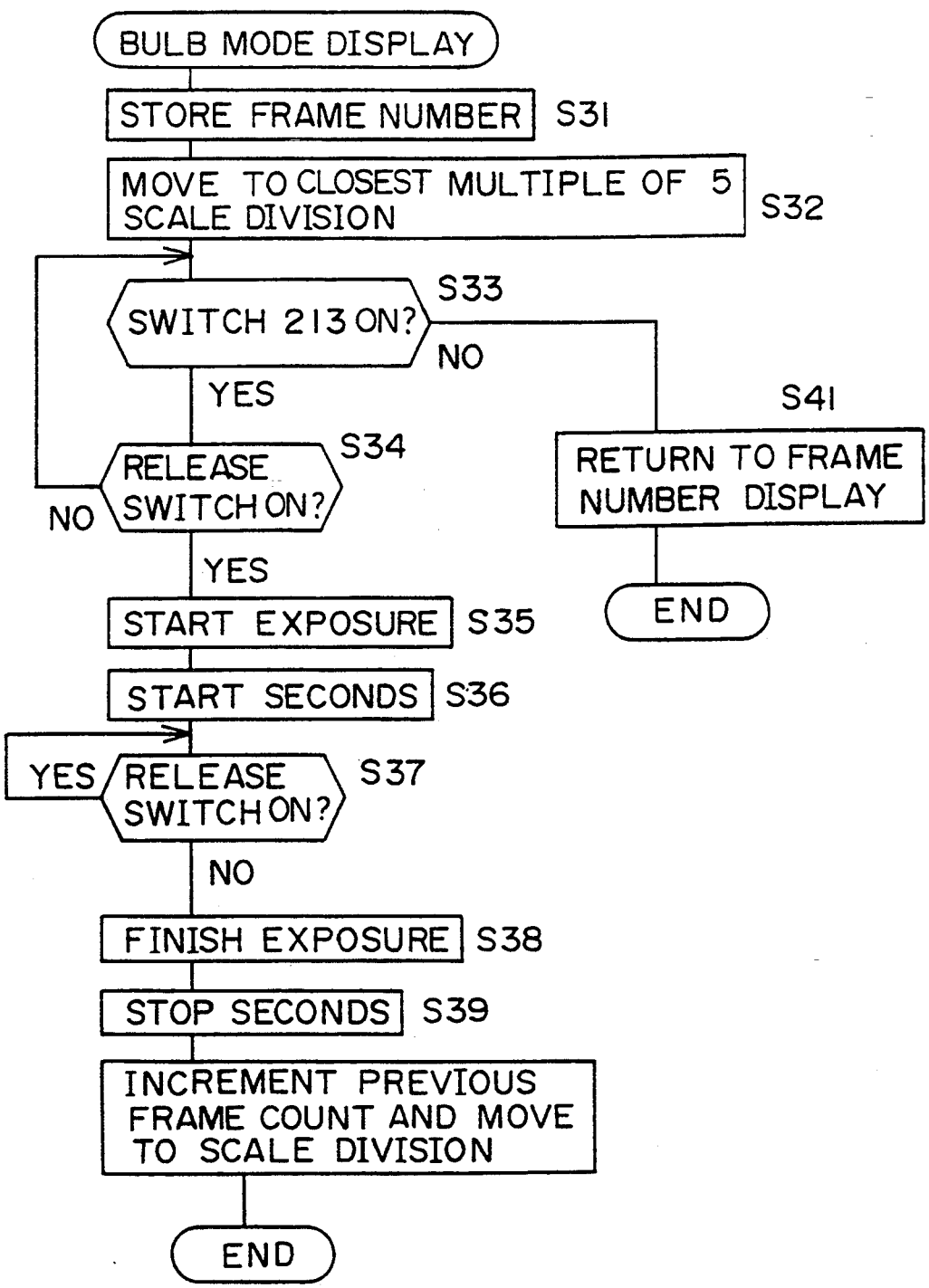

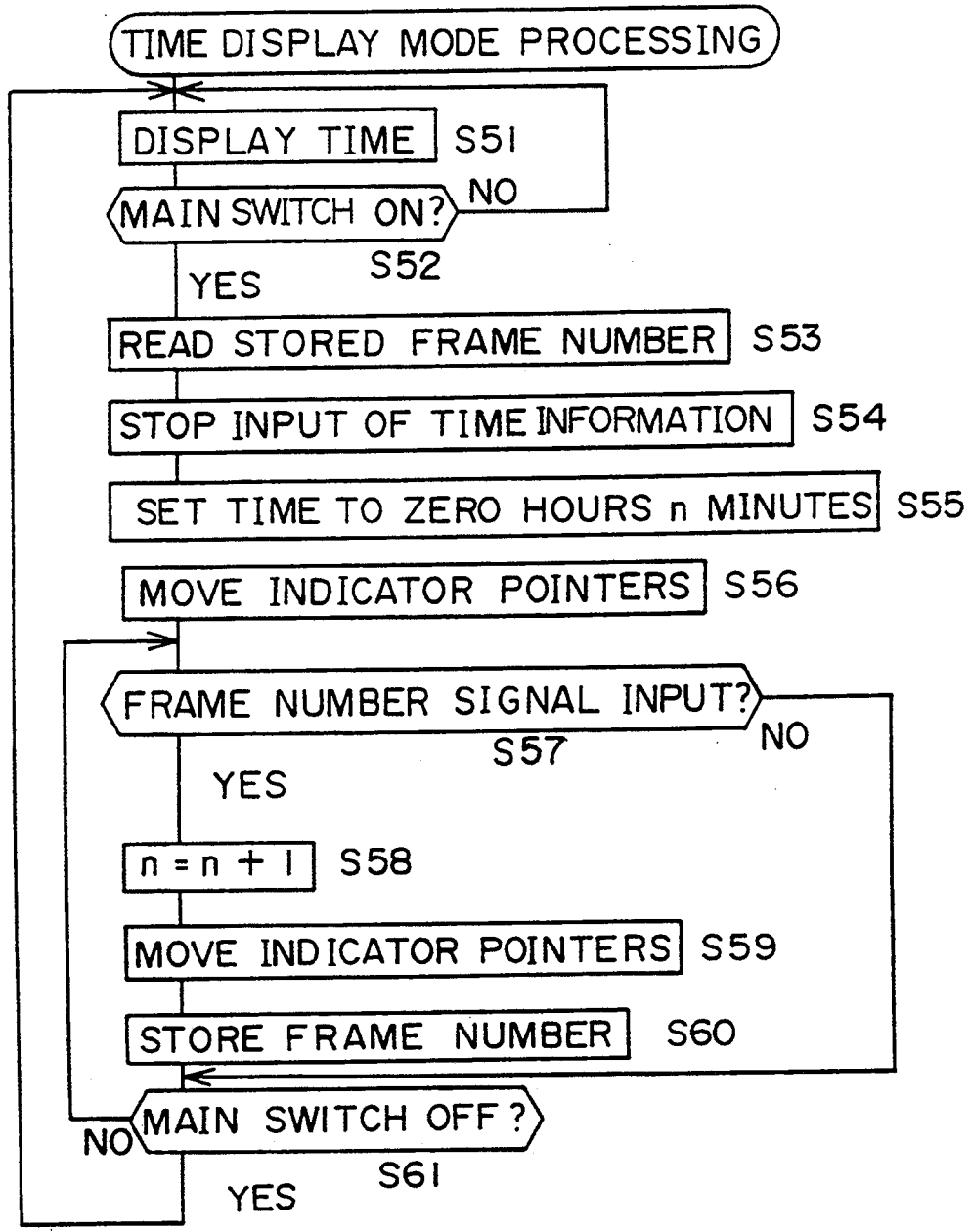

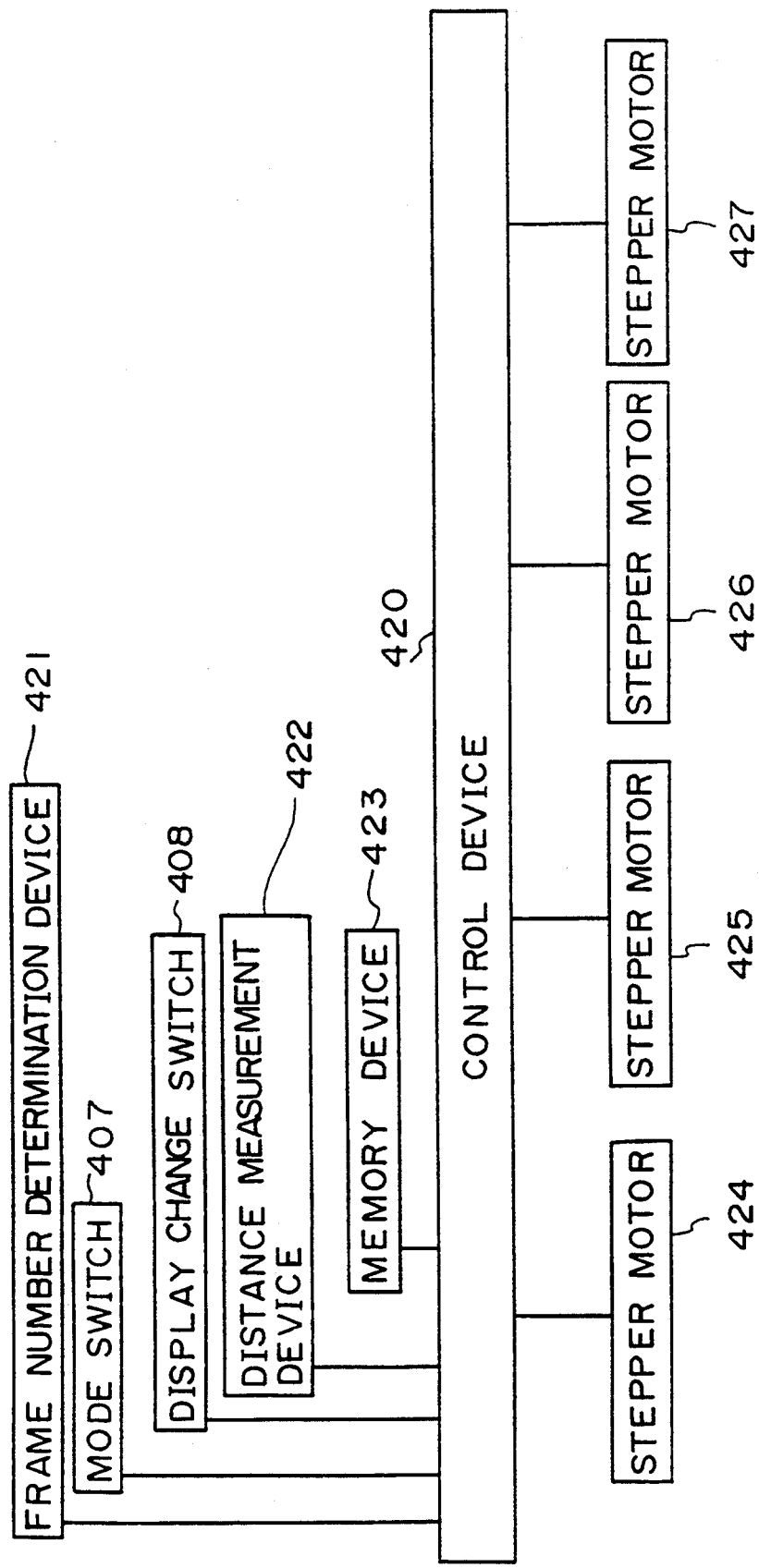

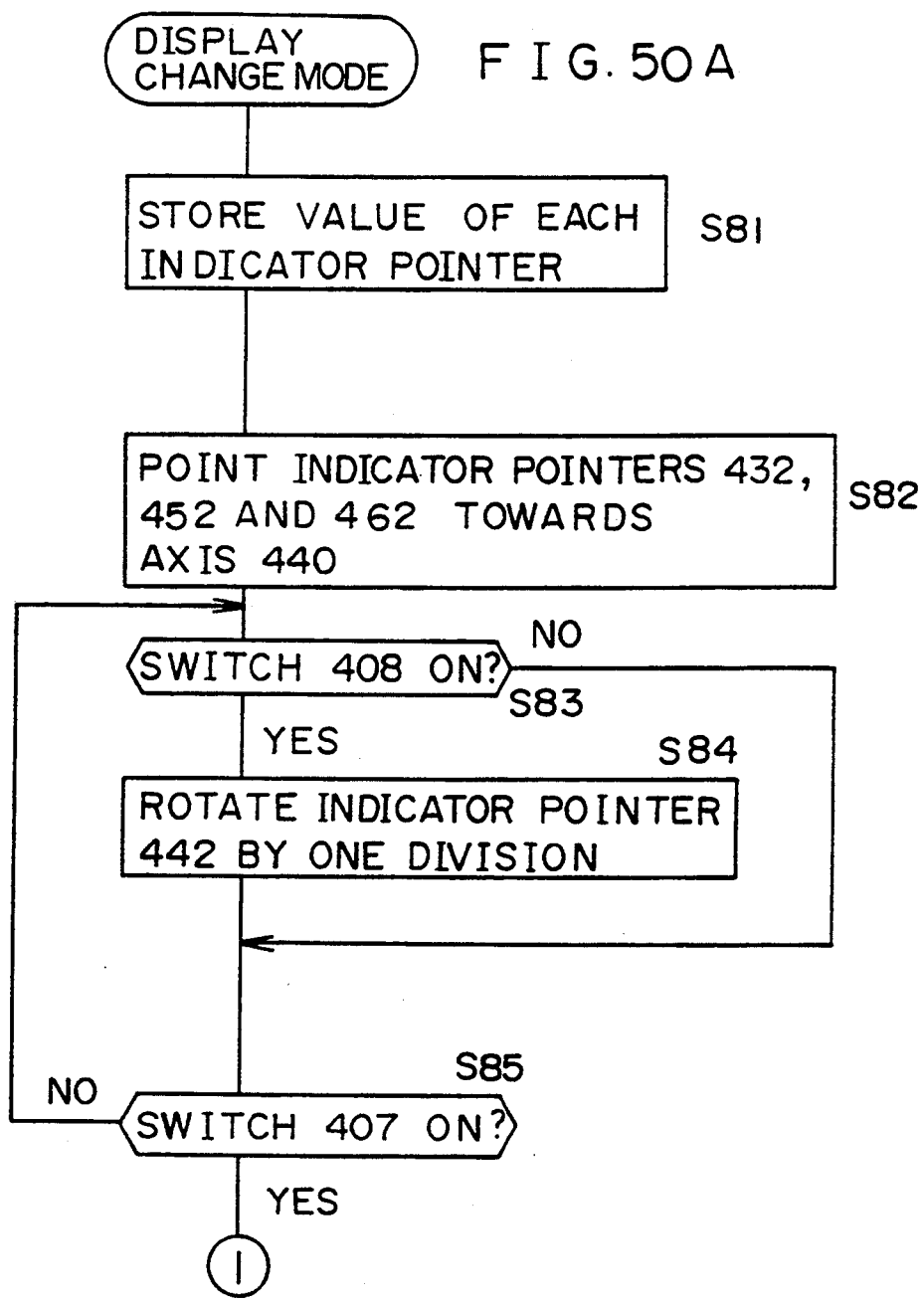

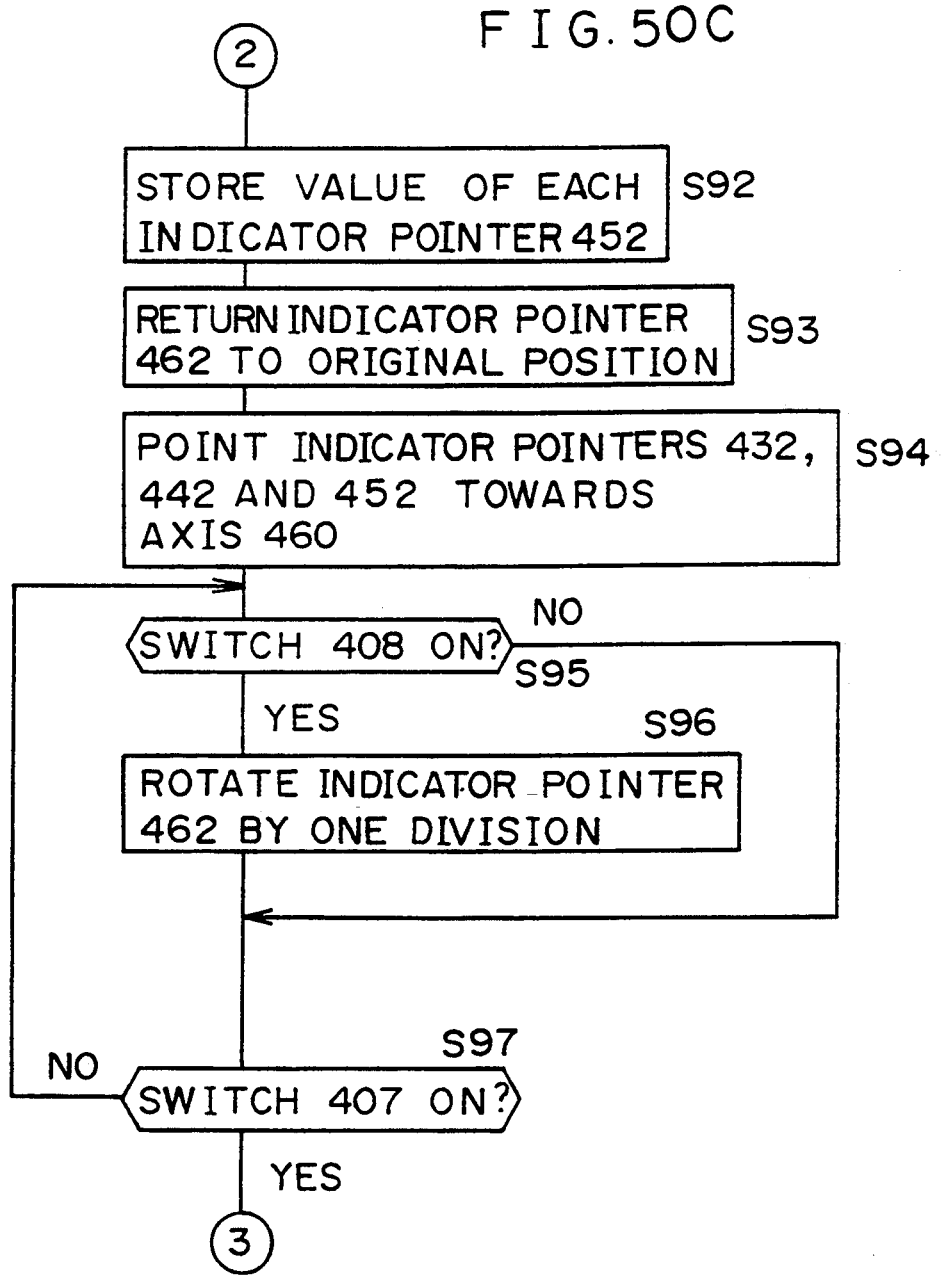

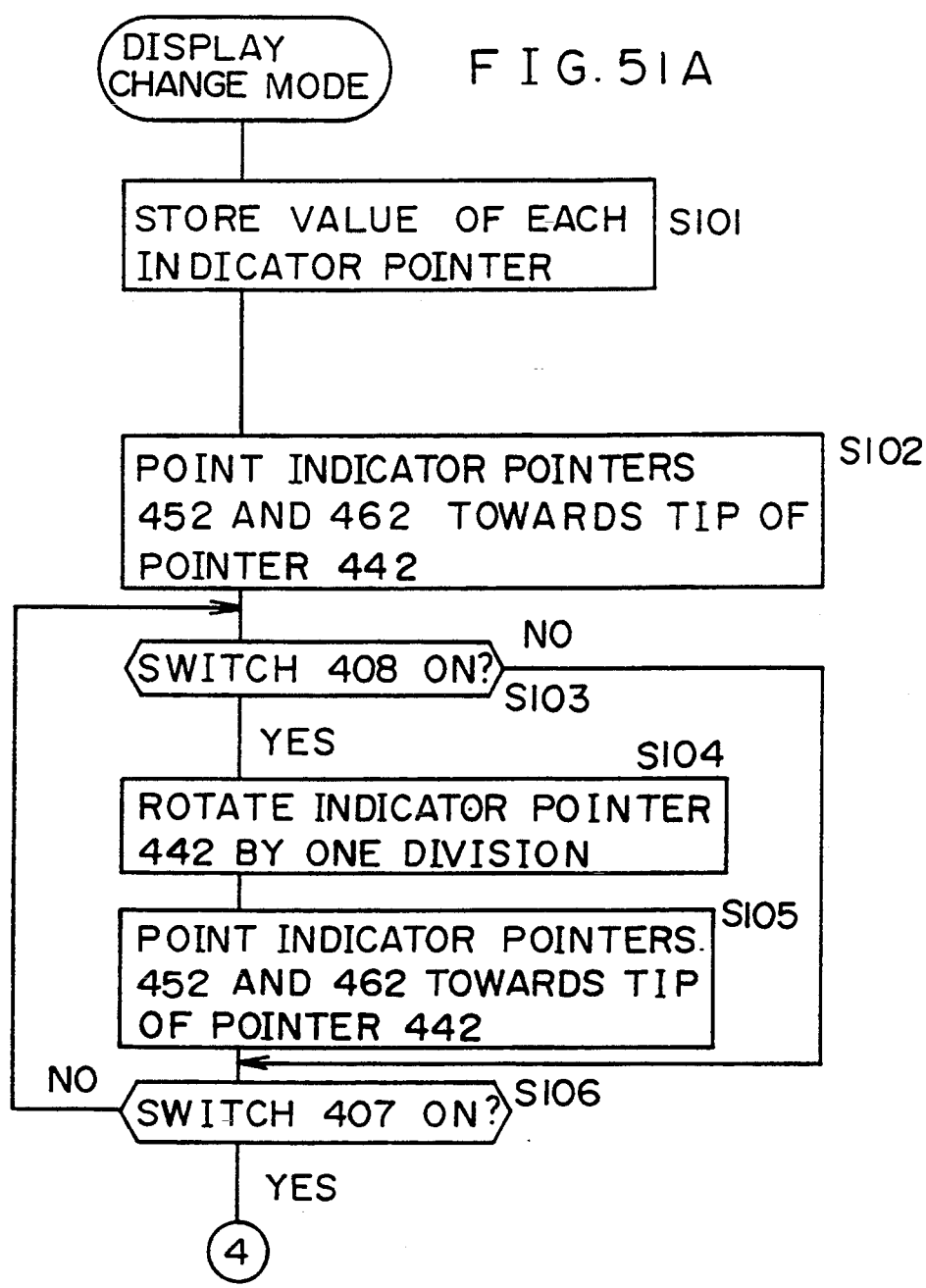

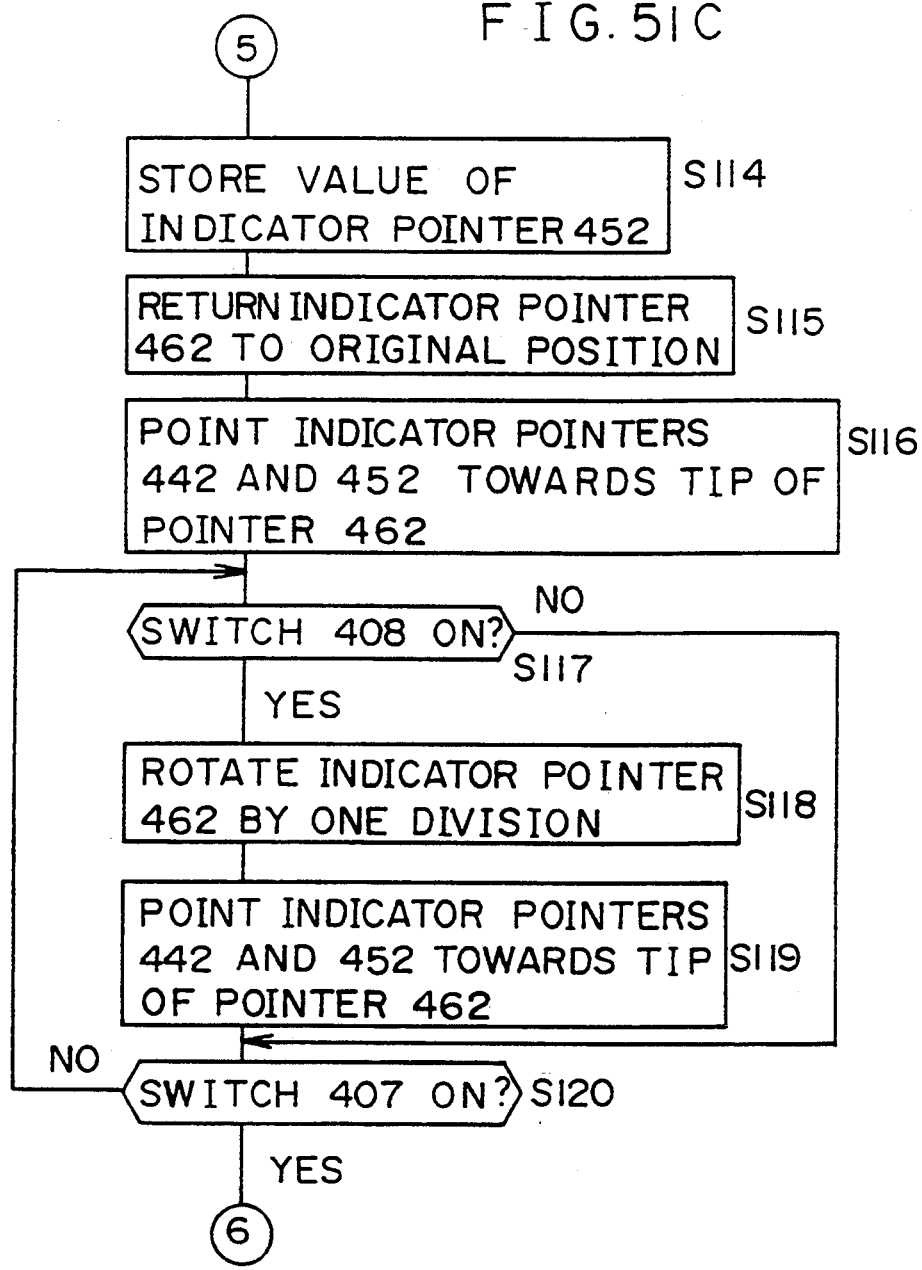

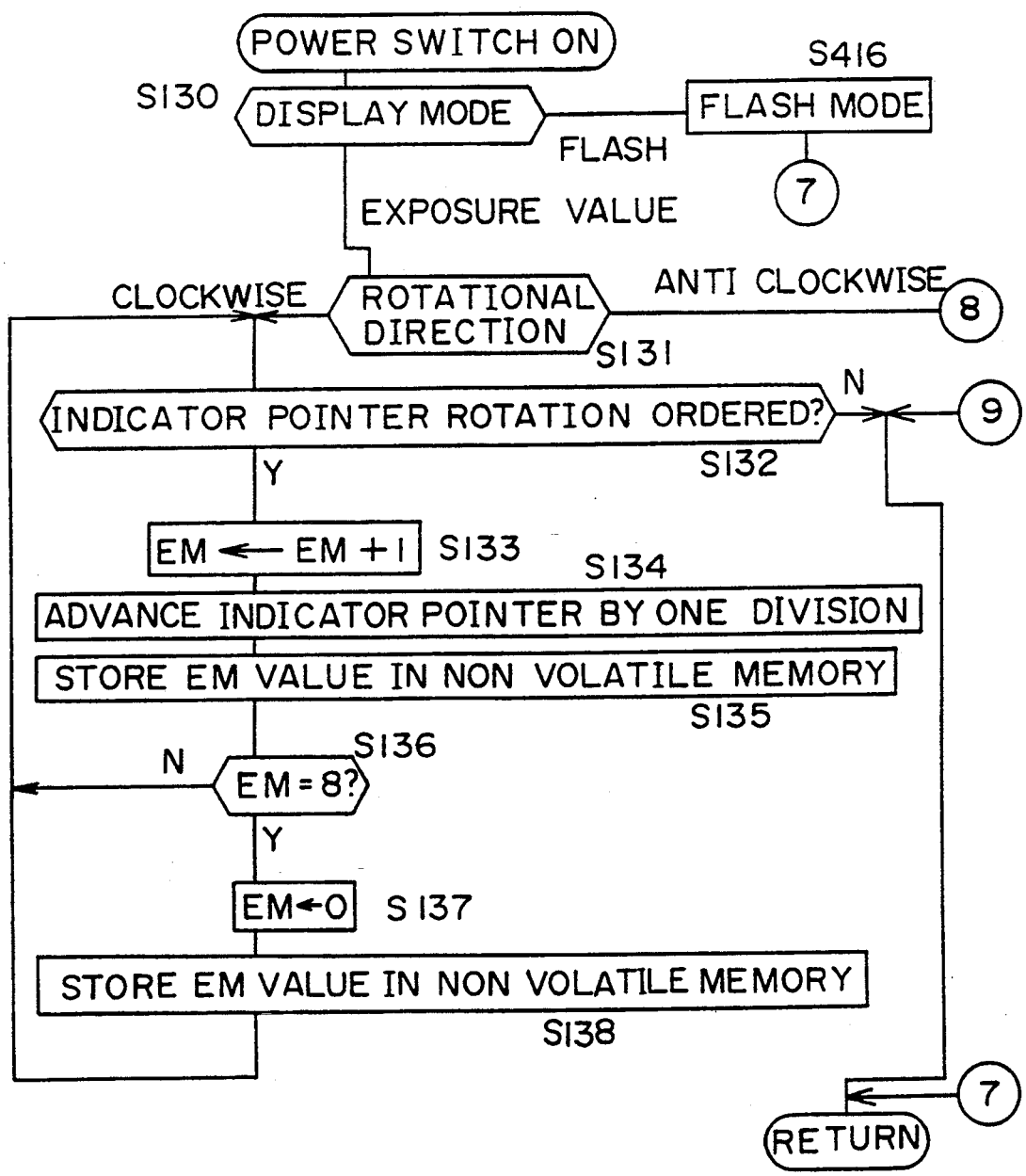

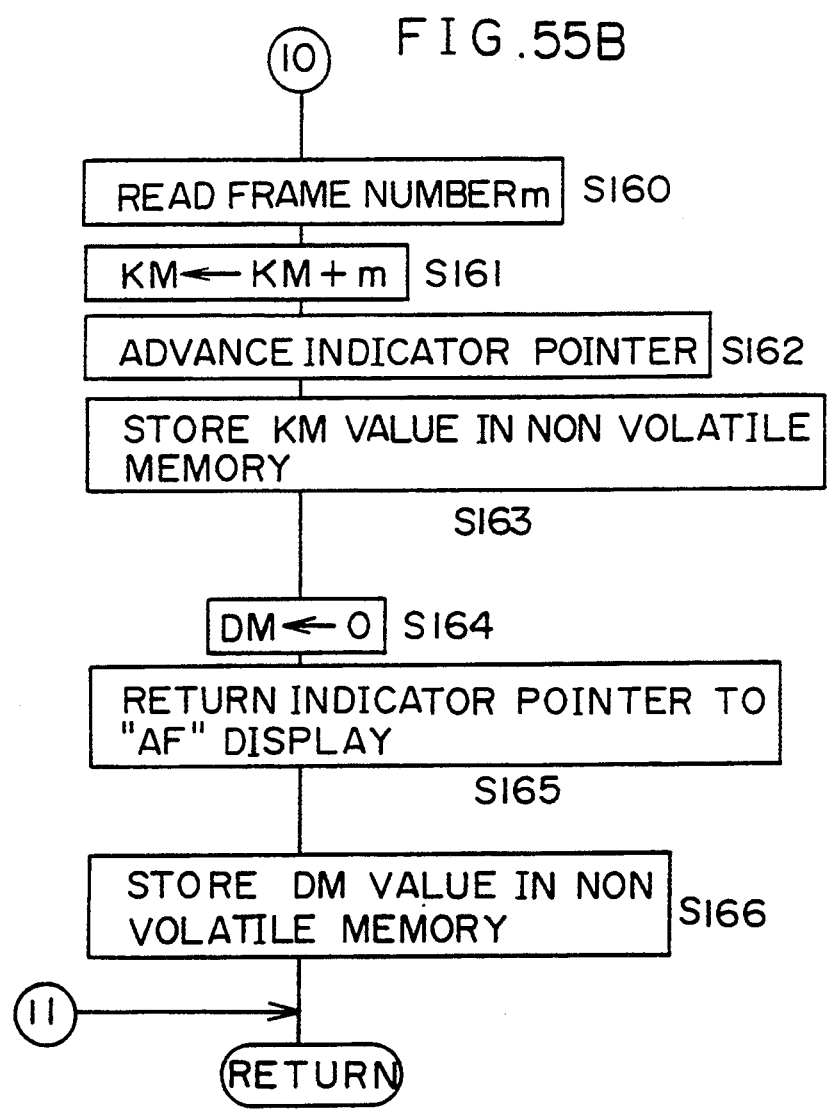

INDICATOR DEVICE FOR CAMERA

BACKGROUND OF THE INVENTION

1. Field of the Invention

The present invention relates to an indicator device for a camera on which various kinds of information related to conditions for photography can be displayed, and more specifically relates to an indicator device for a camera on which, by a rotatable pointer being moved against a plate inscribed with a graduated scale, various kinds of information related to conditions for photography can be displayed.

2. Related Background Art

There is already known, per se, a dial type rotating indicator device for a camera, for displaying the values of various information related to conditions for photography such as shutter speed, aperture (F-stop), etc., and for setting these parameters according to the displayed values thereof. Further, an indicator device for a camera is also per se well known, which displays various information related to conditions for photography such as shutter speed, aperture (F-stop), etc. on a liquid crystal type display.

However, if a display device of the rotatable dial type or of the liquid crystal type is mounted on the upper surface or on the rear surface of a camera, then since the area of these surfaces is limited it is necessary to utilize a small size display device, and the problem arises that because the characters on the display are small it becomes difficult to read out the information which is being displayed.

In order to solve this problem relating to a display device for a camera, it has been conceived of in copending U.S. patent application Ser. No. 07/920,674, which is assigned to the same assignee as is the present application and which it is not intended hereby to admit as prior art to the present application except to the extent in any case mandated by applicable law, to display various information relating to conditions for photography using an indicator device of the type used in a clock or watch, i.e. using an indicator device comprising a plate with a graduated scale and a pointer which is rotationally moved against this scale by a stepper motor. A clock type indicator device of this sort can be produced which is small in size and light in weight, and thereby a small sized and reasonably priced indicator device for a camera can be provided.

However, a requirement for any indicator device of this general type is that it should be calibrated: in other words, that the scale should be graduated with a certain number of inscribed index marks, against which symbols should be written to make clear the values which they denote. The problem arises with an indicator device for a camera, that since the space available is inevitably very restricted it is virtually impossible to write the appropriate symbol against every index mark, without making the writing so small that it is very hard to see. Accordingly, some of the index marks are almost constrained to remain without explanatory symbols, and this means that difficulty may arise for the user of the camera in trying to interpret the significance of these index marks.

SUMMARY OF THE INVENTION

The object of the present invention is to provide a small sized and reasonably priced indicator device for a camera, which is easy to use.

In order to attain this object, and others, the present invention proposes an indicator device for a camera, for displaying information related to conditions for photography, comprising an indicator means, comprising a scale plate with a central point, a plurality of index marks being inscribed on said scale plate substantially around the perimeter of a circle which has said central point as its center, with the angular positions of said index marks relative to said central point being a subset of the angular positions derived by subdividing the circumference of said circle into sixty equal divisions, and an indicating pointer which is rotatable around said central point against said scale plate; and a means for rotationally driving said indicating pointer against said scale plate, so as to indicate an angular position relative to said index marks in order to display the value of an item of information related to conditions for photography. Because with this indicator device the index marks on the scale plate, which is used for displaying the information related to photographic conditions, are arranged at positions which are a subset of the positions corresponding to sixty minutes on the face of an normal analog type clock which is very familiar to everyone, thereby the user of the camera, by intuitive analogy with a clock face, can apprehend the value corresponding to each index mark of the item of information relating to photographic conditions which is displayed by the indicator, even if said index mark is not actually labelled with characters explicitly explaining its particular significance. Accordingly an indicator device for a camera is made available, which is small, compact, and yet easy to use.

According to another aspect of the present invention, the above and other objects are achieved by an indicator device for a camera, comprising a drive means, for displaying information related to conditions for photography, comprising: an indicator means comprising an indicator pointer and a scale plate, said indicator means displaying said information related to conditions for photography by the position of said indicating pointer which is rotationally driven against said scale plate by said drive means; an operation member which when operated by a user of the camera puts the camera into the condition ready to shoot a photograph; and a drive control means which drives said indicator pointer so as to display said information related to conditions for photography, when by the operation of said operation member the camera is put into the condition ready to take a photograph, and drives said indicator pointer according to the passage of time when the camera is not put into the condition ready to take a photograph. This indicator device for a camera thus displays the information relating to photography when photography is taking place, while on the other hand when photography is not taking place it displays either the time of day or elapsed time like a stopwatch; and thereby it is always possible to tell by ocular inspection that this indicator device is operating properly.

According to another aspect of the present invention, the above and other objects are achieved by an indicator device for a camera, comprising a drive means, for displaying information related to conditions for photography, comprising a plurality of indicator means, each comprising an indicator pointer and a scale plate, and each of said indicator means displaying information related to conditions for photography by the position of its said indicating pointer which is rotationally driven against its said scale plate by said drive means, a first operation member for selection, from said plurality of indicator means, of a one thereof for which the value of the information which it displays related to conditions for photography should be changed, a selection means which selects a one from said plurality of indicator means in a predetermined order, according to the operation of said first control member, a second operation member for changing the value of the information displayed by said indicator means selected by said selection means, and a drive control means which, after it has moved the indicator pointer of said indicator means selected by said selection means in a manner different from when displaying said information related to conditions for photography, drives said indicator pointer according to the operation of said second operation member, when said second operation member is operated. Accordingly, with this indicator device for a camera, it is easy for the user of the camera to distinguish which one from the plurality of indicator means is the one for which the value of the information which it displays related to conditions for photography should be changed, and also the information displayed by each one of the plurality of indicator means can easily and simply be altered by operation of the common first and second operation members.

According to another aspect of the present invention, the above and other objects are achieved by an indicator device for a camera, comprising a drive means, for displaying information related to conditions for photography, comprising a plurality of indicator means, each comprising an indicator pointer and a scale plate, and each of said indicator means displaying information related to conditions for photography by the position of its said indicating pointer which is rotationally driven against its said scale plate by said drive means, a first operation member for selection, from said plurality of indicator means, of a one thereof for which the value of the information which it displays related to conditions for photography should be changed, a selection means which selects a one from said plurality of indicator means in a predetermined order, according to the operation of said first control member, a second operation member for changing the value of the information displayed by said indicator means selected by said selection means; and a drive control means which, after it has moved the indicator pointers of the indicator means other than said indicator means selected by said selection means in predetermined directions which do not depend upon the current contents of the parameters displayed on them, drives said indicator pointer according to the operation of said second operation member, when said second operation member is operated. According to this construction, it is easy for the user of the camera to distinguish which one from the plurality of indicator means is the one for which the value of the information which it displays related to conditions for photography should be changed, and also the information displayed by each one of the plurality of indicator means can easily and simply be altered by operation of the common first and second operation members.

According to yet another aspect of the present invention, the above and other objects are achieved by an indicator device for a camera, for displaying information related to conditions for photography, comprising a scale plate, a first drive means and a second drive means, a first display means, comprising a first indicating pointer which is rotationally driven over a first portion of said scale plate by said first drive means so as to display information related to conditions for photography by pointing at a first set of index marks inscribed on said scale plate, and at least a second display means, comprising a second indicating pointer which is rotationally driven by said second drive means over a second portion of said scale plate included in said first portion thereof so as to display information related to conditions for photography by pointing at a second set of index marks inscribed on said scale plate, wherein each of said second set of index marks does not lie on the straight line joining the rotational center of said first pointer and the rotational center of said second pointer. According to this construction, with this indicator device, there is no risk of the first indicator pointer obscuring the indication of the second display means, since said first indicator pointer can never lie over the second indicator pointer, even when it lies over the rotational center thereof, no matter what be the angular position of said second indicator pointer.

According to yet another aspect of the present invention, the above and other objects are achieved by an indicator device for a camera, for displaying information related to conditions for photography, comprising an indicator means, comprising an indicator pointer, a scale plate, and a stepper motor which rotationally drives said indicating pointer over said scale plate so as to display said information related to conditions for photography by the position of said indicating pointer against said scale plate, a battery electrical power source for providing activating electrical power for said stepper motor, a setting means which sets a rotational position for said stepper motor, a stepper motor control means which drive controls said stepper motor so as to rotationally position it to the rotational position set on said setting means, and a storage means which stores the amount of operation of said stepper motor from a standard rotational position, said storage means not losing said amount of operation even if not supplied with electrical power from said battery electrical power source. According to this construction, even if the stepper motor position becomes disturbed due to the battery electrical power source dropping out of the camera or the like, when said battery electrical power source is again replaced into the camera, the stored value of the amount of operation of said stepper motor is read out from the storage means, so that the value displayed on this indicator device just before the battery fell out can be again displayed.

According to yet another aspect of the present invention, the above and other objects are achieved by, in a camera comprising a photographic data overprinting device which overprints according to a certain format data relating to data and time of taking a photograph onto a film loaded into said camera, an indicator device for displaying information related to conditions for photography, comprising a first display portion which digitally displays said photographic data in the same format, and a second display portion, comprising a scale plate, an indicating pointer, and a means for rotationally driving said indicating pointer against said scale plate so as to display information related to conditions for photography other than said photographic data. According to this construction, with this indicator device, by inspecting the first display portion, it is possible to check the format of the time point information which is being overprinted on the film by the photographic time point overprinting device.

According to yet another aspect of the present invention, the above and other objects are achieved by an indicator device for a camera, comprising a drive means, a plate on which a plurality of characters representing film frame numbers are disposed in a serial manner, a first film frame number determination device which determines the number of frames of a film loaded into said camera that have been shot, a first indicator pointer, driven by said drive means, which points at a number on said plate corresponding to the number of frames shot as detected by said first film frame number determination device, a second film frame number determination device which determines the number of frames of said film which remain to be shot, and a second indicator pointer, driven by said drive means, which points at a number on said plate corresponding to the number of film frames which remain to be shot as detected by said second film frame number determination device. According to this construction, with this indicator device, it is easily possible to check not only how many frames of film have been shot, but how many remain available for shooting on the film currently loaded into the camera.

According to yet another aspect of the present invention, the above and other objects are achieved by an indicator device for a camera, comprising a drive means, a plate on which a plurality of characters representing film frame numbers are disposed around a circular path, an indicator pointer driven by said drive means to rotate about a rotational axis substantially passing through the center of said circular path, which points at a number on said plate corresponding to the number of film frames shot, and a movable indicator member, which can be manually moved so as to indicate any one of a set of numbers on said plate. According to this construction, with this indicator device, the user of the camera can easily set any number as the maximum number of frames on the film which should be shot, and the number of film frames remaining until this maximum number is reached can be easily perceived by inspection of the position of the indicator pointer relative to the movable indicator member.

BRIEF DESCRIPTION OF THE DRAWINGS

FIG. 21 is an enlarged view of said indicator device according to the second preferred embodiment, incorporated in the camera shown in FIG. 20;

FIG. 25 is a flow chart showing control program operation for displaying bulb mode;

FIG. 31 is a flow chart showing the operation of a control program for controlling in the time of day display mode the indicator device of FIG. 30A and FIG. 30B;

FIG. 49 is a block diagram showing the construction of a camera equipped with an indicator device according to the fourth preferred embodiment of the present invention;

FIGS. 50A, 50B, 50C and 50D are flow charts showing the operation of a control program which is executed by a control circuit incorporating a microcomputer, comprised in the FIG. 49 camera, during display change mode;

FIGS. 51A, 51B, 51C and 51D are flow charts showing the operation of another control program which is executed by said control circuit during display change mode, for realizing the variant of the fourth preferred embodiment whose operation is shown in FIGS. 47 and 48;

FIGS. 54A and 54B are flow charts showing the operation of a control program which is executed by a control circuit incorporating a microcomputer, comprised in the FIG. 52 camera, for mode setting and for the display process;

FIGS. 55A and 55B are flow charts showing the operation of a control program for display of photographic distance and number of frames;

DETAILED DESCRIPTION OF THE PREFERRED EMBODIMENTS

Preferred Embodiment 1

A first preferred embodiment of the present invention will now be described with reference to FIGS. 1 through 18.

Figure 1:
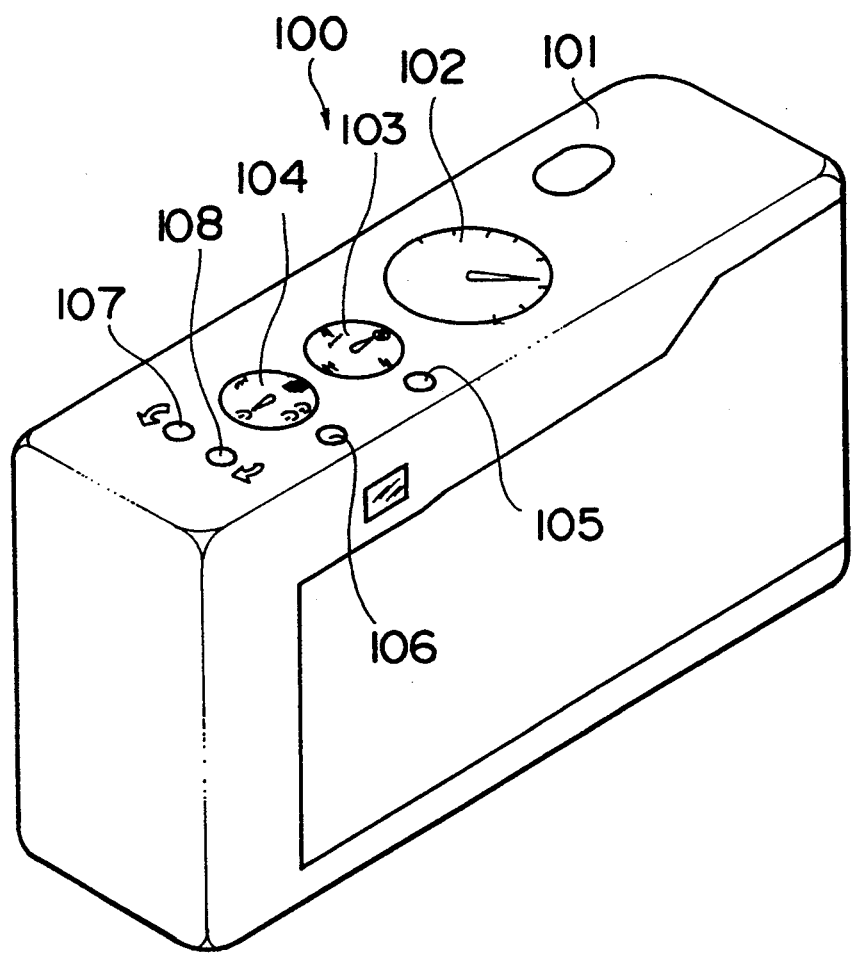
FIG. 1 is a perspective view as seen from the rear of a camera equipped with an indicator device according to the first preferred embodiment of the present invention.

FIG. 1 is a perspective view, as seen from the rear, of a camera equipped with an indicator device according to the first preferred embodiment of the present invention, which is disposed on the upper surface of the camera body 101. This indicator device is designated as a whole as 100, and it comprises an indicator device 102 which serves as a frame number indicator unit for indicating the number of exposures taken, an indicator device 103 for flash mode, an indicator device 104 for self timer mode, and a plurality of operating buttons 105 through 108 for changing the values shown on the flash mode indicator device 103 and the self timer mode indicator device 104, as will be explained hereinafter.

Figure 2:
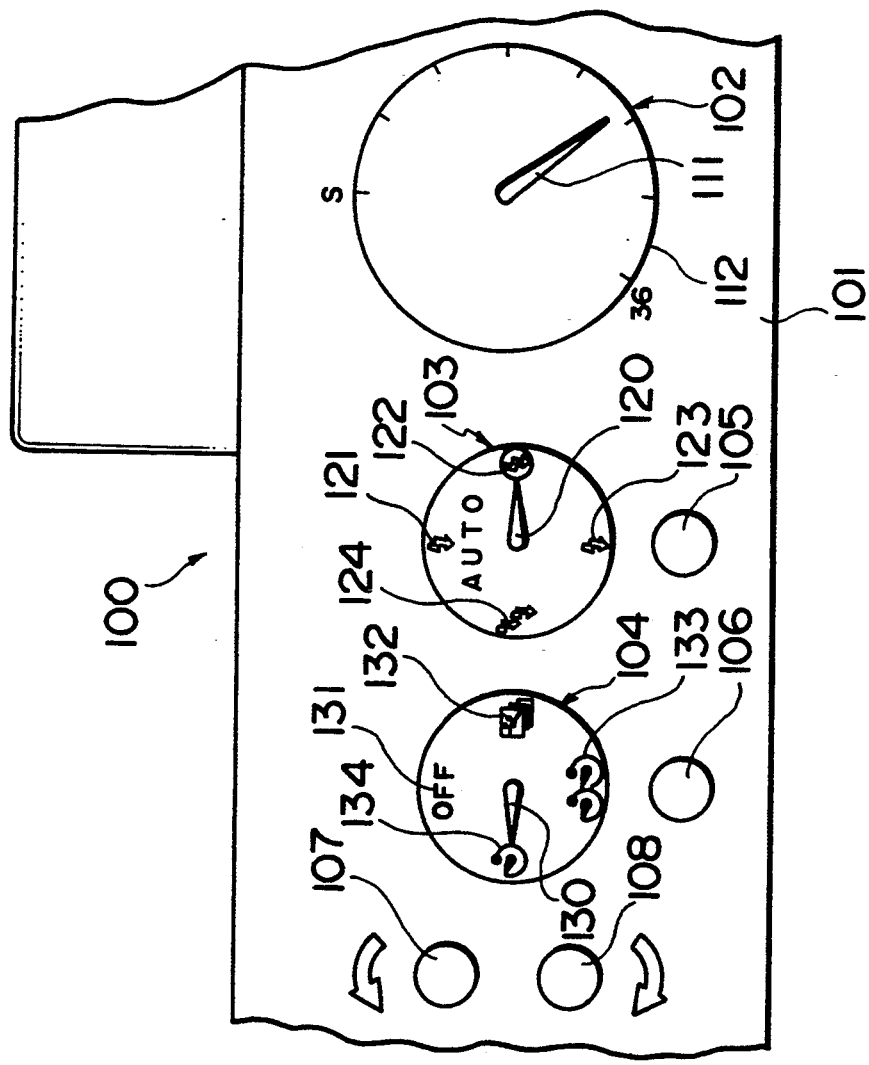
FIG. 2 is an enlarged plan view of the upper surface of the camera shown in FIG. 1.

FIG. 2 is an enlarged plan view of the upper surface of the camera shown in FIG. 1.

A typical indicator device for a camera of the type described in the preamble to this specification has employed a plate inscribed with a graduated scale of which the circumference has been marked off with a number of equally spaced divisions corresponding to the possible range of values of the item of information (parameter) related to conditions for photography the value of which is required to be displayed, and at least some of said division marks have been marked with appropriate legends showing the corresponding value of the parameter.

Figure 18:
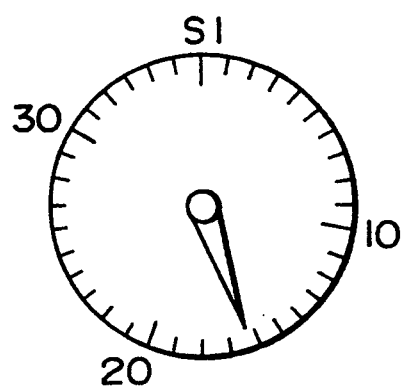
FIG. 18 is a plan view of a prior art type of indicator device for displaying the number of photographic frames so far taken on a film.

For example, in the case of the prior art type frame number indicator unit shown in FIG. 18, a plate is used inscribed with a graduated scale which divides its circumference into 36 equally spaced divisions, and the numerals "10", "20", and "30" are inscribed at appropriate points around the circumference of said inscribed plate in order to indicate the number of frames shot, so that thereby the current frame number to which the film has been wound is displayed. With an indicator device for a camera of this type, when reading out a current frame number between "10" and "20" for example, the appropriate numeral "11" or "12" etc. through "19" must be mentally supplemented, based upon counting up from the numeral "10" if it is visible or down from the numeral "20" if it is visible, and following the graduated scale. On the other hand, if in order to make it easier to read out the current frame number each of the divisions is marked with its number, or even if every second division is so marked, inevitably the figures must be written so small that they are hard to read.

On the other hand, the indicator device for a camera according to the present invention uses a graduated scale plate, and, among a total of sixty equal divisions into which the circumference of this graduated scale plate may be conceptually divided, only certain ones are marked with index marks, according to the information related to conditions for photography which is to be displayed. Thus the conceptual scale interval (1/60 of a full turn) is the same as the scale interval on an analog clock face which is pointed at by a rotating pointer, and therefore, even though not every one of the sixty intervals is individually marked with its numeral or is even indicated by a mark, because the layout is the same as on a clock face and is therefore very familiar to any user of the camera from a very early age, it is possible easily to read out the value designated by the rotating pointer.

Now the details of this first preferred embodiment of the present invention will be described. The frame number indicator device 102 comprises an indicating pointer 111 and a graduated scale plate 112 against which said indicating pointer 111 moves and on which it indicates the current frame number (the number in sequence of the next film frame to be shot). As the film in a film cartridge, loaded in the camera but not particularly shown in the figures, is advanced, the indicating pointer 111 is rotationally moved against the graduated scale plate 112 by a stepper motor (also not shown) synchronously with the advancement of said film. On the graduated scale plate 112 there is inscribed the character "S" at the position standard for 12 o'clock on a clock face, i.e. at the top central position. Further, conceptually dividing the circumference of the graduated scale plate 112 into sixty equal parts which thus correspond to the positions of the minutes with reference to a clock face, index marks are inscribed at the subset of these positions corresponding to 5, 10, 15, 20, 25, 30, and 36 minutes, and also the characters "36" are written at the position corresponding to 36 minutes, thus designating the final shootable frame of the film.

When a new film cartridge is loaded into the camera and the film door (not shown) is closed, automatically a film drive motor (not shown) incorporated in the camera winds the film on to its first frame in a per se conventional manner, so that said first film frame is positioned behind the shutter of the camera in a standard position for photography, ready to be shot. Simultaneously with this, the stepper motor rotates the indicating pointer 111 in the clockwise direction by exactly a sixtieth of a turn (i.e. by six degrees) from its position designated by "S", i.e. to its angular position which would designate one minute past the hour on a clock face. Although no index mark is inscribed on the graduated scale plate 112 at this precise position, the photographer can instinctively realize that the film frame counter is at "1" by intuitive analogy with a clock face, taking as a reference the character "S" inscribed at the standard 12 o'clock position and the index mark inscribed at the 5 minutes past the hour position. After this, each time a photograph is taken and the film drive motor automatically advances the film by one frame in a per se conventional manner, simultaneously the stepper motor further rotates the indicating pointer 111 in the clockwise direction by one sixtieth of a turn (i.e. by six degrees), so as to indicate to the photographer the serial number of the next film frame to be shot; and this continues until the thirty-sixth and last film frame, when the indicating pointer 111 points at the characters "36" which are inscribed on the graduated scale plate 112 at the thirty-six minutes past the hour position. When this final frame is shot, then the film drive motor rewinds the film into its cartridge, again in a manner which is per se conventional, and the indicating pointer 111 is rotated by the stepper motor so as to again to point at the character "S" inscribed at the standard 12 o'clock position on the graduated scale plate 112.

Moreover, in the case of loading a shorter film on which only 24 or 12 frames are available, when respectively 24 or 12 frames have been shot and the film is removed from the camera, similarly the indicating pointer 111 is rotated by the stepper motor so as to again to point at the character "S" inscribed at the standard 12 o'clock position on the graduated scale plate 112.

Now, although as an example according to the above description the frame number indicator was started at "1" when a new film was loaded into the camera and was increased by one (by clockwise movement of the indicating pointer 111) each time a film frame was shot, as an alternative it would be possible for the frame number indicator to be started at "36", "24", or "12" (according to the number of frames on the film) when a new film was loaded into the camera and to be decreased by one (by counter-clockwise movement of the indicating pointer 111) each time a film frame was shot, so that when the last frame on the film was reached and was ready to be shot the indicating pointer 111 would be in its above described "1" position which corresponds to one minute past the hour on a clock face, and subsequently when said last film frame was shot the indicating pointer 111 would be moved so as to again to point at the character "S" at the 12 o'clock position.

The flash mode indicator device 103 comprises an indicating pointer 120 and a plurality of flash mode designation symbols 121 through 124, and is for displaying the flash mode. The indicating pointer 120 is rotated by a stepper motor, not shown. When the indicating pointer 120 points at the symbol 121 which is also associated with the characters "AUTO", this means that the current flash mode is automatic, in which flash illumination of the photographic field is automatically performed. When the indicating pointer 120 points at the symbol 122, this means that the current flash mode is no-flash, in which flash illumination is not performed. When the indicating pointer 120 points at the symbol 123, this means that the current flash mode is forced flash, in which flash illumination is compulsorily performed. And, when the indicating pointer 120 points at the symbol 124, this means that the current flash mode is pre-flash, in which a pre-flash is emitted before the main flash so as to reduce the so called red-eye effect. FIG. 2 shows as an example the indicating pointer 120 positioned against the no-flash symbol 122.

The self timer mode indicator device 104 comprises an indicating pointer 130 and a plurality of self timer mode designation symbols 131 through 134, and is for displaying the self timer mode. The indicating pointer 130 is rotated by a stepper motor, not shown. When the indicating pointer 130 points at the symbol 131 which consists of the characters "OFF", this means that the current self timer mode is OFF, in which self timer operation is not performed; this is the mode for performing normal photography. When the indicating pointer 130 points at the symbol 132, this means that the current self timer mode is repeated photography self timer mode, in which successive frames of film are shot repeatedly at a certain interval. When the indicating pointer 130 points at the symbol 133, this means that the current self timer mode is double shot self timer mode, in which the self timer operates and after a certain time interval has passed two photographs are taken in succession, separated by another certain time interval. And, when the indicating pointer 130 points at the symbol 134, this means that the current self timer mode is single shot self timer mode, in which the self timer operates and after a certain time interval has passed a single photograph is taken. FIG. 2 shows as an example the indicating pointer 130 positioned against the single self timer mode symbol 132.

Near the flash mode indicator device 103 there is disposed a flash mode setting button 105, and when this flash mode setting button 105 is pressed the indicating pointer 120 is rotated by its stepper motor. Similarly, near the self timer mode indicator device 104 there is disposed a self timer mode setting button 106, and when this self timer mode setting button 106 is pressed the indicating pointer 130 is rotated by its stepper motor. The direction of rotation for the flash mode setting button 105 and the self timer mode setting button 106 is set by operation of one or the other of two rotational direction setting buttons 107 and 108. If the flash mode setting button 105 or the self timer mode setting button 106 is pressed while the anti clockwise rotational direction setting button 107 is being pressed, then the indicating pointer 120 or the indicating pointer 130, respectively, rotates in the anti clockwise direction. On the other hand, if the flash mode setting button 105 or the self timer mode setting button 106 is pressed while the clockwise rotational direction setting button 108 is being pressed, then the indicating pointer 120 or the indicating pointer 130, respectively, rotates in the clockwise direction.

Figure 3:
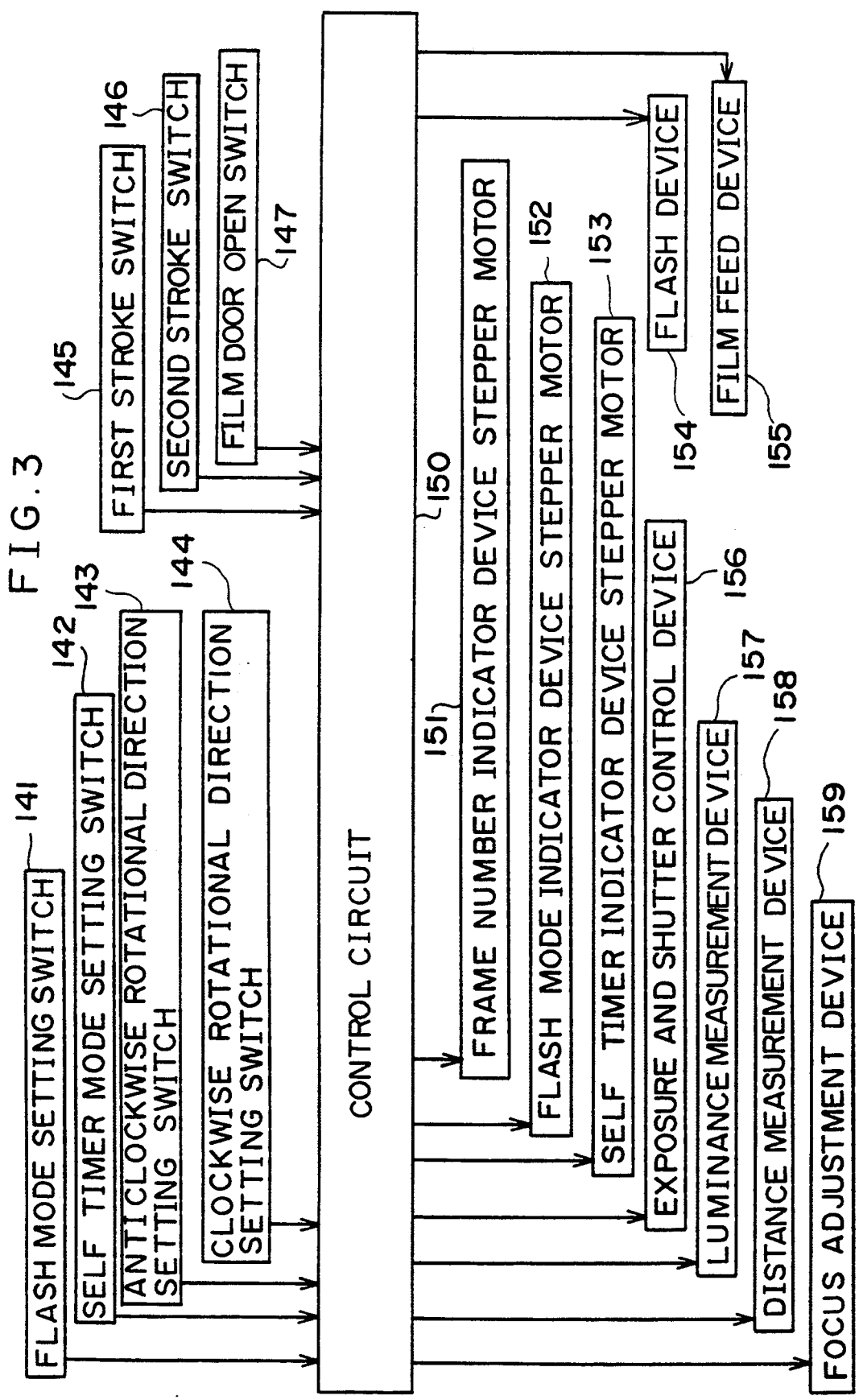
FIG. 3 is a block diagram schematically showing the construction of the camera equipped with an indicator device according to the first preferred embodiment of the present invention shown in FIG. 1.

FIG. 3 is a block diagram schematically showing certain details of the construction of the camera equipped with an indicator device according to the first preferred embodiment of the present invention shown in FIGS. 1 and 2.

A control circuit 150 comprises a microcomputer and its associated circuitry (neither of them particularly shown), and, along with performing sequence control for this camera and also various calculation functions, this control circuit 150 controls three stepper motors denoted as 151 through 153. The frame number indicator device stepper motor 151 moves the indicating pointer 111 of the frame number indicator device 102; the flash mode indicator device stepper motor 152 moves the indicating pointer 120 of the flash mode indicator device 103; and the self timer mode indicator device stepper motor 153 moves the indicating pointer 130 of the self timer mode indicator device 104.

To the control circuit 150 there are connected a flash mode setting switch 141 which is turned ON when the flash mode setting button 105 is pressed, a self timer mode setting switch 142 which is turned ON when the self timer mode setting button 106 is pressed, and anti clockwise and clockwise rotational direction setting switches 143 and 144 respectively, which are respectively turned ON when the anti clockwise and the clockwise rotational direction setting buttons 107 and 108 are pressed. Further, to the control circuit 150 there are also connected a first stroke switch 145 which is turned ON when a shutter release button not shown in the figures is initially depressed (i.e. is so called first stroke pressed), a second stroke switch 146 which is turned ON when said shutter release button is fully depressed (i.e. is so called second stroke pressed), and a film door open switch 147 which is turned ON when a film lid at the rear of the camera is open. Yet further, to the control circuit 150 there are connected a flash device 154, a film feed device 155, an exposure and shutter control device 156, a luminance measurement device 157, a distance measurement device 158, and a focus adjustment device 159.

Figure 4:
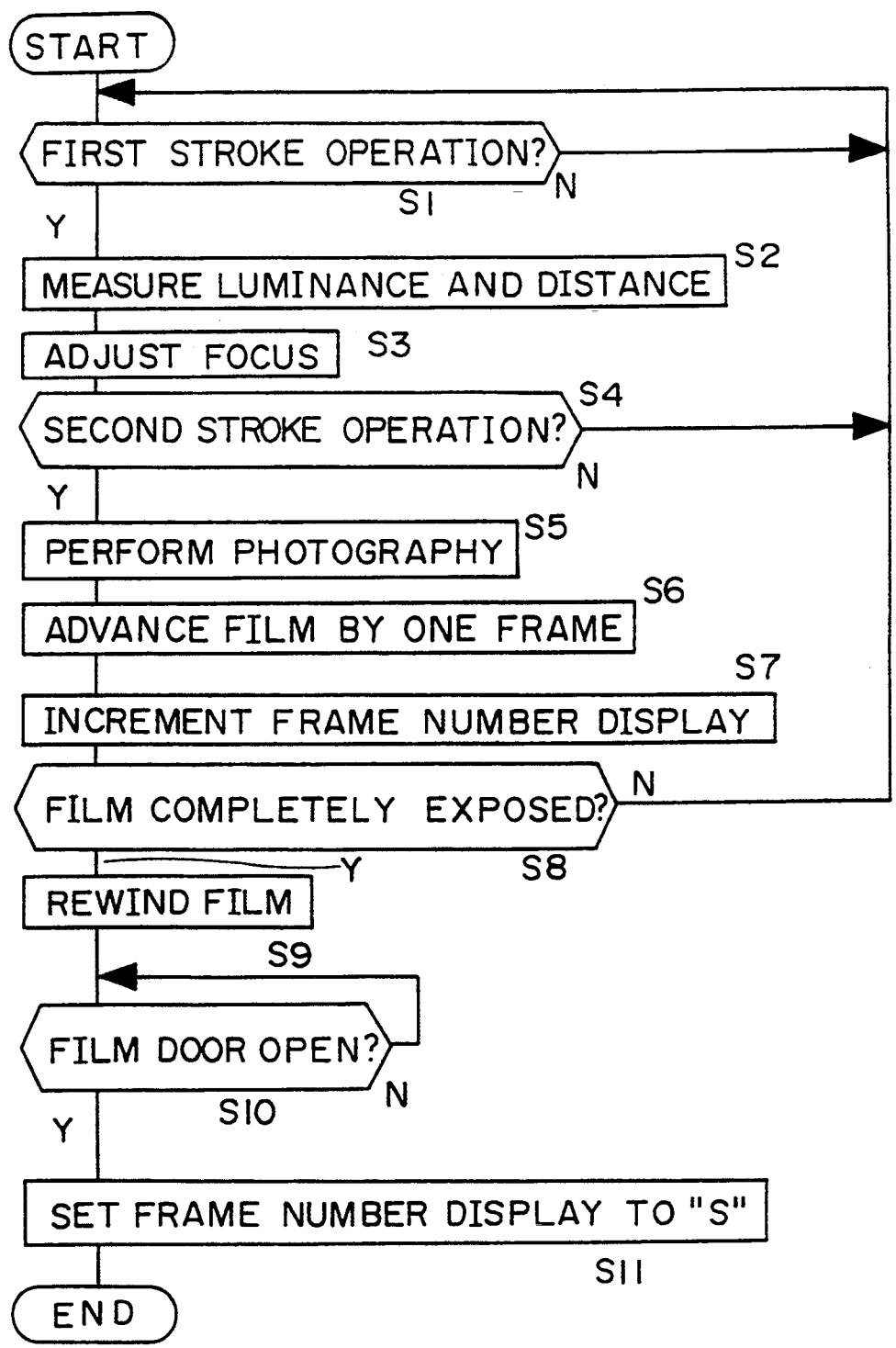
FIG. 4 is a flow chart showing the operation of a control program which is executed by a control circuit incorporating a microcomputer, comprised in the FIG. 1 camera.

FIG. 4 is a flow chart showing the operation of a control program which is executed by the control circuit 150. The operation of the frame number indicator device 102 according to the first preferred embodiment of the present invention shown in FIGS. 1 and 2 will now be explained with reference to this flow chart.

When the power supply of the camera is turned ON, the control circuit 150 starts to execute this control program. After the start of program operation, in the step S1 a decision is made as to whether or not the first stroke switch 145 is ON, i.e. as to whether or not the shutter release button (not shown) is currently being first stroke pressed or not. If the result of this decision is NO, the flow of control loops back to this decision step S1 again, while when the result of this decision becomes YES then the flow of control advances to the next step S2, in which the luminance of and the distance to the object to be photographed are measured by the luminance measurement device 157 and the distance measurement device 158 respectively. Next, in the step S3, focus adjustment is performed by the focus adjustment device 159 according to the result of the distance measurement performed in the step S2 by the distance measurement device 158. Next, in the decision step S4, a decision is made as to whether or not the second stroke switch 146 is ON, i.e. as to whether or not the shutter release button (not shown) is being second stroke pressed or not. If the result of this decision is NO, the flow of control loops back to the decision step S1 again, while when the result of this decision becomes YES then the flow of control advances to the next step S5. In the step S5 the exposure and shutter control device 156 is caused to operate so as to perform photography, and next the flow of control proceeds to the next step S6 in which the film feed device 155 is driven so as to advance the film by one frame.

Next the flow of control proceeds to the step S7, in which the control circuit 150 activates the frame number indicator device stepper motor 151 so as to move the indicating pointer 111 of the frame number indicator device 102 by just a sixtieth of a turn, i.e. six degrees, in the clockwise direction, in other words so as to increase the film frame count by one; and then the flow of control passes to the next decision step S8, in which a decision is made as to whether or not all the frames of the film have been shot. If the result of this decision is NO, the flow of control loops back to the decision step S1 again, while when the result of this decision becomes YES then the flow of control advances to the next decision step S9. In this step S9, the film is rewound into the film cartridge by the control circuit 150 activating the film feed 155 in reverse in a per se conventional manner, and then the flow of control proceeds to the next decision step S10, in which a decision is made, based upon the output from the film door open switch 147, as to whether the film door of the camera is currently open, or not. If the film door is not open, then the flow of control loops back to this decision step S10 again, while on the other hand when the film door is found to be open this signals that this episode of photography has been completed, and so the flow of control proceeds to the next step S11, in which the control circuit 150 activates the frame number indicator device stepper motor 151 so as to move the indicating pointer 111 of the frame number indicator device 102 back to the character "S" at the standard 12 o'clock position, for starting the next roll of film when it subsequently comes to be inserted in the camera.

Although as an example the first preferred embodiment of the indicator device for a camera according to the present invention as described above has been shown as being applied to a frame number indicator device, a flash mode indicator device, and a self timer indicator device, other alternatives are possible. FIGS. 5 through 17 show examples of the display of other items of information related to conditions for photography, which will now be explained in an abridged manner; that is, only the actual display portions of the respective indicator devices will be shown and described, but plan views and rear views of cameras incorporating these indicator devices, as well as block diagrams of drive control circuits for these indicator devices and flow charts of control programs for these control circuits, will be omitted in the interests of brevity of description, since based upon the disclosures in this specification they may be readily supplemented by one of ordinary skill in the relevant art.

Figure 5:
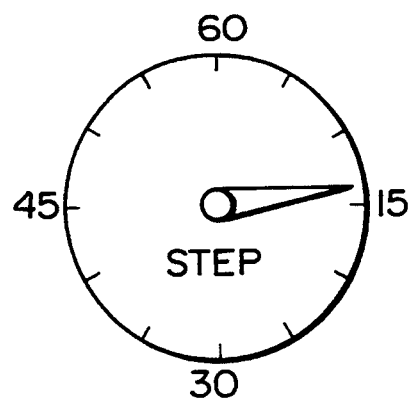
FIG. 5 is a plan view of an indicator device for displaying the stepped position of a photographic lens.

FIG. 5 is a plan view of an indicator device for displaying the step position of a photographic lens, to which said lens is moved by the previously described focus adjustment device 159. With this indicator device, conceptually subdividing the circumference of the inscribed scale plate thereof into sixty equal divisions, index marks are inscribed at positions of a subset of twelve of these corresponding to the hour and every five minutes thereafter in the case of a clock face. Further, at the fifteen, thirty, forty-five, and sixty minutes past the hour positions on the scale plate there are written the numerals "15", "30", "45", and "60" respectively. In FIG. 5, as an example the indicating pointer is shown pointing at the thirteen minutes past the hour position, thus indicating that the position of the photographic lens is at its thirteenth step.

Figure 6:
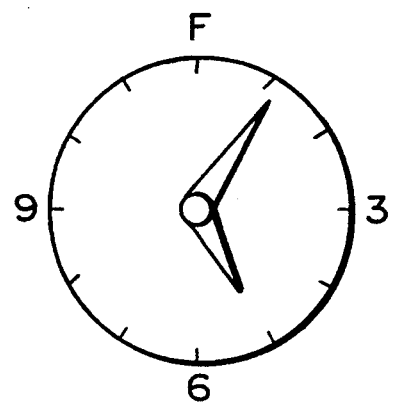
FIG. 6 is a plan view of an indicator device for displaying the aperture setting (F-stop) of a photographic lens.

FIG. 6 is a plan view of an indicator device for displaying the opening amount of a photographic lens, i.e. its F-stop or iris setting, as set by the exposure and shutter control device 156. With this indicator device, again conceptually dividing the circumference of the inscribed scale plate thereof into sixty equal divisions, index marks are inscribed at the positions of a subset of twelve of these divisions corresponding to each of the twelve hours in the case of a clock face. Further, at the three o'clock, six o'clock, and nine o'clock positions on the scale plate there are written the numerals "3", "6", and "9" respectively. This indicator device has a long indicating pointer and a short indicating pointer, like an analog clock, and in FIG. 6 as an example it is shown that the short indicating pointer is pointing near the five o'clock position while the long indicating pointer is pointing at the six minutes past the hour position, thus indicating by analogy to a normal analog clock that the F-stop of the photographic lens is F5.6, as will be understood via the use of analogy and Because this indicator device intuition by any person who can easily read an analog clock face.

Figure 7:
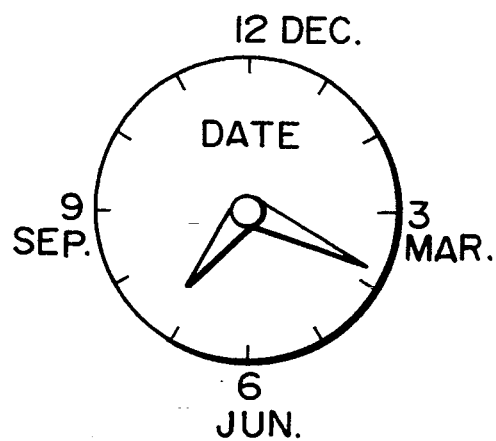
FIG. 7 is a plan view of an indicator device for displaying the month and day portions of the current date.

FIG. 7 is a plan view of an indicator device for displaying the month and day of the current date, as determined by a per se conventional form of clock-calendar device which is not particularly shown. With this indicator device, similarly to the device of FIG. 6, the circumference of the inscribed scale plate thereof may be conceptually subdivided into sixty equal divisions, and index marks are inscribed at the positions of a subset of twelve of these divisions corresponding to each of the twelve hours in the case of a clock face, and at the three o'clock, six o'clock, and nine o'clock positions on the scale plate there are written the numerals "3", "6", and "9" respectively, as well as the respective abbreviations "MAR", "JUN", and "SEP" which respectively represent "MARCH", "JUNE", and "SEPTEMBER". Again, this indicator device has a long indicating pointer and a short indicating pointer, like an analog clock, and in FIG. 7 as an example it is shown that the short indicating pointer is pointing near the seven o'clock position while the long indicating pointer is pointing at the nineteen minutes past the hour position, thus indicating by analogy to a normal analog clock that the current date is July 19th, as again will be understood via the use of analogy and intuition by any person who can easily read an analog clock face.

Figure 8:
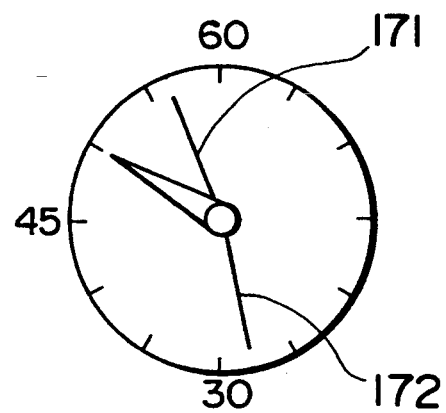
FIG. 8 is a plan view of an indicator device for displaying the focal length of a photographic lens.

FIG. 8 is a plan view of an indicator device for displaying the focal length of a photographic lens, as set by the focus adjustment device 159. With this indicator device, again the circumference of the inscribed scale plate thereof may be conceptually subdivided into sixty equal divisions, and index marks are inscribed at a subset of twelve of these positions corresponding to the hour and every five minutes thereafter in the case of a clock face. Further, at the thirty and forty-five minutes past the hour positions on the scale plate there are written the numerals "30", and "45" respectively, and at the hour position there are written the numerals "60": these numerals symbolize focal lengths of 30 mm, 45 mm, and 60 mm respectively. This indicator device has a single indicating pointer, which as an example in FIG. 8 is shown to be pointing at the fifty minutes past the hour position, thus indicating that the focal length of the photographic lens is currently set to 50 mm. Further, on the scale plate of this indicator device there is inscribed a maximum limit line 171 at the position corresponding to the fifty-six minutes past the hour position on a clock face, which serves to indicate that the maximum focal length available from this lens is 56 mm, and also there is inscribed a minimum limit line 172 at the position corresponding to the twenty-eight minutes past the hour position on a clock face, which serves to indicate that the minimum focal length available from this lens is 28 mm.

Figure 9:
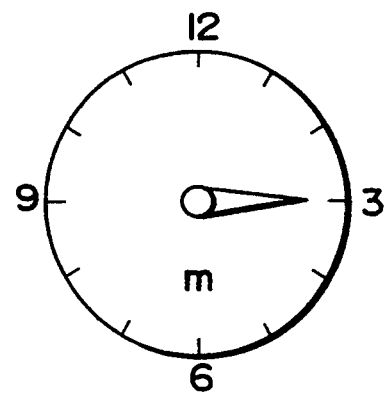
FIG. 9 is a plan view of an indicator device for displaying the photographic distance from the camera to an object to be photographed.

FIG. 9 is a plan view of an indicator device for displaying the photographic distance from the camera to the object to be photographed, as determined by the distance measurement device 158. With this indicator device, again, conceptually subdividing the circumference of the inscribed scale plate thereof into sixty equal divisions, index marks are inscribed at a subset of twelve of these sixty positions corresponding to each of the twelve hours in the case of a clock face. Further, at the three o'clock, six o'clock, nine o'clock, and twelve o'clock positions on the scale plate there are written the numerals "3", "6", "9" and "12" respectively. This indicator device has a single indicating pointer, and in FIG. 9 as an example the indicating pointer is shown pointing at the three o'clock position, thus indicating that the current value of the distance from the camera to the object to be photographed is three meters, as will be understood via the use of analogy and intuition by any person who can easily read an analog clock face.

Moreover, this indicator device can also be used as a position setting means when performing focus adjustment of the photographic lens by manual operation, as follows. When the operator alters the position of the indicating pointer to a new position indicating the desired photographic distance by using the operation buttons described above in a manner which will be easily conceived of by one of ordinary skill in the relevant art based upon the disclosure herein, then the focus adjustment device 159 moves the photographic lens to a position which provides the appropriate focal length for that set photographic distance.

Figure 10:
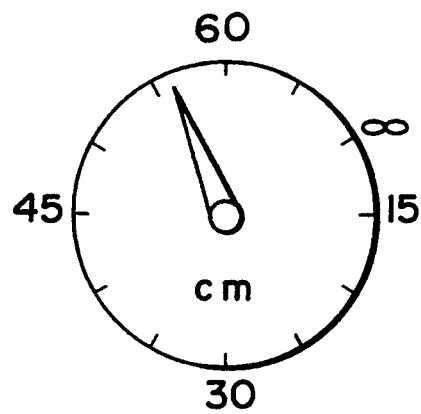
FIG. 10 is a plan view of another indicator device for displaying such a photographic distance.

FIG. 10 is a plan view of another indicator device for displaying the photographic distance, adapted for close range photography. With this indicator device the circumference of the inscribed scale plate thereof again conceptually may be subdivided into sixty equal divisions, with index marks being inscribed at the positions of a subset of twelve of these corresponding to the hour and every five minutes thereafter in the case of a clock face. Further, at the fifteen, thirty and forty-five minutes past the hour positions on the scale plate there are written the numerals "15", "30", and "45" respectively, and at the hour position there are written the numerals "60": these numerals symbolize photographic distances of 15 cm, 30 cm, 45 cm, and 60 cm respectively. This indicator device has a single indicating pointer, which in FIG. 10 as an example is shown to be pointing at the fifty-six minutes past the hour position, thus indicating that the photographic distance is currently 56 cm. Further, on the scale plate of this indicator device there is inscribed an infinity sign at the position corresponding to the ten minutes past the hour position on a clock face, which serves to indicate that the photographic lens is set at the infinity position, without any dependence upon the photographic distance as determined by the distance measurement device 158.

Figure 11:
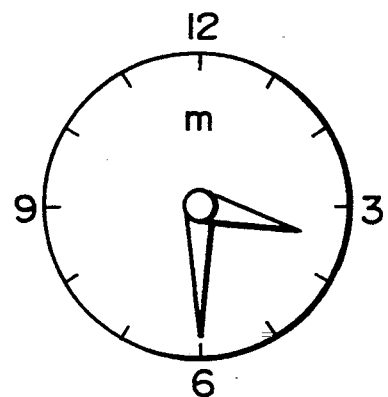
FIG. 11 is a plan view of yet another indicator device for displaying such a photographic distance.

FIG. 11 is a plan view of yet another indicator device for displaying the photographic distance. With this indicator device, similarly to the device of FIGS. 6 and 7, again conceptually the circumference of the inscribed scale plate thereof may be subdivided into sixty equal divisions, and index marks are inscribed at positions of a subset of twelve of these each corresponding to one of the twelve hours in the case of a clock face, and at the three o'clock, six o'clock, nine o'clock, and twelve o'clock positions on the scale plate there are written the numbers "3", "6", "9", and "12" respectively. Again, this indicator device has a long indicating pointer and a short indicating pointer, and it is able to show the photographic distance to one place of decimals, by analogy to a normal analog clock. In FIG. 11 it is shown as an illustrative example that the short indicating pointer is pointing between the three o'clock position and the four o'clock position while the long indicating pointer is pointing at the thirty minutes past the hour position, thus indicating that the current photographic distance is 3.5 meters, as again will be understood, via the use of analogy and intuition, by any person who can easily read a clock face.

Figure 12:
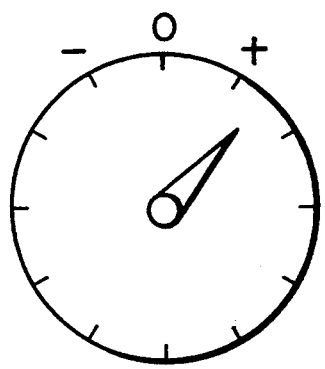
FIG. 12 is a plan view of an indicator device for displaying an exposure correction value.

FIG. 12 is a plan view of an indicator device for displaying an exposure correction value. With this indicator device, again conceptually subdividing the circumference of the inscribed scale plate thereof into sixty equal divisions, index marks are inscribed at the positions of a subset of twelve of these corresponding to the hour and every five minutes thereafter in the case of a clock face. Further, at the hour position on the scale plate there is written the numeral "0", while at the five and the fifty-five minutes past the hour positions there are written the symbols "+" and "−" respectively: these symbols respectively mean that a clockwise displacement of the indicating pointer is used to show a positive exposure correction of absolute value unity, and that an anticlockwise displacement of the indicating pointer is used to show a negative exposure correction of absolute value unity. This indicator device has a single indicating pointer, which in FIG. 12 is shown as an example to be pointing at the seven and a half minutes past the hour position, thus indicating that the exposure correction is positive and has a value of 1.5.

Figure 13:
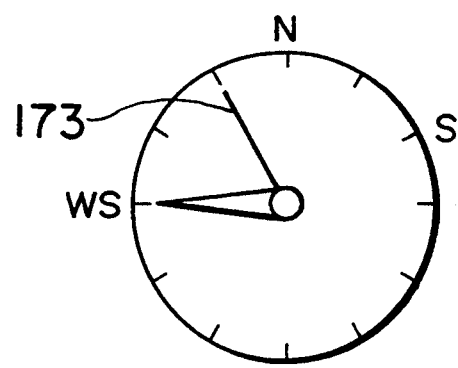
FIG. 13 is a plan view of an indicator device for displaying the self timer mode setting.

FIG. 13 is a plan view of another embodiment of the indicator device for displaying self timer mode setting, a first embodiment of which was shown in FIG. 2. With this indicator device, again conceptually subdividing the circumference of the inscribed scale plate thereof into sixty equal divisions, index marks are inscribed at the positions of a subset of twelve of these corresponding to the hour and every five minutes thereafter in the case of a clock face. Further, at the hour position on the scale plate there is written the letter "N", at the ten minutes past the hour position there is written the letter "S", and at the forty-five minutes past the hour position there are written the letters "WS": these symbols respectively denote the OFF self timer mode, the single shot self timer mode, and the double shot self timer mode, as explained previously with respect to FIG. 2. Also a first shot mark denoted as 173, the function of which will appear shortly, is inscribed at the fifty-five minutes past the hour position. This indicator device has a single indicating pointer, which in FIG. 13 is shown as an example to be pointing at the letters "WS" at the forty-five minutes past the hour position, thus indicating that the two shot self timer mode is selected.

This pointer is rotated by a stepper motor (not particularly shown) and in one second turns a sixtieth of a turn (i.e. six degrees) in one or the other rotational direction. In the single shot self timer mode, first the indicating pointer is set at the mark "S" at the two o'clock position, and then when the shutter release button is pushed the pointer starts to turn in the anti clockwise direction towards the "N" mark. After a time of ten seconds has elapsed, i.e. corresponding to the movement of the second hand of a watch through sixty degrees which is the same angle as that between the "S" mark and the "N" mark and thus is intuitively apparent to the user of the camera, the indicating pointer reaches the mark "N" and a single photograph is taken. On the other hand, in the double shot self timer mode, first the indicating pointer is set at the mark "WS" at the nine o'clock position, and then when the shutter release button is pushed the pointer starts to turn in the clockwise direction towards the "N" mark. After a time of ten seconds has elapsed, i.e. corresponding to the movement of the second hand of a watch through sixty degrees, the indicating pointer reaches the first shot mark 173 and a first photograph is taken and the film is wound on to the next frame thereof. The indicating pointer continues to move, and when a further time of five seconds has elapsed, i.e. corresponding to the movement of the second hand of a watch through thirty degrees, the indicating pointer reaches the mark "N" and a second photograph is taken.

Figure 14:
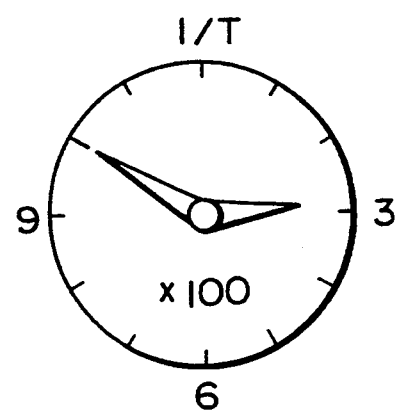
FIG. 14 is a plan view of an indicator device for displaying the shutter speed.

FIG. 14 is a plan view of an indicator device for displaying shutter speed. With this indicator device, again conceptually the circumference of the inscribed scale plate thereof is subdivided into sixty equal divisions, and index marks are inscribed at positions of a subset of twelve of these each corresponding to one of the twelve hours in the case of a clock face, and at the three o'clock, six o'clock, nine o'clock, and twelve o'clock positions on the scale plate there are written the numerals "3", "6", "9", and the symbol "1/T" respectively. Again, this indicator device has a long indicating pointer and a short indicating pointer, and by analogy to a normal analog clock it is able to show the shutter speed to a hundredth of a second. In FIG. 14 as an illustrative example the short indicating pointer is shown as pointing between the two o'clock position and the three o'clock position while the long indicating pointer is shown as pointing at the fifty minutes past the hour position, thus indicating that the current shutter speed is 1/250 of a second, as again will be understood via the use of analogy and intuition by any person who can easily read a clock face.

Figure 15:
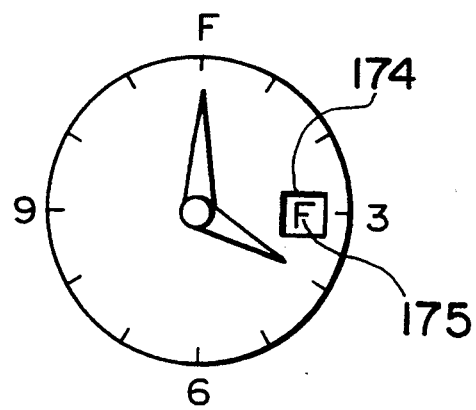
FIG. 15 is a plan view of another indicator device for displaying the aperture setting (F-stop)

FIG. 15 is a plan view of another embodiment of the indicator device for displaying the aperture setting (F-stop) shown in FIG. 6. With this indicator device, again conceptually dividing the circumference of the inscribed scale plate thereof into sixty equal divisions, index marks are inscribed at the positions of a subset of twelve of these corresponding to each of the twelve hours in the case of a clock face. Further, at the three o'clock, six o'clock, nine o'clock, and twelve o'clock positions on the scale plate there are written the numerals "3", "6", "9", and the letter "F" respectively. Also a window 174 is pierced through the scale plate, and, by a mechanism which will be easily supplemented by one of ordinary skill in the relevant art based upon this disclosure, when this indicator device is intended to be taken as a twelve hour clock no symbol is visible through this window 174, while on the other hand when this indicator device is intended to be taken as a twenty-four hour clock the symbol "F" at 175 which is inscribed on a lower plate (not otherwise shown) is visible through the window 174. This indicator device has a long indicating pointer and a short indicating pointer, and in FIG. 15 as an example the short indicating pointer is shown as pointing at the four o'clock position while the long indicating pointer is shown as pointing at the hour position, with the symbol "F" at 175 showing through the window 174, thus indicating, again by analogy to a normal analog clock, that the current F-stop of the photographic lens is F16, as will be understood by any person who can easily read a clock face and who also understands the concept of a twenty-four hour clock via the use of analogy and intuition.

Figure 16:
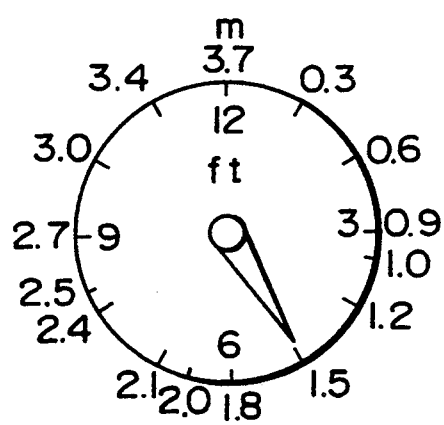
FIG. 16 is a plan view of yet another indicator device for displaying the photographic distance.

FIG. 16 is a plan view of yet another embodiment of the indicator device for displaying the photographic distance, like the embodiments shown in FIGS. 9, 10, and 11. This indicator device, instead of being calibrated in meters like the previously disclosed ones, is calibrated in feet. In detail, with this indicator device, the circumference of the inscribed scale plate thereof again conceptually may be subdivided into sixty equal divisions, with index marks being inscribed at the positions of a subset of twelve of these corresponding to the hours in the case of a clock face. Further, at the three o'clock, six o'clock, nine o'clock, and twelve o'clock positions on the scale plate there are written the numbers "3", "6", "9", and "12" respectively: these numbers symbolize photographic distances of three feet, six feet, nine feet, and twelve feet respectively, and outside the circle on the scale plate the equivalents in meters are inscribed for purposes of reference. Only the indications for three, six, nine, and twelve feet are inscribed inside the circle, because if the photographic distance for all twelve of the index marks were written in this limited space leading inwards from the circle the digits would necessarily be very small and even so would be cramped up together and very difficult to see. On the other hand, in the case of the meter equivalents which are written outside the circle leading outwards therefrom, because there is ample space available values thereof for all twelve of the index marks are explicitly inscribed on the scale plate, as shown in FIG. 16. This indicator device has a single indicating pointer, which as an example is shown in FIG. 16 as pointing at the twenty-five minutes past the hour position, thus indicating that the current photographic distance is five feet.

The indicator device shown in FIG. 16, or indeed any of the others described above, may, according to requirements, be used for displaying the value of any of various physical quantities other than those mentioned above by way of example; for instance, the value of a length, a weight, a volume, an area, a temperature, a force, a pressure, etc. may be displayed. Further, various different numerical units may be used according to local custom, if necessary in plurality and/or in the alternative, and lined up together in a fashion analogous to that shown in FIG. 16.

Figure 17:
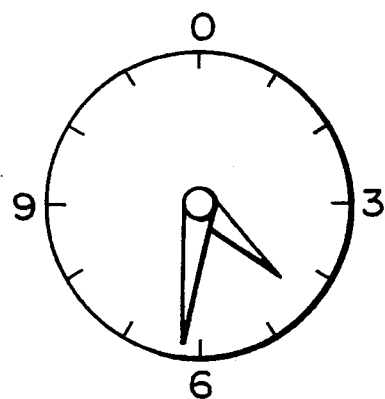
FIG. 17 is a plan view of an indicator device for displaying a part of certain address data.

FIG. 17 is a plan view of an indicator device for displaying a part of certain address data. According to the Japanese address system, a majority of addresses in urban areas are expressed in the form <name> City, <number-1> -chome, <number-2> -banchi, <number-3> -go. In this case, the value of <number-1> hardly ever exceeds eleven, and the value of <number-2> hardly ever exceeds fifty-nine. Accordingly, it is possible to display the chome and banchi portion of the address, i.e. to display <number-1> and <number-2>, by the use of an indicator device according to the present invention. The indicator device of FIG. 17, like some of the previously described ones, has the appearance of an analog clock with two hands, and by reading out a hypothetical time according to the normal manner for reading an analog clock and mentally converting this time into digital form (which is a process familiar to nearly everyone) a pair of numbers within the above-mentioned ranges for <number-1> and <number-2> may be obtained. In FIG. 17 it is shown as an example that the short indicating pointer is pointing between the four o'clock position and the five o'clock position while the long indicating pointer is pointing at the thirty-two minutes past the hour position, thus indicating that the chome and banchi portion of the address being displayed is "4-chome, 32-banchi".

Thus, as described above, by conceptually subdividing the circumference of the scale plate into sixty equal divisions, by inscribing index marks at the positions of a plural subset of these as appropriate to the particular conditions related to photography for which it is desired to display data, and by providing an indicating pointer which is rotatably moved against said inscribed scale plate by a stepper motor, it is possible according to the first preferred embodiment of the present invention to display said data, by analogy with a clock face, in an easy to apprehend and intuitive manner. The advantage of striking an analogy with a clock face is that it is not necessary to inscribe on the scale plate values for all the possible positions of the indicating pointer against said scale plate, since intermediate values can easily be supplemented by any person even of meagre education who is familiar with the principles of telling the time, without any need of any mathematical type interpolation which might be too challenging for the average camera user; and thereby the limited space available on the surface of a camera for information display may be effectively used.

Although each of the above described variations of the indicator device according to the first preferred embodiment of the present invention has a dedicated stepper motor for rotationally driving its movable indicating pointer, so that all the pointers of all the indicator devices provided to a single camera may be simultaneously driven, in fact this is not an essential feature of the present invention: as an alternative, the possibility of providing a single stepper motor which rotationally drives several movable indicating pointers of several indicator devices is also acceptable. In such a case, each of these pointers would be driven by at least a cogwheel, a lever, or the like, possibly situated behind the scale plate for that pointer, and this would constitute a means for driving that pointer. Also, although the above indicator devices were all described as being disposed on the upper surface of the main body of the camera, in fact this is not to be considered as limitative of the present invention, and other positions, such as for example on the rear surface of the camera, are also to be considered as acceptable within the bounds of the present invention.

Preferred Embodiment 2

The second preferred embodiment of the indicator device for a camera according to the present invention will now be explained with reference to FIGS. 19 through 31.

Figure 19:
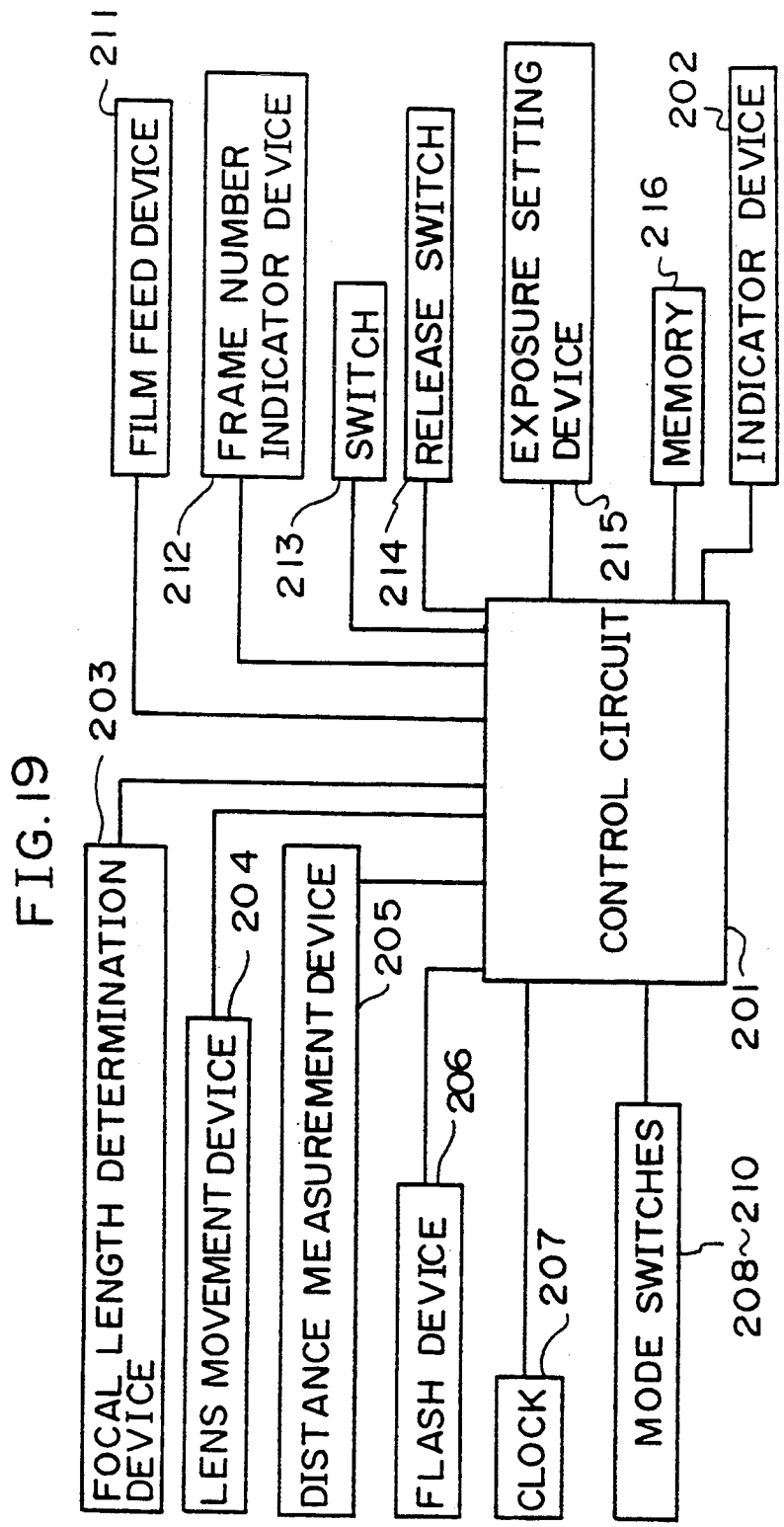
FIG. 19 is a block diagram showing the construction of a camera equipped with an indicator device according to a second preferred embodiment of the present invention.

FIG. 19 is a block diagram showing the construction of a camera equipped with an indicator device according to the second preferred embodiment.

A control circuit 201 comprises a microcomputer and its associated circuitry (neither of them particularly shown), and, along with performing sequence control for this camera and also various calculation functions, this control circuit 201 controls an indicator device 202.

To the control circuit 201 there are connected a focal length determination device 203, a lens movement device 204, a distance measurement device 205, a flash device 206, a clock 207, and a plurality of mode switches 208 through 210. The focal length determination device 203 determines the focal length of the photographic lens (not shown in the figure). The lens movement device 204 moves said photographic lens according to command signals which it receives from the control circuit 201. The distance measurement device 205 measures the photographic distance from this camera to the object which is to be photographed. The flash device 206 illuminates the object to be photographed, according to command signals which it receives from the control circuit 201. The clock 207 outputs information relating to the date and the time to the control circuit 201. And the mode switches 208 through 210 function as operation elements for setting and changing the various modes of the camera.

Further, there are also connected to the control circuit 201 a film feed device 211, a frame number counting device 212, a switch 213, a release switch 214, an exposure and shutter control device 215, the indicator device 202, and a memory 216. The film feed device 211 rolls the film on forwards from frame to frame, and when required rewinds the film again. The frame number counting device 212 counts the number of frames of film that have been shot. The switch 213 is turned ON, as will be explained later, when the release button is initially depressed (i.e. is so called first stroke pressed), while the release switch 214 is turned ON when said release button is fully depressed (i.e. is so called second stroke pressed). The exposure and shutter control device 215 performs exposure of the film by controlling the operation of an iris mechanism and a shutter mechanism neither of which is shown in the figures. And the memory 216 stores the position of the indicator pointer of the indicator device 202.

Figure 20:
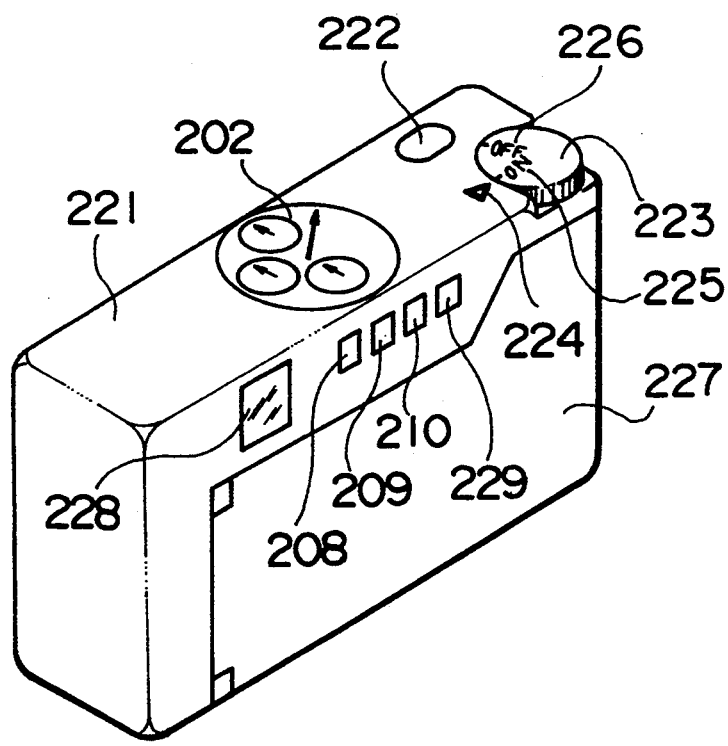
FIG. 20 is a perspective view as seen from the rear of a camera equipped with an indicator device according to the second preferred embodiment of the present invention.

FIG. 20 is a perspective view as seen from the rear of a camera equipped with an indicator device according to the second preferred embodiment of the present invention.

On the upper surface of the main body 221 of the camera there are provided the indicator device indicator device 202 for displaying various sorts of information, a release button 222, and a main switch 223. Further, on the rear surface of the camera main body 221, there are provided a film door 227, a viewfinder 228, and the previously mentioned mode switches 208 through 210, and a self timer setting switch 229.

When the main switch 223 is turned so that the mark 225 consisting of the letters "ON" which it bears registers against the arrow 224 which is inscribed on the camera main body 221, then the camera is turned ON, i.e. is put into the state in which it is enabled for photography; and then the mode switches 208 through 210 and the self timer setting switch 229 etc. become available for operation. On the other hand, when the main switch 223 is turned so that the mark 226 consisting of the letters "OFF" which it bears registers against the arrow 224, then the camera is turned OFF, i.e. is put into the state in which it is disabled for photography; and then none of the switches are available for operation.

FIG. 21 is an enlarged view of the indicator device 202 according to the second preferred embodiment shown in FIG. 20.

This indicator device 202 comprises a large indicator 231 and a first small indicator 241, a second small indicator 251, and a third small indicator 261 all provided within the boundary of said large indicator 231.

The large indicator 231 comprises a large indicator pointer 232 which is driven by a stepper motor not shown in the figure, and an inscribed scale plate 233, and shows the number of frames of film that have been shot. On this inscribed scale plate 233, index marks are inscribed at positions corresponding to the hours in the case of a clock face, i.e. every thirty degrees, and further, at the three o'clock, six o'clock, nine o'clock, and twelve o'clock positions on the scale plate there are written the numbers "15", "30", "45", and "0" respectively: these numbers symbolize corresponding frame numbers. The single large indicator pointer 232 is moved six degrees clockwise over the inscribed scale plate 233 every time a new photograph is taken (i.e. another frame is shot), and accordingly said large indicator pointer 232 frequently stops between the index marks. However, when this happens, because the angular distance through which said large indicator pointer 232 moves for one frame of film is the same as the angular distance through which the minute hand of a clock moves for one minute or the second hand moves for one second (both being six degrees), therefore, even though the large indicator pointer 232 is between one index mark and another, the user of the camera, by analogy to a normal analog clock, will easily be able to read the frame number. As an example in FIG. 21 the large indicator pointer 232 is shown as pointing at the fourteen minutes past the hour position, thus indicating that the current frame number is fourteen, as will be understood via the use of analogy and intuition by any person who can easily read an analog clock face.

The first small indicator 241 comprises a small indicator pointer 242 which is driven by a stepper motor not shown in the figure, and an inscribed scale plate 243, and shows the correction mode for the exposure amount. On this inscribed scale plate 243, index marks are inscribed at positions corresponding to the quarters in the case of a clock face, i.e. every ninety degrees at the three o'clock, six o'clock, nine o'clock, and twelve o'clock positions, where there are inscribed the symbols "1", "B", "−1", and "0" respectively: the symbol "0" represents the mode in which no exposure correction is performed, the symbol "1" represents the mode in which a single level of positive correction is performed, the symbol "−1" represents the mode in which a single level of negative correction is performed, and the symbol "B" represents the bulb mode. The small indicator pointer 242 is moved ninety degrees clockwise every time the mode switch 208 is pressed, and accordingly the exposure amount correction mode is cycled around between the no correction mode, the single level of positive correction mode, the bulb mode, and the single level of negative correction mode. As an example in FIG. 22A the small indicator pointer 242 is shown as pointing at the "B" position, and thus the first small indicator 241 is indicating that the bulb mode is the current one.

The second small indicator 251 comprises a small indicator pointer 252 which is driven by a stepper motor not shown in the figure, and an inscribed scale plate 253, and shows the focus adjustment mode for the camera lens. On this inscribed scale plate 253, index marks are inscribed at positions corresponding to twenty minutes past the hour, forty minutes past the hour, and the hour in the case of a clock face, i.e. every hundred and twenty degrees at the four o'clock, eight o'clock, and twelve o'clock positions, where there are inscribed the symbols "infinity", "3", and "AF" respectively: the symbol "infinity" represents a mode in which the lens of the camera is focused accurately upon an object to be photographed at infinity and is fixed and not altered, the symbol "3" represents a fixed focus mode in which the lens of the camera is focused accurately upon an object to be photographed at three meters distance (which is a frequently used distance for photography) and is fixed and not altered, and the symbol "AF" represents the auto focus mode. The small indicator pointer 252 is moved one hundred and twenty degrees clockwise every time the mode switch 209 is pressed, and accordingly the focus adjustment mode is cycled around between the auto focus mode, the infinity focus mode, and the fixed three meter focus mode. As an example in FIG. 22B the small indicator pointer 252 is shown as pointing at the "infinity" position, and thus the second small indicator 251 is indicating that the infinity focus mode is the current one.

The third small indicator 261 comprises a small indicator pointer 262 which is driven by a stepper motor not shown in the figure, and an inscribed scale plate 263, and shows the flash photography mode. On this inscribed scale plate 263, index marks are inscribed at positions corresponding to the quarters in the case of a clock face, i.e. every ninety degrees at the three o'clock, six o'clock, nine o'clock, and twelve o'clock positions, where there are inscribed the symbols "A", "C", "FI", and "PF" respectively: the symbol "A" represents the automatic flash mode, the symbol "C" represents the no flash mode, the symbol "FI" represents the forced flash mode, and the symbol "PF" represents the pre flash mode. (These terms have been explained earlier in this specification). The small indicator pointer 262 is moved ninety degrees clockwise every time the mode switch 210 is pressed, and accordingly the flash mode is cycled around between the automatic flash mode, the no flash mode, the forced flash mode, and the pre flash mode. As an example in FIG. 22C the small indicator pointer 262 is shown as pointing at the "PF" position, and thus the third small indicator 261 is indicating that the pre flash mode is the current one.

Figure 23:
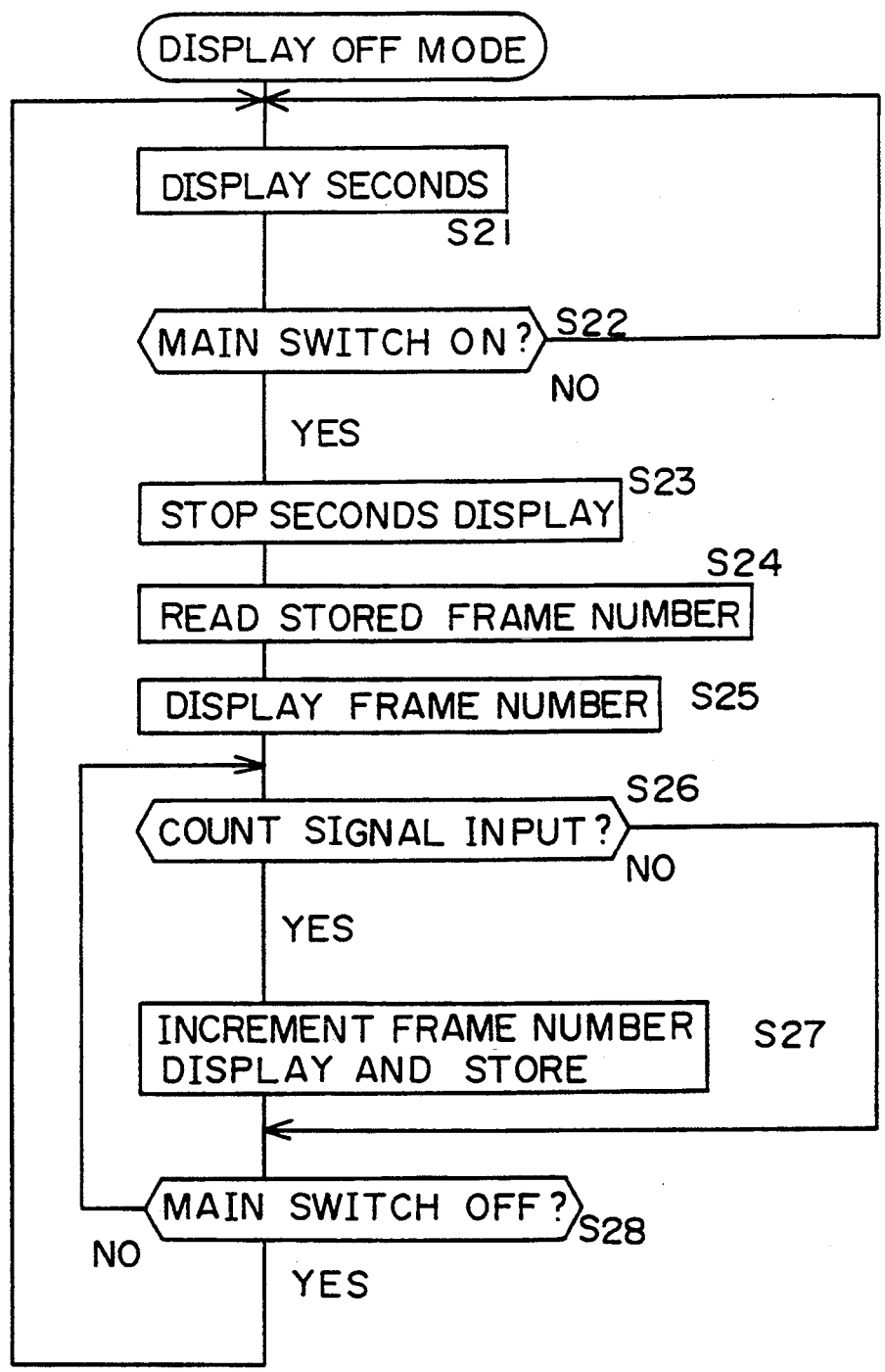
FIG. 23 is a flow chart showing the operation of a control program for OFF mode display, which is executed by a control circuit incorporating a microcomputer, comprised in the FIG. 20 camera.

FIG. 23 is a flow chart showing the operation of a control program for OFF mode display, which is executed by a microcomputer comprised in the control circuit 201 of FIG. 19. The OFF mode is the mode in which the main switch 223 of the camera is turned to the OFF position. The control circuit 201 executes this control program, and during the OFF mode causes the large indicator pointer 232 of the large indicator 231 to act like the second hand of a watch, rotating once per minute along with the passage of time; while when the main switch 223 is turned to the ON position then the camera goes into its mode in which it is ready for photography, and the large indicator pointer 232 indicates the current frame number of the film.

In the first step S21 of this program, when the main switch 223 is in the OFF position, i.e. when the camera is in the condition when photography is not possible, the large indicator pointer 232 of the large indicator 231 is moved in the clockwise direction at the rotational speed of six degrees per second, just like the second hand of a watch. In the step S22, a decision is made as to whether the main switch 223 has been moved to the ON position, or not, and if the result of this decision is NO then the flow of control returns to the step S21, while otherwise the flow of control proceeds to the next step S23.

Figure 24A:
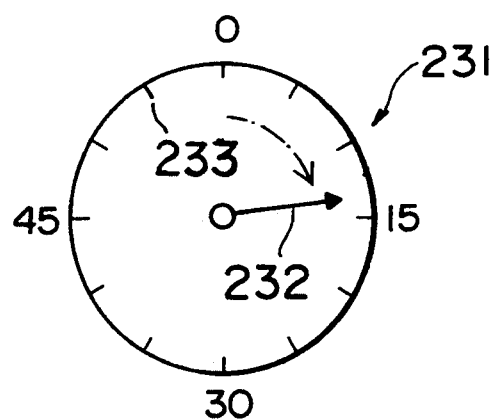
FIG. 24A and FIG. 24B are plan views showing the movement of an indicating pointer of a large size indicator, during OFF mode.
Figure 24B:
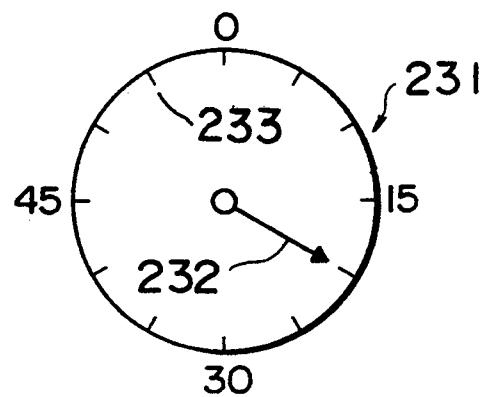

If the main switch 223 is set to the ON position, then the camera is in the condition in which photography is possible, and in the next step S23 the rotation of the large indicator pointer 232 of the large indicator 231 to time seconds, described above, is stopped. Supposing for example that up to this time, as shown in FIG. 24A, the large indicator pointer 232 has moved to the position corresponding to fourteen seconds past the minute, then it is stopped in this position. Next, in the next step S24, the frame number stored from the frame number counting device 212 last time the power switch 223 was ON is read in, and the flow of control proceeds to the next step S25, in which the large indicator pointer 232 of the large indicator 231 is moved to its previous position, so as again to indicate the number of film frames that have been used. For example, if at the last moment the power was on previously the frame number was 20, then as shown in FIG. 23B the large indicator pointer 232 is moved to the position corresponding to twenty seconds past the minute. Thereby the frame number is displayed.

Next, in the decision step S26, a decision is made as to whether or not a frame number count signal which accompanies the conclusion of photography has been input from the frame number counting device 212. If in fact a frame number count signal has been input, then the flow of control passes next to the step S27, while if no frame number count signal has been input the flow of control jumps to the decision step S28, skipping the step S27. In the step S27, the frame number displayed by the frame number counting device 212 is incremented by the large indicator pointer 232 of the large indicator 231 being rotated in the clockwise direction by six degrees so as to indicate one frame more, and the new value of the frame number is stored in the memory 216. Next, in the decision step S28, a decision is made as to whether or not the main power switch 223 has been turned to the OFF position, and if the result of this decision is YES then the flow of control returns next to the step S21 and the large indicator pointer 232 of the large indicator 231 starts to count seconds again, while if the result of this decision is NO, so that the main power switch 223 is still ON as before, then the flow of control returns next to the decision step S26, so as to loop round and continue displaying the current frame number.

Figure 22A:
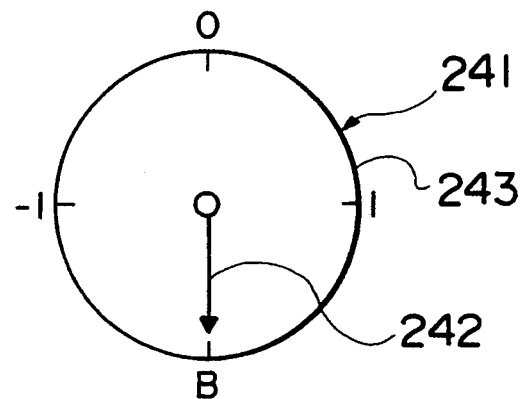
FIG. 22A is a figure showing the display state of a first indicator portion, when bulb mode is set.
Figure 22B:
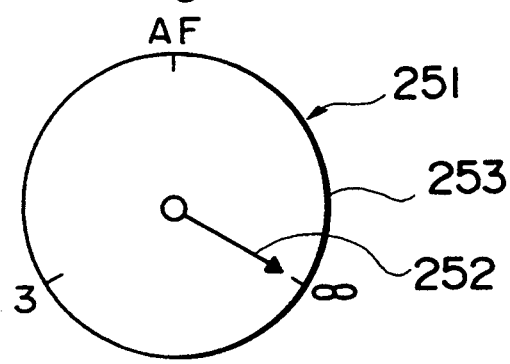
FIG. 22B is a figure showing the display state of a second indicator portion, when focus at infinity mode is set.
Figure 22C:
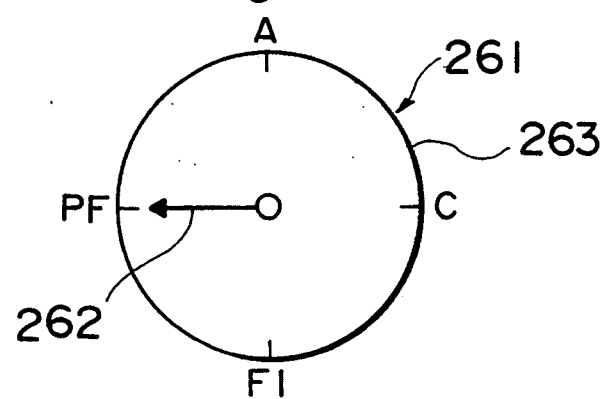
FIG. 22C is a figure showing the display state of a third indicator portion, when pre-flash mode is set.

FIG. 25 is a flow chart showing control program operation for displaying the bulb mode. When the main power switch 223 is in the ON position, and moreover the bulb mode "B" is selected as shown in FIG. 22A by the use of the mode switch 208, then when the switch 213 is turned ON the control circuit 201 starts to execute this control program for displaying the bulb mode.

Figure 26A:
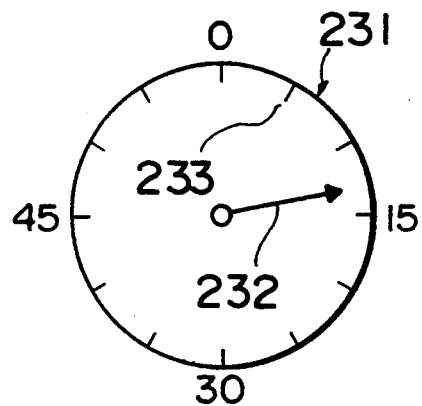
FIGS. 26A through 26D show the movement of the indicating pointer of the large size indicator, during bulb mode.
Figure 26B:
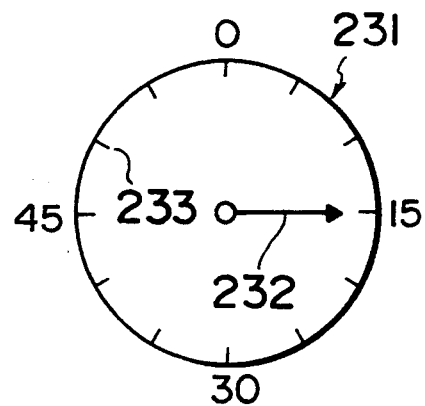
Figure 26C:
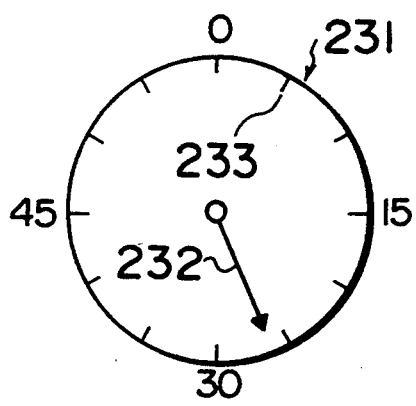

First, in the step S31, the current frame number is stored in the memory, and then in the next step S32 the large indicator pointer 232 of the large indicator 231 is rotated to oppose the index mark on the inscribed scale plate 233 whose position corresponds to the closest multiple of five to the current frame number. For example, supposing that as shown in FIG. 26A the current frame number is thirteen, then as shown in FIG. 26B the large indicator pointer 232 is moved to the index mark corresponding to the closest multiple of five to thirteen, which is fifteen. Next, in the step S33, a decision is made as to whether or not the switch 213 is ON, and if the answer to this decision is YES then the flow of control proceeds next to the decision step S34, while if the answer is NO then the flow of control proceeds next to the step S41. In the step S41, the temporarily stored value of the frame number is read out, and the large indicator pointer 232 is rotated again to the position corresponding thereto and the program of FIG. 25 terminates.

Figure 26D:
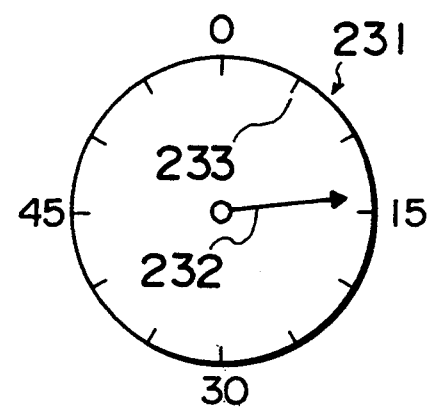

On the other hand, in the decision step S34, a decision is made as to whether or not the release switch 214 is ON, and if the answer to this decision is YES then the flow of control proceeds to the step S35, while if the answer to this decision is NO then the flow of control returns back to the decision step S33 again. In the step S35, the exposure operation is commenced by the exposure and shutter control device 215, and then the flow of control proceeds to the step S36, in which the large indicator pointer 232 of the large indicator 231 starts to count seconds again. For example, the large indicator pointer 232 which as shown in FIG. 26B was positioned to the index mark 15 which was the closest multiple of 5 starts to count seconds again simultaneously with the start of exposure, and 11 seconds afterwards it has attained the position shown in FIG. 26C. Next, in the decision step S37, a decision is made as to whether or not the release switch 214 is ON. If the result of this decision is NO and the release switch 214 is OFF, then the flow of control passes next to the step S38, and the exposure operation is concluded. On the other hand, if the result of this decision is YES, then the flow of control loops back to this step S37 again. From the step S38, control proceeds to the step S39, in which the large indicator pointer 232 is stopped from counting the seconds, and then in the next step S40, as shown in FIG. 26D, the previous frame count is incremented by one, and the large indicator pointer 232 is moved to a position corresponding to this new value of the frame count, i.e. to the position corresponding to 14 minutes past the hour on a clock face.

Now the manner in which the large indicator pointer 232 moves for displaying the elapsed time or the time of day, as well as the frame number, will be explained.

Figure 27A:
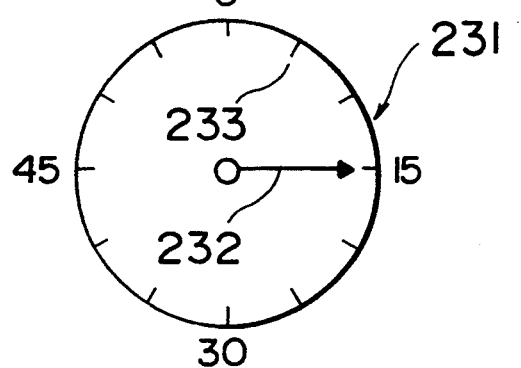
FIGS. 27A and 27B show the movement of the indicating pointer for display of the frame number.
Figure 27B:
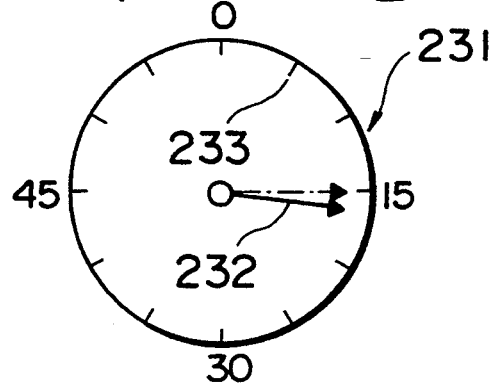
Figure 29A:
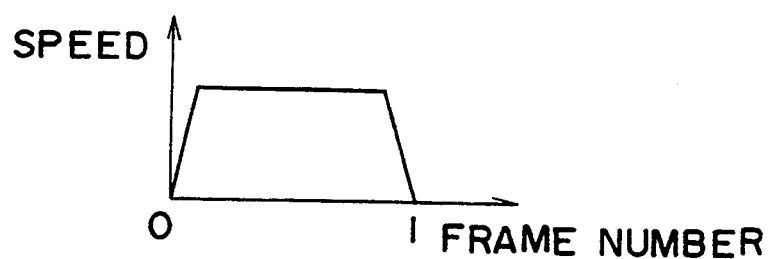
FIG. 29A shows how the rotational speed of the indicating pointer of the large size indicator varies with time, during display of the frame number.

During display of the frame number, when for example the large indicator pointer 232 rotates from the position for 15 frames as shown in FIG. 27A to the position corresponding to 16 frames as shown in FIG. 27B, the movement takes place as shown in FIG. 29A in one movement at a steady speed.

Figure 28:
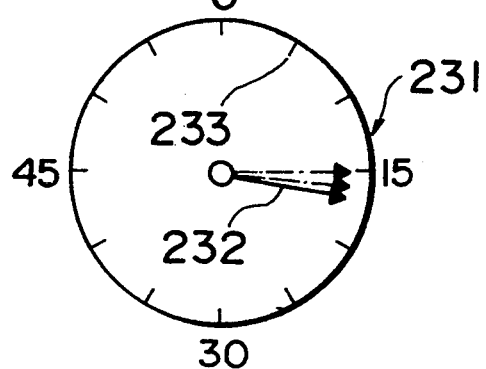
FIG. 28 shows the movement of the indicating pointer of the large size indicator, for display of the elapsed time or the time of day.
Figure 29B:
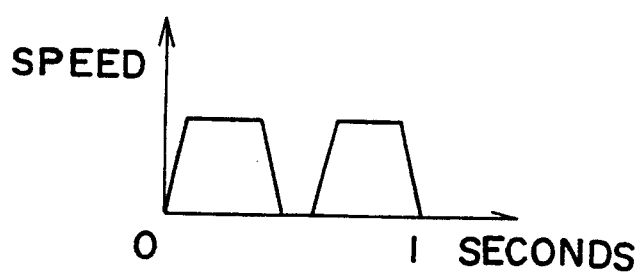
FIG. 29B shows how the rotational speed of the indicating pointer of the large size indicator varies with time, during display of the elapsed time or the time of day.

On the other hand, when for example the large indicator pointer 232 rotates from the position for 15 seconds or minutes as shown in FIG. 28 to the position corresponding to 16 seconds or minutes during display of the elapsed time or the time of day respectively, then the movement takes place as shown in FIG. 29B in a jerky fashion, with the large indicator pointer 232 temporarily stopping for a brief instant about half way between the position for 15 seconds (or minutes) and the position corresponding to 16 seconds (or minutes).

In this way, by driving the large indicator pointer 232 when it is displaying the elapsed time or the time of day so that it moves in a qualitatively different manner, i.e. a jerky manner, from when it is displaying the frame number when it moves in a smooth manner, it is easily possible for a user of the camera to distinguish immediately by inspection of the large indicator 231 what data are currently being indicated thereby.

Furthermore, even when the frame number is being indicated on the large indicator 231 and the camera is in a condition ready for taking a photograph, if bulb mode is selected the display of the elapsed time or the time of day is again performed, and therefore it is possible to perform photography in bulb mode while checking the exposure time.

Figure 30A:
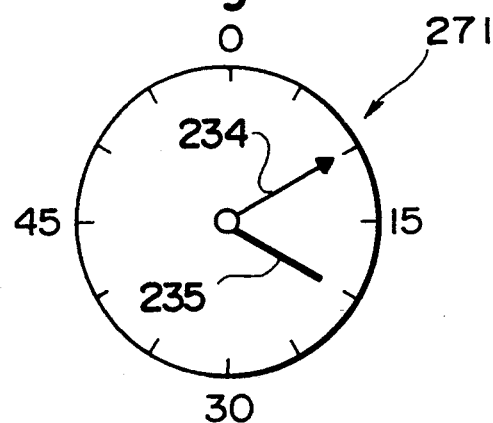
FIG. 30A and FIG. 30B show an indicator device with two pointers.
Figure 30B:
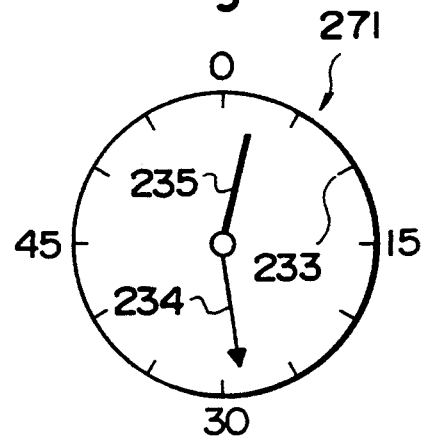

With the second preferred embodiment as described above the indicator device was provided with a single indicator pointer, but this is not to be considered as limitative of the present invention, and it is also considered to be an acceptable alternative to provide several indicator pointers. FIGS. 30A and 30B show an indicator device with two pointers, according to a variant of this second preferred embodiment.

To a large indicator 271 there are provided a long indicator pointer 234 and a short indicator pointer 235. When the main power switch 223 is set to the OFF position, the long indicator pointer 234 and the short indicator pointer 235 are used in cooperation to show the elapsed time or the time of day, while when said main power switch 223 is set to the ON position and the camera is in the state of being ready to take a photograph said long indicator pointer 234 is used to show the frame number. Now, since the construction, except for the details of the large indicator 271, is the same as that described above for the first variant of this second preferred embodiment and shown in FIGS. 19 and 20, therefore the details thereof will be abridged in the interests of brevity of description.

FIG. 31 is a flow chart showing the operation of a control program for controlling in time of day display mode the indicator device of FIG. 30A and FIG. 30B. By executing this program, when the main power switch 223 is set to the OFF position the control device 201 displays the time of day on the large indicator 271, while on the other hand when said main power switch 223 is set to the ON position and the camera is in the state of being ready to take a photograph the control device 201 displays the frame number on said large indicator 271.

In the first step S51, display of the time of day is performed on the large indicator 271 by positioning the long indicator pointer 234 and the short indicator pointer 235 thereof according to information which is input from the clock 207. Control then passes to the next decision step S52, in which a decision is made as to whether or not the main power switch 223 is in the ON position, i.e. whether the camera is in a state capable of taking a photograph. If the result of this decision is YES then the flow of control passes next to the step S53, while if the result of this decision is NO then the flow of control returns to loop back to the step S51 again.

In the step S53 the frame number, previously stored in the memory 216 of the camera the last time it was used for photography, is read out again, and then the flow of control passes to the next step S54, in which the input of time information from the clock 207 is stopped, and next control passes to the step S55. In this step S55, the dummy time of zero hours n minutes is set, and then control passes to the step S56, in which the long indicator pointer 234 and the short indicator pointer 235 are rotationally moved so as to display this dummy time of zero hours n minutes. Here, since the value of n is set to be the frame number the last time the camera was used for photography, effectively, the large indicator 271 comes to display the current frame number. The position of the short indicator pointer 235 at this time thus has no special meaning. For example, if the frame number n the last time the camera was used for photography is 29, then as shown in FIG. 30B the long indicator pointer 234 will be positioned at the 29 minutes past the hour position so as to indicate the current frame number, and, although according to the conventional manner of indicating the time 12:29 on an analog clock the short indicator pointer 235 will be positioned approximately halfway between the hour position and the five minutes past the hour position, this does not mean anything in particular.

After this step S56, the flow of control passes to the next decision step S57, in which a decision is made as to whether or not a count signal has been input from the frame number counting device 212, which accompanies and indicates that the shooting of the current photograph has been completed. If the result of this decision is YES and a photograph has in fact been shot, then the flow of control passes next to the step S58, while if the result of this decision is NO and no photograph has yet been shot, then the flow of control skips to the decision step S61.

In the step S58 the frame number count n is incremented by 1, and the flow of control passes to the step S59, in which the long indicator pointer 234 and the short indicator pointer 235 are moved, in the same manner as in the step S56 described above, to indicate the new frame number n which has been incremented. Thereby the displayed frame number is kept in step with the actual number of frames of film shot. The flow of control next passes to the step S60, in which the current incremented value of the frame number n is stored in the memory 216, and then the flow of control passes to the decision step S61. In this decision step S37, a decision is made as to whether or not the main power switch 223 is set to the OFF position. If the result of this decision is NO, then the flow of control returns back to the decision step S57, while if the result of this decision is YES, then the flow of control returns back to the step S51.

With this embodiment of the indicator device of the present invention in which two indicator pointers are provided, there may be some problem for the user of the camera to distinguish between the display of the time of day performed in the OFF mode with the long indicator pointer 234 acting as the minute hand and the short indicator pointer 235 acting as the hour hand (or of the elapsed time with the long indicator pointer 234 acting as the second hand and the short indicator pointer 235 acting as the minute hand), and the display of the frame number performed at other times with the long indicator pointer 234 indicating the current frame number. Accordingly it is considered to be a valid possibility, in OFF mode, for the first through the third small indicators 242, 252, and 262 of the small indicators 241, 251, and 261, which are not being used for their normal purposes at this time, to be rotated at a constant rotational speed together in unison, so that during OFF mode it is clearly shown that the elapsed time or the time of day is being displayed.

In this manner, when the camera is in a condition ready for photography, the large indicator pointer 232 of the large indicator 231 moves through six degrees of arc each time a photograph is taken so as to indicate the current frame number to the user of the camera; while on the other hand, when the camera is in a condition ready for photography, said large indicator pointer 232 moves through six degrees every minute, or alternatively every second, so as to show the time of day or the elapsed time. Accordingly, this indicator device is effective for accurately and simply displaying both these sorts of information in manners which are basically compatible, and accordingly photography can be performed easily and without trouble.

Although the above descriptions were made in terms of indication to the camera user of the number of frames shot, which parameter was used as an example of an item of information related to photography, other possibilities are also valid, and should be considered as being within the scope of the present invention.

Preferred Embodiment 3

The third preferred embodiment of the indicator device of the present invention will now be described. With this third preferred embodiment, the display portion for the value of the parameter whose contents must be changed is selected from among a plurality of indicators according to the operation of common control switches, and the indicator pointer of this indicator is positioned at an intermediate point between one index mark and another of its scale plate, in order to indicate that this indicator is the one that is displaying the parameter whose value is to be changed.

Figure 32:
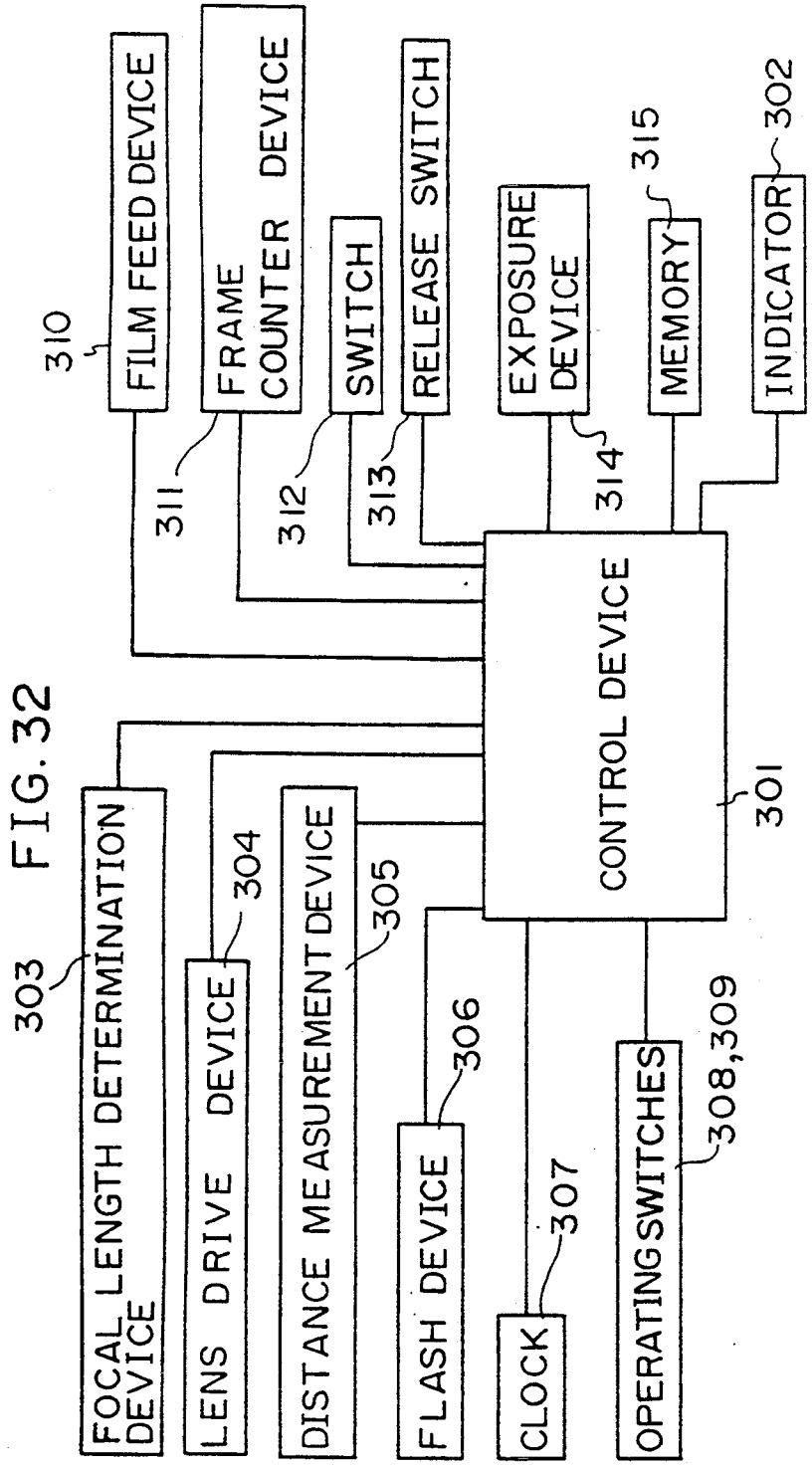
FIG. 32 is a block diagram showing the construction of a camera equipped with an indicator device according to the third preferred embodiment of the present invention.

FIG. 32 is a block diagram showing the construction of a camera equipped with an indicator device according to this third preferred embodiment.

A control circuit 301 comprises a microcomputer and its associated circuitry (neither of them particularly shown), and, along with performing sequence control for this camera and also various calculation functions, this control circuit 301 controls an indicator device 302.

To the control circuit 301 there are connected a focal length determination device 303, a lens movement device 304, a distance measurement device 305, a flash device 306, a clock 307, and two control switches 308 and 309. The focal length determination device 303 determines the focal length of the photographic lens (not shown in the figure). The lens movement device 304 moves said photographic lens according to command signals which it receives from the control circuit 301. The distance measurement device 305 measures the photographic distance from this camera to the object which is to be photographed. The flash device 306 illuminates the object to be photographed, according to command signals which it receives from the control circuit 301. The clock 307 outputs information relating to the date and the time to the control circuit 301. And the control switches 308 and 309 function as operation elements for changing the parameters whose contents are displayed in various indicators included in the indicator device 302. In detail, the control switch 308 is a switch for selecting from the plurality of indicators that particular indicator for which the value of the parameter displayed thereon should be changed, and the control switch 309 is a switch for actually changing the value of said parameter displayed on said particular indicator selected by said control switch 308.

Further, there are also connected to the control circuit 301 a film feed device 310, a frame number counting device 311, a switch 312, a release switch 313, an exposure and shutter control device 314, the indicator device 302, and a memory 315. The film feed device 310 rolls the film on forwards from frame to frame, and when required rewinds the film again. The frame number counting device 311 counts the number of frames of film that have been shot. The switch 312 is turned ON, as will be explained later, when the release button is initially depressed (i.e. is so called first stroke pressed), while the release switch 313 is turned ON when said release button is fully depressed (i.e. is so called second stroke pressed). The exposure and shutter control device 314 performs exposure of the film by controlling the operation of an iris mechanism and a shutter mechanism neither of which is shown in the figures. And the memory 315 stores the position of the indicator pointer of the indicator device 302.

Figure 33:
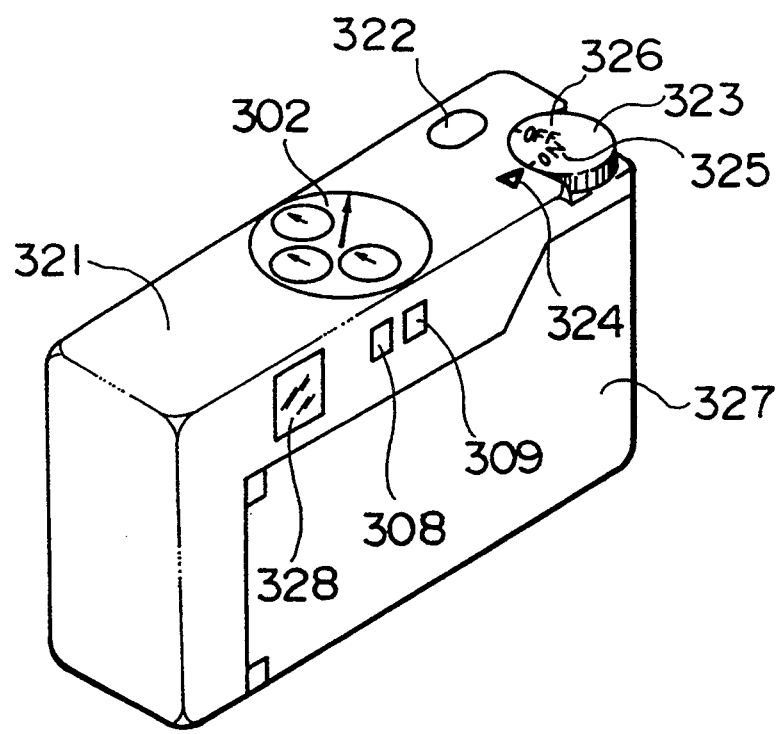
FIG. 33 is a perspective view as seen from the rear of a camera equipped with said indicator device according to the third preferred embodiment of the present invention.

FIG. 33 is a perspective view as seen from the rear of a camera equipped with an indicator device according to the third preferred embodiment of the present invention.

On the upper surface of the main body 321 of the camera there are provided the indicator device 302 for displaying various sorts of information, a release button 322, and a main switch 323. Further, on the rear surface of the camera main body 321, there are provided a film door 327, a viewfinder 328, and the previously mentioned control switches 308 and 309.

When the main switch 323 is turned so that the mark 325 consisting of the letters "ON" which it bears registers against the arrow 324 which is inscribed on the camera main body 321, then the camera is turned ON, i.e. is put into the state in which it is enabled for photography; and then the control switches 308 and 309 and the other controls become available for operation. On the other hand, when the main switch 323 is turned so that the mark 326 consisting of the letters "OFF" which it bears registers against the arrow 324, then the camera is turned OFF, i.e. is put into the state in which it is disabled for photography; and then none of the controls are available for operation.

Figure 34:
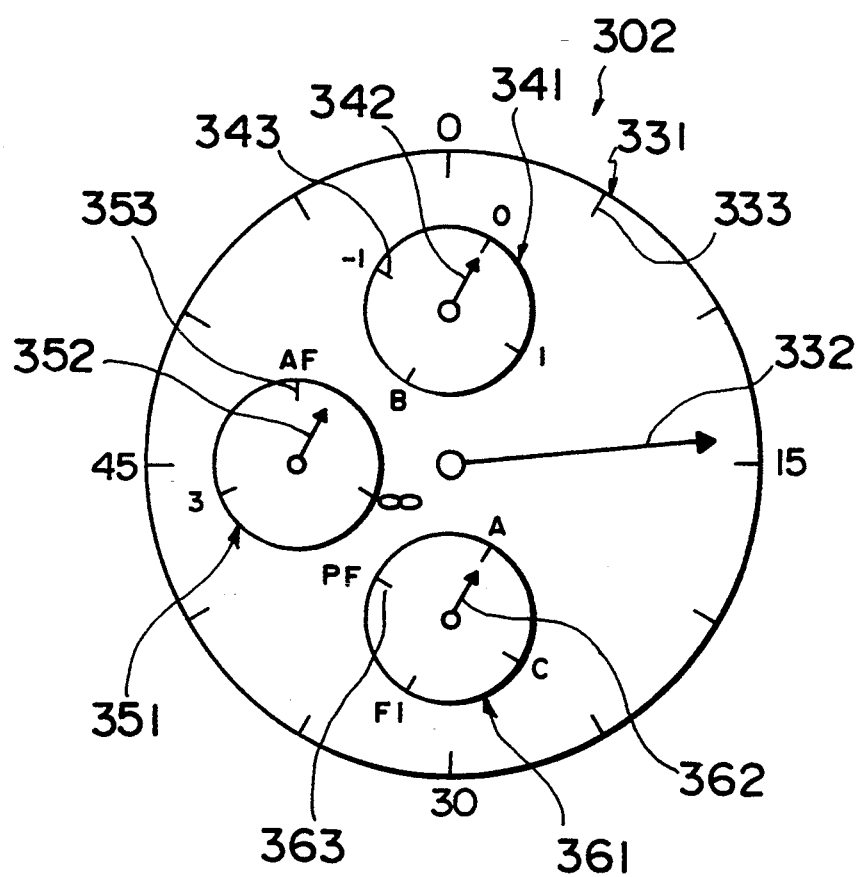
FIG. 34 is an enlarged view of the indicator device shown in FIG. 33.

FIG. 34 is an enlarged view of the indicator device 302 according to the third preferred embodiment shown in FIG. 33.

This indicator device 302 comprises a large indicator 331 and a first small indicator 341, a second small indicator 351, and a third small indicator 361 all provided within the boundary of said large indicator 331.

The large indicator 331 comprises a large indicator pointer 332 which is driven by a stepper motor not shown in the figure, and an inscribed scale plate 333, and shows the number of frames of film that have been shot. On this inscribed scale plate 333, index marks are inscribed at positions corresponding to the hours in the case of a clock face, i.e. every thirty degrees, and further, at the three o'clock, six o'clock, nine o'clock, and twelve o'clock positions on the scale plate there are written the numbers "15", "30", "45", and "0" respectively: these numbers symbolize corresponding frame numbers. The single large indicator pointer 332 is moved six degrees clockwise over the inscribed scale plate 333 every time a new photograph is taken (i.e. another frame is shot), and accordingly said large indicator pointer 332 frequently stops between the index marks. However, when this happens, because the angular distance through which said large indicator pointer 332 moves for one frame of film is the same as the angular distance through which the minute hand of a clock moves for one minute or the second hand moves for one second (both being six degrees), therefore, even though the large indicator pointer 332 is between one index mark and another, the user of the camera, by analogy to a normal analog clock, will easily be able to read the frame number. As an example in FIG. 34 the large indicator pointer 332 is shown as pointing at the fourteen minutes past the hour position, thus indicating that the current frame number is fourteen, as will be understood via the use of analogy and intuition by any person who can easily read an analog clock face.

The first small indicator 341 comprises a small indicator pointer 342 which is driven by a stepper motor not shown in the figure, and an inscribed scale plate 343, and shows the correction mode for the exposure amount. On this inscribed scale plate 343, index marks are inscribed at positions corresponding to the quarters in the case of a clock face, i.e. every ninety degrees at the three o'clock, six o'clock, nine o'clock, and twelve o'clock positions, where there are inscribed the symbols "1", "B", "−1", and "0" respectively: the symbol "0" represents the mode in which no exposure correction is performed, the symbol "1" represents the mode in which a single level of positive correction is performed, the symbol "−1" represents the mode in which a single level of negative correction is performed, and the symbol "B" represents the bulb mode. The symbols "1", "B", "−1" and "0" are disposed like 0, 3, 6, 9 on a clock face, but somewhat tilted clockwise from their usual angular positions. After by the use of the control switch 308 the first small indicator 341 has been selected as that one of the indicators the contents of the parameter represented upon which will be changed, the small indicator pointer 342 is moved ninety degrees in the clockwise direction every time the control switch 309 is operated, and accordingly the exposure amount correction mode is cycled around between the no correction mode, the single level of positive correction mode, the bulb mode, and the single level of negative correction mode. As an example in FIG. 34 the small indicator pointer 342 is shown as pointing at the "0" position, and thus the first small indicator 341 is indicating that the no exposure correction mode is the current one.

The second small indicator 351 comprises a small indicator pointer 352 which is driven by a stepper motor not shown in the figure, and an inscribed scale plate 353, and shows the focus adjustment mode for the camera lens. On this inscribed scale plate 353, index marks are inscribed at positions corresponding to twenty minutes past the hour, forty minutes past the hour, and the hour in the case of a clock face, i.e. every hundred and twenty degrees at the four o'clock, eight o'clock, and twelve o'clock positions, where there are inscribed the symbols "infinity", "3", and "AF" respectively: the symbol "infinity" represents a mode in which the lens of the camera is focused accurately upon an object to be photographed at infinity and is fixed and not altered, the symbol "3" represents a fixed focus mode in which the lens of the camera is focused accurately upon an object to be photographed at three meters distance (which is a frequently used distance for photography) and is fixed and not altered, and the symbol "AF" represents the auto focus mode. After by the use of the control switch 308 the second small indicator 351 has been selected as that one of the indicators the contents of the parameter represented upon which will be changed, the small indicator pointer 352 is moved one hundred and twenty degrees in the clockwise direction every time the control switch 309 is operated, and accordingly the focus adjustment mode is cycled around between the auto focus mode, the infinity focus mode, and the fixed three meter focus mode.

The third small indicator 361 comprises a small indicator pointer 362 which is driven by a stepper motor not shown in the figure, and an inscribed scale plate 363, and shows the flash photography mode. On this inscribed scale plate 363, index marks are inscribed at positions corresponding to the quarters in the case of a clock face, i.e. every ninety degrees at the three o'clock, six o'clock, nine o'clock, and twelve o'clock positions, where there are inscribed the symbols "A", "C", "FI", and "PF" respectively: the symbol "A" represents the automatic flash mode, the symbol "C" represents the no flash mode, the symbol "FI" represents the forced flash mode, and the symbol "PF" represents the pre flash mode. (These terms have been explained earlier in this specification). The symbols "A", "C", "FI" and "PF" are disposed like 0, 3, 6, 9 on a clock face, but somewhat tilted clockwise from their usual angular positions. After by the use of the control switch 308 the second small indicator 351 has been selected as that one of the indicators the contents of the parameter represented upon which will be changed, the small indicator pointer 352 is moved ninety degrees clockwise every time the control switch 309 is pressed, and accordingly the focus mode is cycled around between the auto focus mode, the infinity focus mode, and the three meter focus mode. As an example in FIG. 34 the small indicator pointer 352 is shown as pointing at the "AF" position, and thus the second small indicator 351 is indicating that the auto focus mode is the current one.

Figure 35:
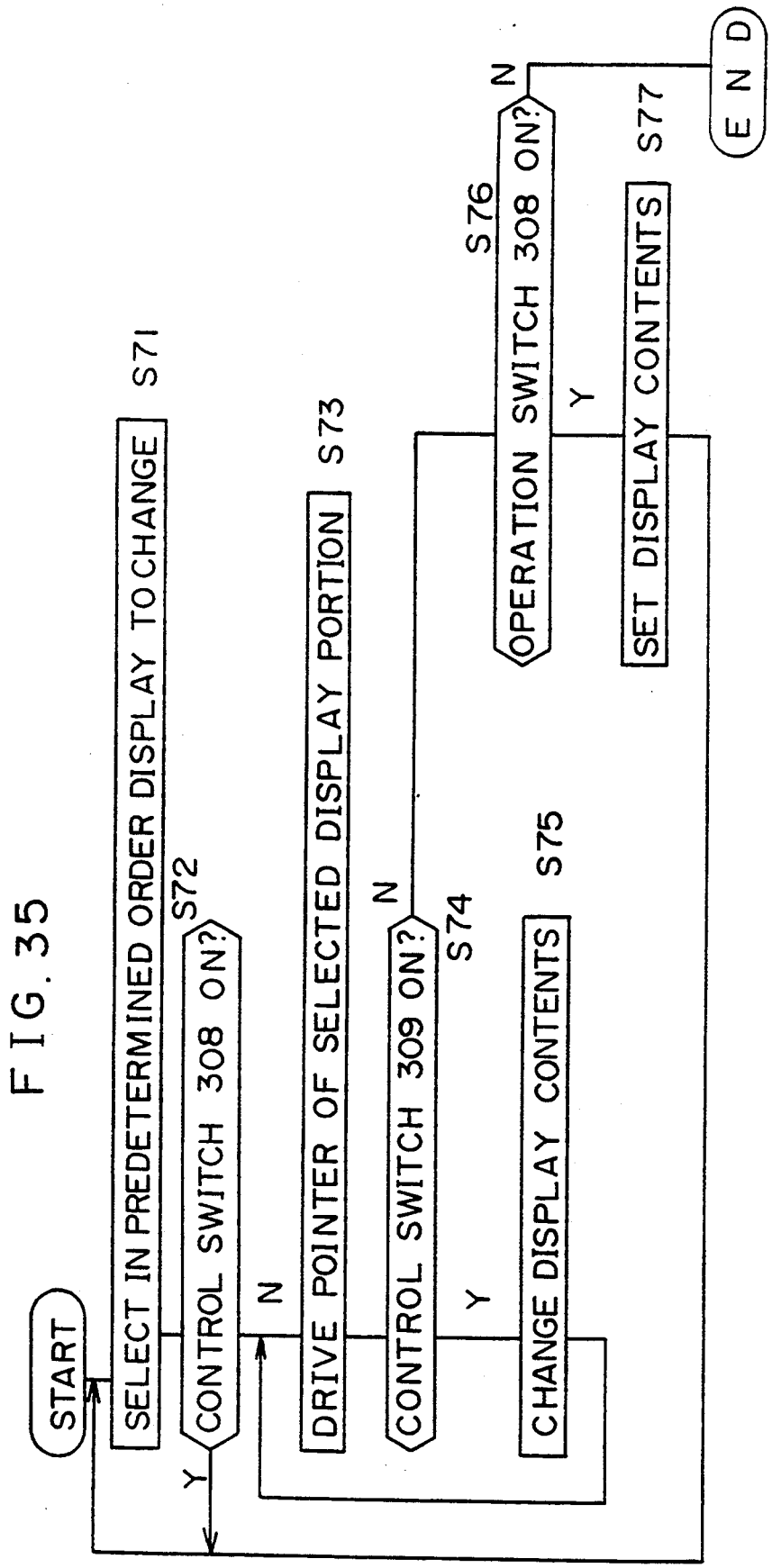
FIG. 35 is a flow chart showing the operation of a control program which is executed by a control circuit incorporating a microcomputer, comprised in the FIG. 33 camera.

FIG. 35 is a flow chart showing the operation of a display control program which is executed by a microcomputer comprised in the control circuit 301 of FIG. 32. The third preferred embodiment will now be explained with reference to this flow chart.

The control circuit 301 starts to execute this control program when the control switch 308 is operated. After the start of operation, in the first step S71 of this program, that display portion of the indicator device 302 of which the parameter whose contents are displayed is to be changed is selected from among the plurality of indicator devices thereon (the first, second, and third small indicators 341, 351, and 361) by the control switch 308 being operated and cycling around said display portions in a predetermined cycle. In the description of this third preferred embodiment, it will be supposed that the predetermined order in which the displays are cycled around is: the first small indicator 341, the second small indicator 351, and the third small indicator 361. Next, in the decision step S72, a decision is made as to whether or not the control switch 308 has been operated. If the result of this decision is YES, then the flow of control returns to loop back to the step S71, so that the next display portion is selected as that one for which the contents of the item displayed thereon are to be altered. On the other hand, if the result of this decision is NO, then the flow of control passes next to the step S73, in which the indicator pointer of the last chosen display portion is drive controlled so as that its position differs from those of the indicator pointers of the other display portions. This is done so that, since the indicator pointer of the display portion selected by operation of the control switch 308 is drive controlled so that its position differs from those of the other non-selected display portions, it is possible for the user of the camera to tell which of the display portions among the plurality of display portions is the one for which the item whose contents are displayed therein should be altered.

Next the flow of control proceeds to the decision step S74, in which a decision is made as to whether or not the control switch 309 is being operated. If the result of this decision is YES, then the flow of control passes next to the step S75. On the other hand, if the result of this decision is NO, then the flow of control passes next to the decision step S76. In the step S75, the indicator pointer of the selected display portion is rotationally driven and thereby the value of the relevant parameter displayed by said indicator pointer is altered, and then the flow of control returns back to the step S73. On the other hand, the flow of control reaches the step S76 if the control switch 309 is not being operated, and in this decision step S76 a decision is made as to whether or not the control switch 308 is being operated. If the result of this decision is YES, then the flow of control passes next to the step S77, while if the result of this decision is NO the execution of this program terminates. In the step S77, on the other hand, the value of the parameter corresponding to the selected display is set to the indication of the indicator pointer thereof, and then the flow of control loops back to the step S71 again, so as to perform the above described processing for the next display portion in order.

Now an example will be explained in detail of how the contents of the parameter represented by the second small indicator 351 of the indicator device 302 is changed, i.e. of how the focus mode is set.

Figure 36:
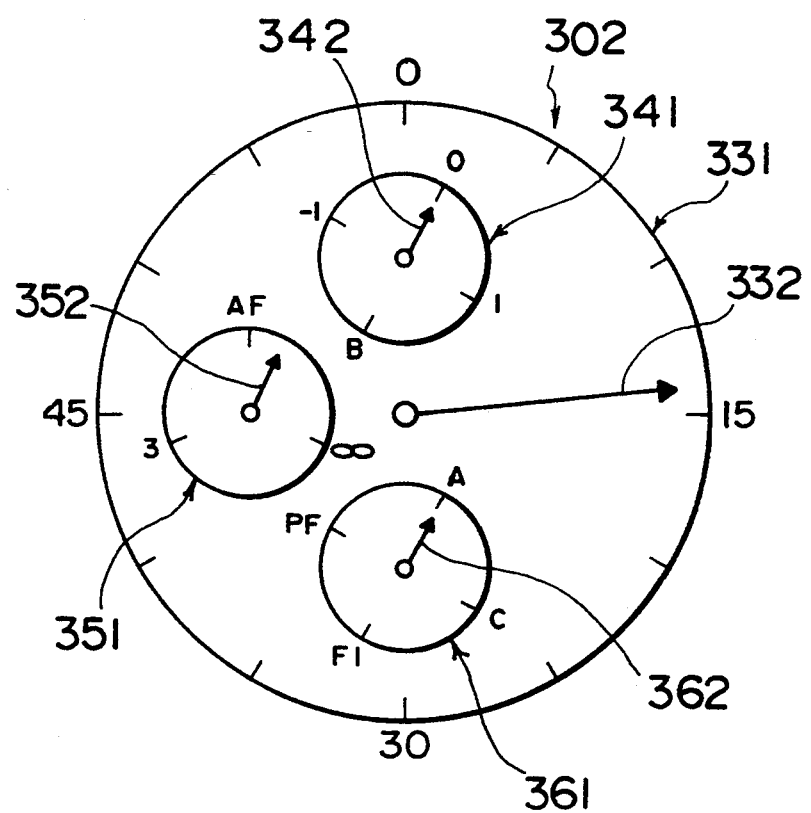
FIGS. 36 through 38 are plan views showing the movement of an indicating pointer of this third preferred embodiment while changing display contents.

When the indicator device 302 is in the condition shown in FIG. 34, if the control switch 308 is operated twice the display for which the parameter displayed thereon will be changed is selected to be the second small indicator 351 (said parameter being the focus mode), and then as shown in FIG. 36 the control circuit 301 drives the indicating pointer 352 of said second small indicator 351 to a position which differs from the position of the indicating pointer 332 of the large indicator 331, the position of the indicating pointer 342 of the first small indicator 341, and the position of the indicating pointer 362 of the third small indicator 361, i.e. to a position intermediate between the symbol "AF" which designates the auto focus mode and the symbol "infinity" which designates the infinity focus mode. At this time, the indicating pointers 332, 342, and 362 of the other indicators 331, 341, and 361 respectively remain in their original positions as shown in FIG. 34, and only the indicating pointer 352 of the second small indicator 351 is moved to an intermediate position between one index mark and another on the scale plate 353, and therefore the user of the camera can easily distinguish that it is this second small indicator 351 for which the value of the parameter displayed thereon (the focus mode) is about to be altered.

Figure 37:
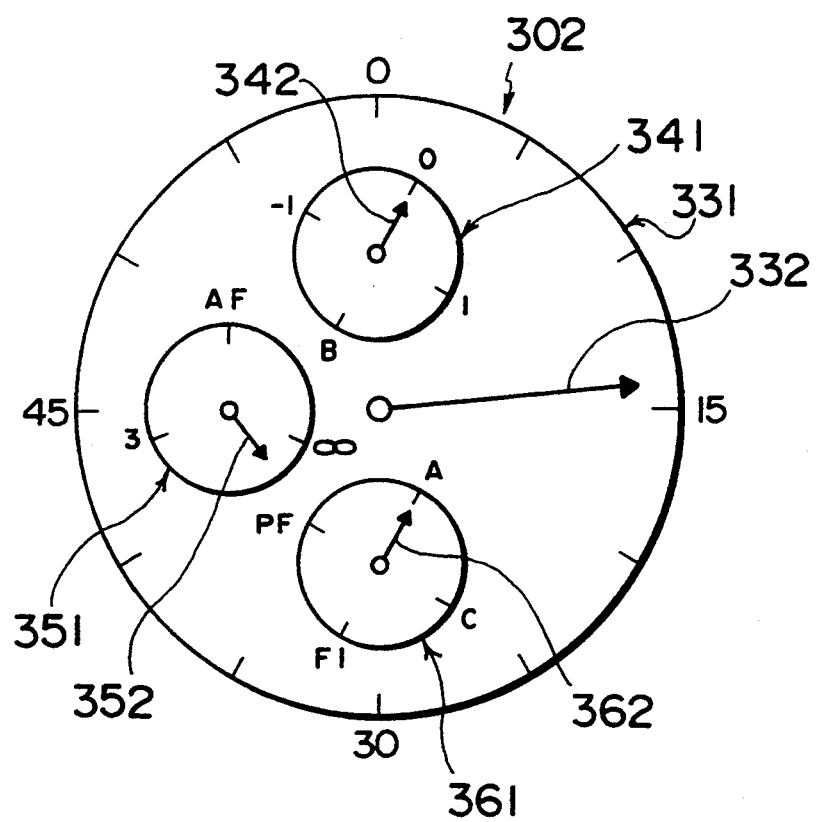
Figure 38:
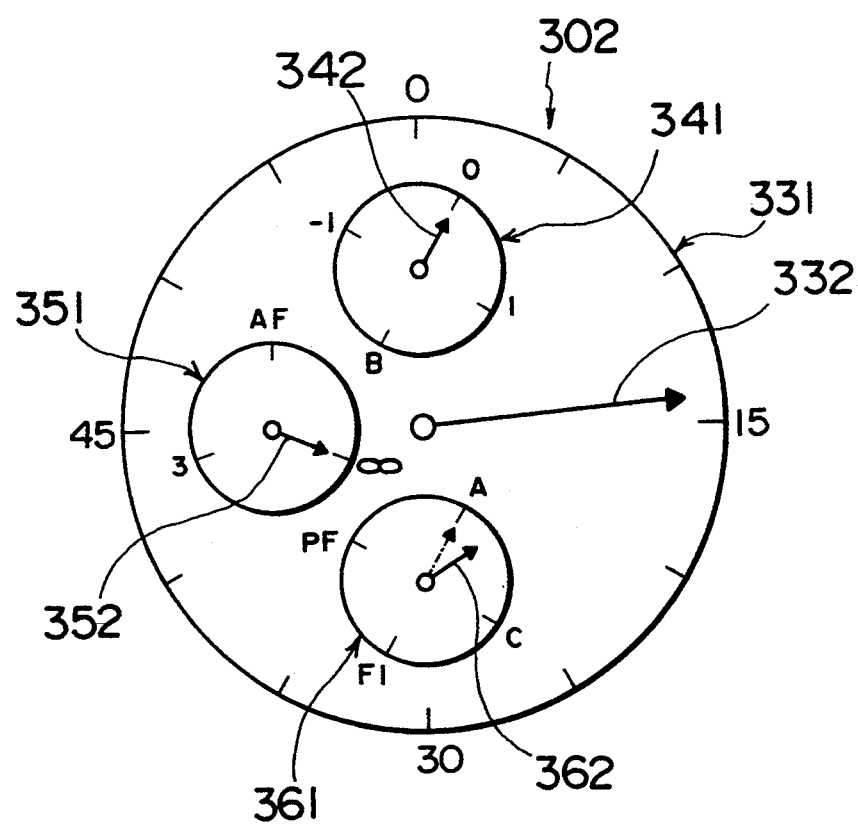

When in this condition of the device the control switch 309 is operated, then as shown in FIG. 37 the control circuit 301 drives the indicating pointer 352 of the second small indicator 351 to a position intermediate between the symbol "infinity" which designates the infinity focus mode and the symbol "3" which designates the three meter focus mode. Further, if from this condition of the device as shown in FIG. 37 next the control switch 308 is operated, then as shown in FIG. 38 the control circuit 301 drives the indicating pointer 352 of the second small indicator 351 to a position against the symbol "infinity" which designates the infinity focus mode; and, corresponding to this, the focus mode is set to the infinity focus mode.

Further, at this time, since the control switch 308 has been pressed, the selected display portion is switched over to the next in sequence, which is the third small indicator 361 for displaying the flash mode. Accordingly the control circuit 301 drives the indicating pointer 362 of said third small indicator 361 from its position as shown in FIGS. 34 and 37 to a position, as shown in FIG. 38, intermediate between the symbol "A" which designates the automatic flash mode and the symbol "C" which designates the no flash mode.

When in this condition of the device the control switch 309 is again operated, then the control circuit 301 drives the indicating pointer 362 of the third small indicator 361 to a position intermediate between the symbol "C" which designates the no flash mode and the symbol "FI" which designates the forced flash mode. Further, if from this condition of the device next the control switch 308 is again operated, then the control circuit 301 drives the indicating pointer 362 of the third small indicator 361 to a position against the symbol "C" which designates the no flash mode; and, corresponding to this, the flash mode is set to the no flash mode.

Now a first variant of this third preferred embodiment will be described.

With this first variant embodiment, when the display portion for the value of the parameter whose contents must be changed is selected from among the plurality of indicators according to the operation of the common control switches, then the indicator pointer of this indicator is positioned at the index mark corresponding to the current value of said parameter and is repeatedly moved rotationally to and fro forwards and backwards from said index mark, i.e. is angular wobbled to and fro about said index mark as a central point, in order to indicate that this indicator is the one which is currently selected and is the one for displaying the parameter whose value is to be changed. Now, since the construction and the basic operation of this variant embodiment are the same as those of the third preferred embodiment described above with reference to FIGS. 32 through 35, accordingly description thereof will be curtailed in the interests of brevity of description, and the following explanation will chiefly focus upon the points of difference between the operation of this first variant and that of the third preferred embodiment.

Figure 39:
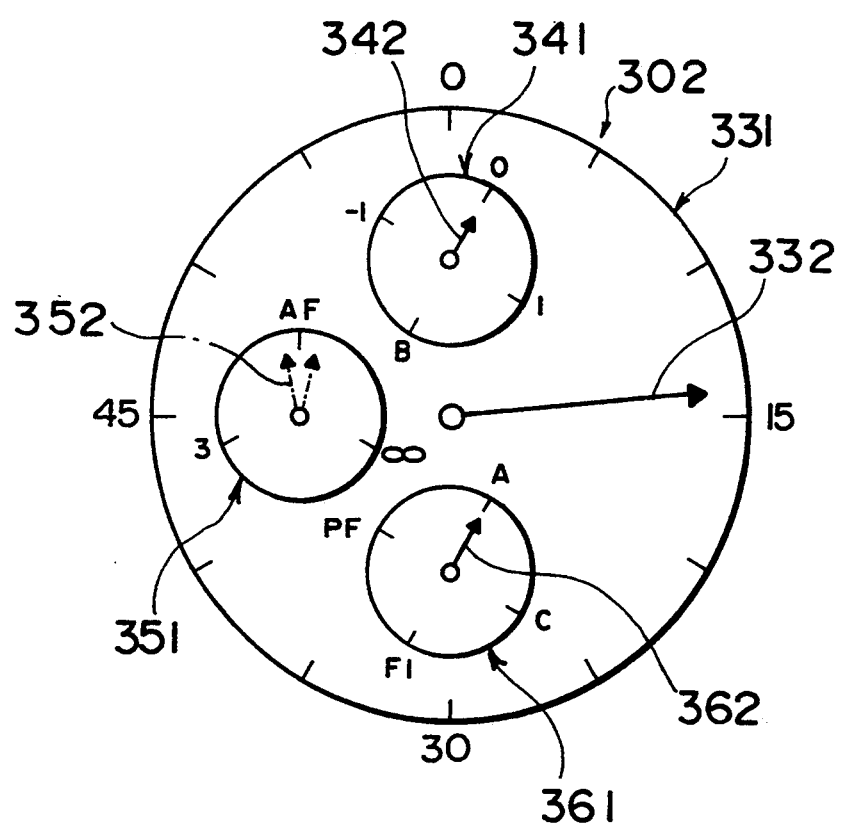
FIG. 39 is a plan view showing the movement of an indicating pointer while changing display contents, in the case of a variant of this third preferred embodiment.

When the indicator device 302 is in the condition shown in FIG. 34, and when the control switch 308 is operated twice, the display for which the parameter displayed thereon will be changed is selected to be the second small indicator 351 (said parameter being the focus mode), and then as shown in FIG. 39 the control circuit 301 drives the indicating pointer 352 of said second small indicator 351 to a position and in a manner which differs from the position of and the manner of driving the indicating pointer 332 of the large indicator 331, the position of and the manner of driving the indicating pointer 342 of the first small indicator 341, and the position of and the manner of driving the indicating pointer 362 of the third small indicator 361: i.e., the indicating pointer 352 is driven to a position against the symbol "AF" which designates the auto focus mode, and then is angular wobbled to and fro about this position as a central point. At this time, the indicating pointers 332, 342, and 362 of the other indicators 331, 341, and 361 respectively remain in their original positions as shown in FIG. 34, and only the indicating pointer 352 of the second small indicator 351 is wobbled to and fro about an index mark on the scale plate 353, and therefore the user of the camera can easily distinguish that it is this second small indicator 351 for which the value of the parameter displayed thereon (the focus mode) is about to be altered.

When in this condition of the device the control switch 309 is operated, then the control circuit 301 drives the indicating pointer 352 of the second small indicator 351 to a position against the symbol "infinity" which designates the infinity focus mode, and then angular wobbles said indicating pointer 352 to and fro about this position as a central point. Further, if from this condition of the device next the control switch 308 is operated, then the control circuit 301 stops wobbling the indicating pointer 352 of the second small indicator 351 to and fro about the symbol "infinity" which designates the infinity focus mode, and leaves it fixed there; and, corresponding to this, the focus mode is set to the infinity focus mode.

Further, at this time, since the control switch 308 has been pressed, the selected display portion is switched over to the next in sequence, which is the third small indicator 361 for displaying the flash mode. Accordingly the control circuit 301 drives the indicating pointer 362 of said third small indicator 361 so as to wobble it angular to and fro about the symbol "A" which designates the automatic flash mode. And when in this condition of the device the control switch 309 is again operated, then the control circuit 301 drives the indicating pointer 362 of the third small indicator 361 to a position against the symbol "C" which designates the no flash mode, and then wobbles it angular about said position. Further, if from this condition of the device next the control switch 308 is again operated, then the control circuit 301 stops wobbling the indicating pointer 362 of the third small indicator 361 about this position against the symbol "C" which designates the no flash mode, and leaves it fixed there; and, corresponding to this, the flash mode is set to the no flash mode.

Now a second variant of this third preferred embodiment will be described.

With this second variant embodiment, when the display portion for the value of the parameter whose contents must be changed is selected from among the plurality of indicators according to the operation of the common control switches, then the indicator pointer of this indicator is rotated continuously in a clockwise direction, in order to indicate that this indicator is the one which is currently selected and is the one for displaying the parameter whose value is to be changed. Now, since the construction and the basic operation of this variant embodiment are the same as those of the third preferred embodiment described above with reference to FIGS. 32 through 35, accordingly description thereof will be curtailed in the interests of brevity of description, and the following explanation will chiefly focus upon the points of difference between the operation of this second variant and that of the third preferred embodiment.

Figure 40:
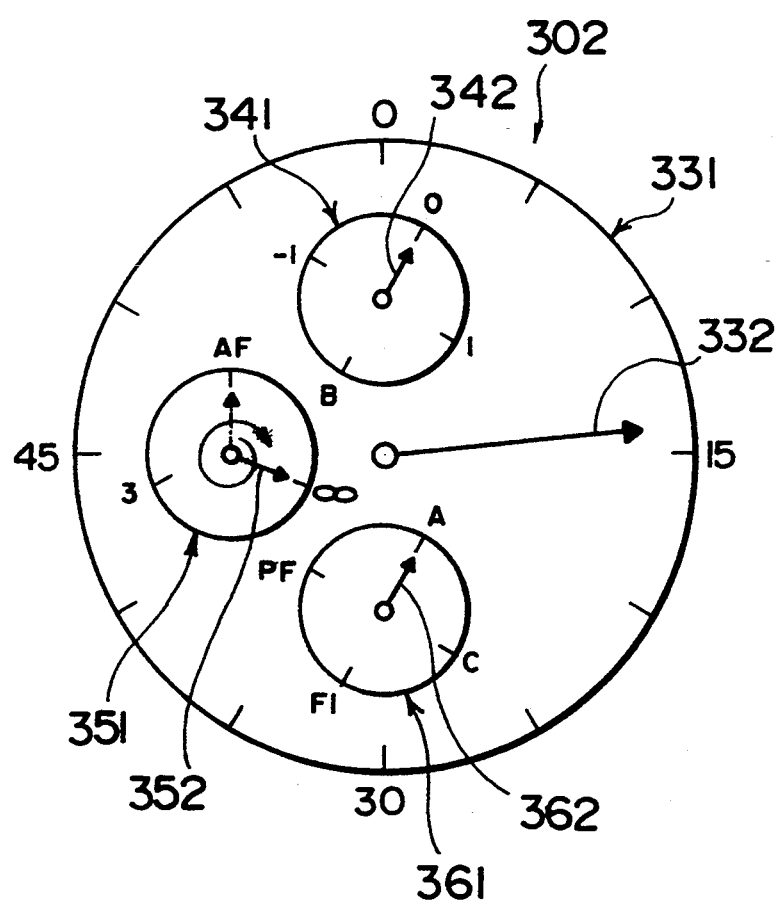
FIG. 40 is a plan view showing the movement while changing display contents of an indicating pointer, in the case of another variant of the third preferred embodiment.

When the indicator device 302 is in the condition shown in FIG. 34, and when the control switch 308 is operated twice, the display for which the parameter displayed thereon will be changed is selected to be the second small indicator 351 (said parameter being the focus mode), and then as shown in FIG. 40 the control circuit 301 drives the indicating pointer 352 of said second small indicator 351 in a manner which differs from the manner of driving the indicating pointer 332 of the large indicator 331, the manner of driving the indicating pointer 342 of the first small indicator 341, and the manner of driving the indicating pointer 362 of the third small indicator 361: i.e., the indicating pointer 352 is rotated steadily in the clockwise direction at a fixed rotational speed. At this time, the indicating pointers 332, 342, and 362 of the other indicators 331, 341, and 361 respectively remain stationary in their original positions as shown in FIG. 34, and only the indicating pointer 352 of the second small indicator 351 is steadily rotated, and therefore the user of the camera can easily distinguish that it is this second small indicator 351 for which the value of the parameter displayed thereon (the focus mode) is about to be altered.

When in this condition of the device the control switch 309 is operated, then the control circuit 301 stops rotating the indicating pointer 352 of the second small indicator 351 just at the position of the next index point on the scale plate 353. If from this condition the control switch 309 is again operated, then the indicating pointer 352 starts rotating again, until the control switch 308 is pressed again, when the indicating pointer 352 stops rotating and is pointed at the position of the next index point on the scale plate 353. On the other hand, if from this condition of the device next the control switch 308 is operated, then the control circuit 301 leaves the indicating pointer 352 of the second small indicator 351 in this stationary position against the symbol "infinity" which designates the infinity focus mode; and, corresponding to this, the focus mode is set to the infinity focus mode. Further, at this time, since the control switch 308 has been pressed, the selected display portion is switched over to the next in sequence, which is the third small indicator 361 for displaying the flash mode, and accordingly the control circuit 301 drives the indicating pointer 362 of said third small indicator 361 so as to rotate it steadily. And when in this condition of the device the control switch 309 is again operated, then the control circuit 301 stops the indicating pointer 362 of the third small indicator 361, for setting the flash mode, in a manner which will be easily understood by one of ordinary skill in the relevant art based upon the disclosures herein.

In this manner, with regard to the plurality of display portions on which various information related to photographic conditions is displayed by rotating the indicating pointers above and against the scale plates which are inscribed with the index marks.

Thus it is seen that there are provided several display portions for displaying information relating to photographic conditions, each comprising a rotatable pointer which is movable over a scale plate in order to display said information, and the two common control switches 308 and 309 are provided for changing the value of the parameter displayed on each of the indicator devices. First the control switch 308 is operated in order to select one of the display portions, according to a predetermined order thereof. The indicator pointer of each display portion, as it is selected in turn, is moved in a manner different from when it is displaying its item of information relating to photography, in order to show that this is the selected display portion. Then, by the other control switch 309 being operated, the value of the particular item of information displayed by this selected display portion may be altered. In this manner, although only the two control switches 308 and 309 are provided, this suffices for altering the values of all of the plurality of items of information displayed on the plurality of display portions, as desired. Thereby economies are obtained in terms of space for disposing these control switches, and it is nevertheless easy for the user of the camera to distinguish which one among the plurality of display portions is the one the value of the item displayed on which is being altered. Thereby operation of the camera when setting items of photographic information is facilitated.

Furthermore, in the above disclosed versions of the third preferred embodiment of the indicator device of the present invention, either the indicator pointer of the display portion was set to a position on the scale plate intermediate between one index mark and another, or alternatively said indicator pointer was set to an index mark and was wobbled to and fro about said index mark, or alternatively said index pointer was steadily rotated in the clockwise direction, and thereby in any of the above cases it was possible for the user of the camera to tell which of the display portions among the plurality of display portions was the one for which the item whose contents are displayed therein was about to be altered. However, these particular possibilities should not be taken as limitative of the third preferred embodiment: the manner in which the indicator pointer of the display portion for which the item whose contents are displayed therein is about to be altered is moved, in order to make it clear to the user of the camera that said display portion is the one currently in question, is not necessarily limited to the three above described forms of motion: other possibilities are also within the scope of this third preferred embodiment.

Further, although in the above descriptions as an example the third preferred embodiment of the indicator device of the present invention was described under the assumption that the information related to conditions of photography displayed on the plurality of displays thereof was the exposure correction mode, the focus adjustment mode, and the flash mode, this is not to be taken as limitative, since other alternatives are possible within the scope of the present invention.

Preferred Embodiment 4

The fourth preferred embodiment of the indicator device of the present invention will now be described with reference to FIG. 41, which is a perspective view as seen from the rear of a camera equipped with an indicator device according to said fourth preferred embodiment.

On the upper surface of the main body 401 of the camera there are provided a release button 402, a main switch 403, and the indicator device 404 for displaying various sorts of information. Further, on the rear surface of the camera main body 401, there are provided a film door 405, a viewfinder 406, a mode switch 407, and a display alteration switch 408.

When the main switch 403 is turned so that the mark 409 consisting of the letters "ON" which it bears registers against the arrow 410 which is inscribed on the camera main body 401, then the camera is turned ON, i.e. is put into the state in which it is enabled for photography; and then the mode switch 407, the display alteration switch 408, and the other controls become available for operation. On the other hand, when the main switch 403 is turned so that the mark 411 consisting of the letters "OFF" which it bears registers against the arrow 410, then the camera is turned OFF, i.e. is put into the state in which it is disabled for photography; and then none of the controls are available for operation.

Figure 41:
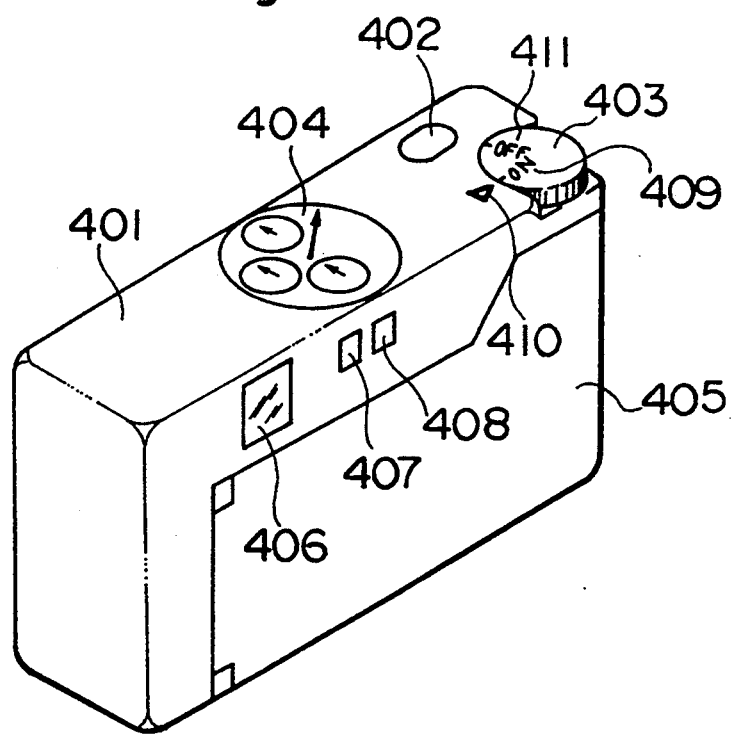
FIG. 41 is a perspective view as seen from the rear of a camera equipped with an indicator device according to the fourth preferred embodiment of the present invention.
Figure 42:
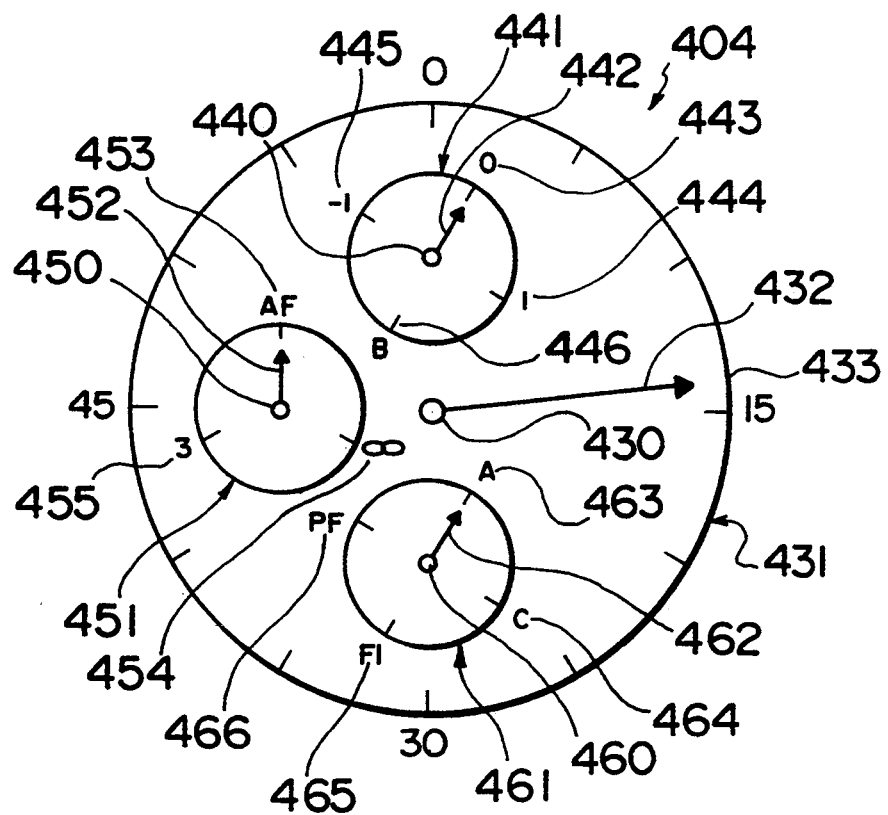
FIG. 42 is an enlarged view of said indicator device included in the camera shown in FIG. 41.

FIG. 42 is an enlarged view of the indicator device 404 according to the fourth preferred embodiment shown in FIG. 41.

This indicator device 404 comprises a frame number indicator 431, an exposure correction mode indicator 441, a focus adjustment mode indicator 451, and a flash mode indicator 461 all provided within the boundary of said frame number indicator 431. The mode switch 407 is a switch for selecting from among the display portions 441, 451, and 461 a one thereof for which it is desired to alter the value of the parameter represented thereon, and the display alteration switch 408 is for altering the value of the parameter represented on that one of the display portions 441, 451, and 461 which is thus selected according to the operation of the mode switch 407.

The frame number indicator 431 comprises a large indicator pointer 432 which is driven by a stepper motor not shown in the figure so as to rotate around an axis 430 over an inscribed scale plate 433, and shows the number of frames of film that have been shot. On this inscribed scale plate 433, index marks are inscribed at positions corresponding to the hours in the case of a clock face, i.e. every thirty degrees, and further, at the three o'clock, six o'clock, nine o'clock, and twelve o'clock positions on the scale plate there are written the numbers "15", "30", "45", and "0" respectively: these numbers symbolize corresponding frame numbers. The single large indicator pointer 432 is moved six degrees clockwise over the inscribed scale plate 433 every time a new photograph is taken (i.e. another frame is shot), and accordingly said large indicator pointer 432 frequently stops between the index marks. However, when this happens, because the angular distance through which said large indicator pointer 432 moves for one frame of film is the same as the angular distance through which the minute hand of a clock moves for one minute or the second hand moves for one second (both being six degrees), therefore, even though the large indicator pointer 432 is between one index mark and another, the user of the camera, by analogy to a normal analog clock, will easily be able to read the frame number. As an example in FIG. 42 the large indicator pointer 432 is shown as pointing at the fourteen minutes past the hour position, thus indicating that the current frame number is fourteen, as will be understood via the use of analogy and intuition by any person who can easily read an analog clock face.

The exposure correction mode indicator 441 comprises a small indicator pointer 442 which is driven by a stepper motor not shown in the figure and which rotates around an axis 440 over a circular portion of the inscribed scale plate 433, and shows the correction mode for the exposure amount. On this portion of the inscribed scale plate 433, four index marks are inscribed at positions corresponding to the quarters in the case of a clock face, i.e. every ninety degrees at the three o'clock, six o'clock, nine o'clock, and twelve o'clock positions, and: next to the index mark 443 inscribed at the twelve o'clock position there is inscribed the symbol "0", which represents the mode in which no exposure correction is performed, next to the index mark 444 inscribed at the three o'clock position there is inscribed the symbol "1" which represents the mode in which a single level of positive correction is performed, next to the index mark 445 inscribed at the nine o'clock position there is inscribed the symbol "−1" which represents the mode in which a single level of negative correction is performed, and next to the index mark 446 inscribed at the six o'clock position there is inscribed the symbol "B" which represents the bulb mode. The bulb mode is a mode in which exposure is performed while and as long as the release button 402 is pressed. As an example in FIG. 42 the small indicator pointer 442 is shown as pointing at the "0" position, and thus the exposure correction mode indicator 441 is indicating that the no exposure correction mode is the current one. After by the use of the mode switch 407 the exposure correction mode indicator 441 has been selected as that one of the indicators the contents of the parameter represented upon which will be changed, the small indicator pointer 442 is moved ninety degrees in the clockwise direction every time the display alteration switch 408 is operated, and accordingly the exposure amount correction mode is cycled around between the no correction mode, the single level of positive correction mode, the bulb mode, and the single level of negative correction mode.

The focus adjustment mode indicator 451 comprises a small indicator pointer 452 which is driven by a stepper motor not shown in the figure and which rotates around an axis 450 over a circular portion of the inscribed scale plate 433, and shows the focus adjustment mode for the camera lens. On this portion of the inscribed scale plate 433, three index marks are inscribed at positions corresponding to twenty minutes past the hour, forty minutes past the hour, and the hour in the case of a clock face, i.e. every hundred and twenty degrees at the four o'clock, eight o'clock, and twelve o'clock positions, and: next to the index mark 453 inscribed at the twelve o'clock position there is inscribed the symbol "AF", which represents the auto focus mode, next to the index mark 454 inscribed at the four o'clock position there is inscribed the symbol "infinity" which represents a mode in which the lens of the camera is focused accurately upon an object to be photographed at infinity and is fixed and not altered, and next to the index mark 455 inscribed at the eight o'clock position there is inscribed the symbol "3" which represents a fixed focus mode in which the lens of the camera is focused accurately upon an object to be photographed at three meters distance (which is a frequently used distance for photography) and is fixed and not altered. As an example in FIG. 42 the small indicator pointer 452 is shown as pointing at the "AF" position, and thus the focus adjustment mode indicator 442 is indicating that the auto focus mode is the current one. After by the use of the mode switch 407 the focus adjustment mode indicator 451 has been selected as that one of the indicators the contents of the parameter represented upon which will be changed, the small indicator pointer 452 is moved one hundred and twenty degrees in the clockwise direction every time the display alteration switch 408 is operated, and accordingly the focus adjustment mode is cycled around between the auto focus mode, the infinity focus mode, and the fixed three meter focus mode.

The flash mode indicator 461 comprises a small indicator pointer 462 which is driven by a stepper motor not shown in the figure and which rotates around an axis 460 over a circular portion of the inscribed scale plate 433, and shows the flash photography mode. On this portion of the inscribed scale plate 433, four index marks are inscribed at positions corresponding to the quarters in the case of a clock face, i.e. every ninety degrees at the three o'clock, six o'clock, nine o'clock, and twelve o'clock positions, and: next to the index mark 463 inscribed at the twelve o'clock position there is inscribed the symbol "A" which represents the automatic flash mode for use in dark conditions, next to the index mark 464 inscribed at the three o'clock position there is inscribed the symbol "C" which represents the no flash mode, next to the index mark 465 inscribed at the six o'clock position there is inscribed the symbol "FI" which represents the forced flash mode, and next to the index mark 466 inscribed at the nine o'clock position there is inscribed the symbol "PF" which represents the pre flash mode for reduction of the so called red eye effect. (These terms have been explained earlier in this specification). After by the use of the mode switch 407 the flash mode indicator 461 has been selected as that one of the indicators the contents of the parameter represented upon which will be changed, the small indicator pointer 462 is moved ninety degrees clockwise every time the display alteration switch 408 is pressed, and accordingly the flash mode is cycled around between the auto flash mode, the no flash mode, the forced flash mode, and the pre flash mode. As an example in FIG. 42 the small indicator pointer 462 is shown as pointing at the "A" position, and thus the flash mode indicator 461 is indicating that the auto flash mode is the current one.

Pressing the mode switch 407 which is disposed on the rear surface of the camera main body 401 switches the indicator device 404 as a whole in a cycle around the following modes: a reset mode in which the values of none of the parameters displayed on the indicators 431, 441, 451, and 461 can be altered; a mode in which the exposure correction mode displayed on the indicator 441 can be altered; a mode in which the focus adjustment mode displayed on the indicator 451 can be altered; and a mode in which the flash mode displayed on the indicator 461 can be altered.

Figure 43:
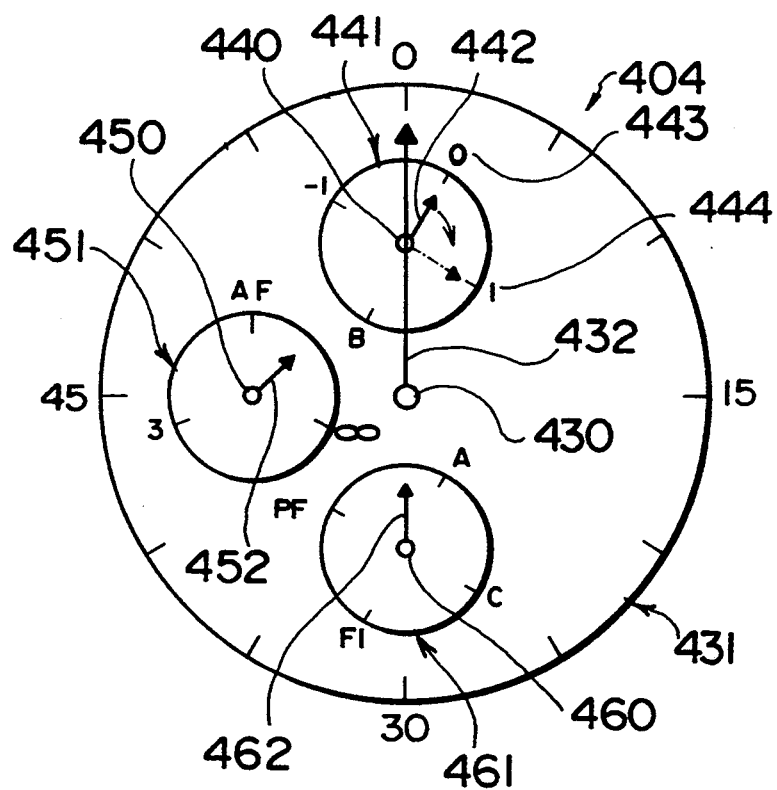
FIG. 43 is a figure showing the display state of the indicator device, when display change mode for an exposure correction indicator portion is set.

If from the reset mode the mode switch 407 is pressed once, then the exposure correction mode alteration mode is selected, in which the value of the parameter displayed on the exposure correction mode indicator 441 can be altered. FIG. 43 shows the state of the indicator device 404 at this time. As for the state at this time of the indicator devices other than this exposure correction mode indicator 441, i.e. the frame number indicator 431, the focus adjustment mode indicator 451, and the flash mode indicator 461, the current values of the parameters displayed thereon are stored in a storage device, and their indicator pointers 432, 452 and 462 are moved to point in predetermined directions having no connection with the present values of their parameters, in this case in the appropriate directions to point through the rotational axis 440 of the indicator pointer 442 of the exposure correction mode indicator 441, which shows that the value displayed thereon is now alterable. On the other hand, when the display alteration mode is returned to the reset mode, then the indicator pointers 432, 452, and 462 are returned to their positions corresponding to the respective values which were stored in the storage device.

If the display alteration switch 408 is pressed in the exposure correction mode alteration mode in which the value shown on the exposure correction mode indicator 441 can be altered, each time said switch 408 is pressed, the indicator pointer 442 of said exposure correction mode indicator 441 is rotated ninety degrees in the clockwise direction, so as to point at, in order in a cycle: the index mark 444 representing the single level of positive correction mode, the index mark 446 representing the bulb mode, the index mark 445 representing the single level of negative correction mode, and the index mark 443 representing the no exposure correction mode. In FIG. 43 as an example it is shown that the display alteration switch 408 has just been pressed for the first time, so that the indicator pointer 442 is enroute, moving towards the index mark 444 representing the single level of positive correction mode.

Figure 44:
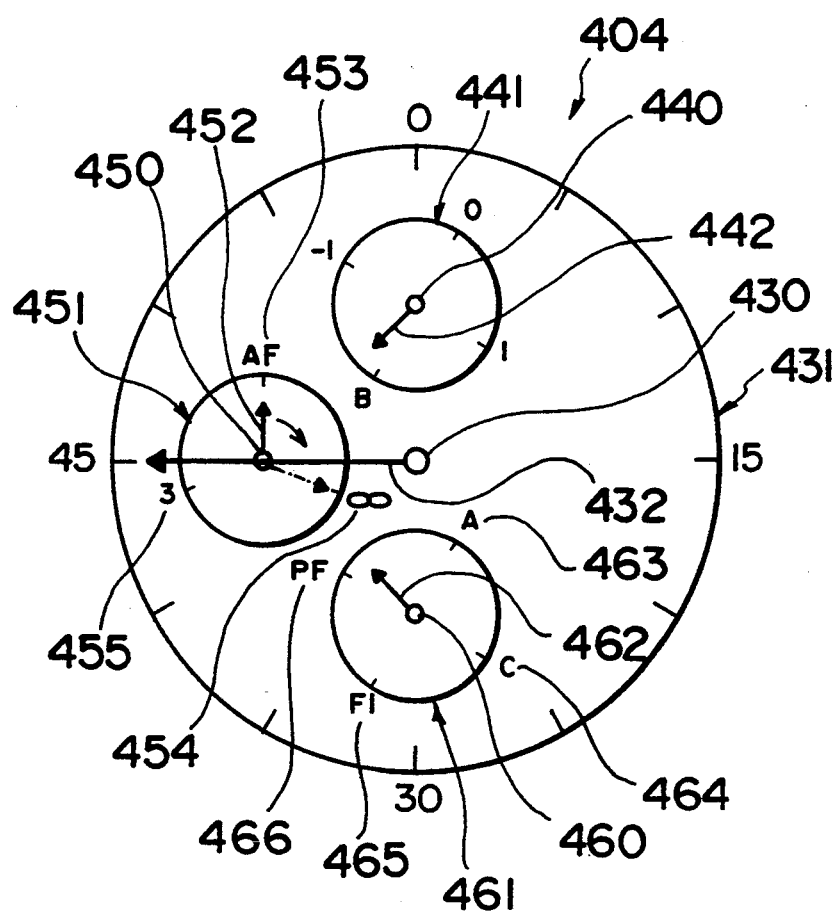
FIG. 44 is a figure showing the display state of the indicator device, when display change mode for a focus adjustment mode indicator portion is set.

If in the state shown in FIG. 43 the mode switch 407 is pressed once, then the exposure correction mode is set to the single level of positive correction mode, and the focus adjustment mode alteration mode is selected, in which the value of the parameter displayed on the focus adjustment mode indicator 451 can be altered. FIG. 44 shows the state of the indicator device 404 at this time. As for the state at this time of the indicator devices other than this focus adjustment mode indicator 451, i.e. the frame number indicator 431, the exposure correction mode indicator 441, and the flash mode indicator 461, the current values of the parameters displayed thereon are stored in the storage device, and their indicator pointers 432, 442 and 462 are moved to point in predetermined directions having no connection with the present values of their displayed parameters, in this case in the appropriate directions to point through the rotational axis 450 of the indicator pointer 452 of the focus adjustment mode indicator 451, which shows that the value displayed thereon is now alterable. On the other hand, when the display alteration mode is returned to the reset mode, then the indicator pointers 432, 442, and 462 are returned to their positions corresponding to the respective values which were stored in the storage device.

If the display alteration switch 408 is pressed in the exposure correction mode alteration mode in which the value shown on the focus adjustment mode indicator 451 can be altered, each time said switch 408 is pressed, the indicator pointer 452 of said focus adjustment mode indicator 451 is rotated one hundred and twenty degrees in the clockwise direction, so as to point at, in order in a cycle: the index mark 454 representing the infinity focus mode, the index mark 455 representing the three meter focus mode, and the index mark 453 representing the auto focus mode. In FIG. 44 as an example it is shown that the display alteration switch 408 has just been pressed for the first time, so that the indicator pointer 452 is enroute, moving towards the index mark 454 representing the infinity focus mode.

Figure 45:
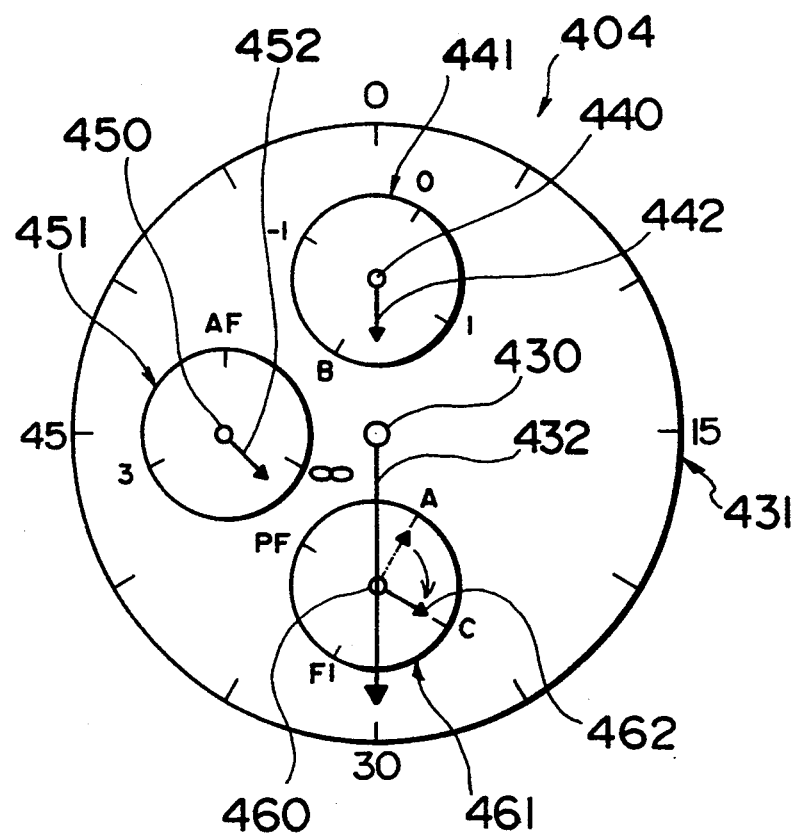
FIG. 45 is a figure showing the display state of the indicator device, when display change mode for a flash mode indicator portion is set.

If in the state shown in FIG. 44 the mode switch 407 is pressed once, then the focus adjustment mode is set to the infinity focus mode, and the flash mode alteration mode is selected, in which the value of the parameter displayed on the flash mode indicator 461 can be altered. FIG. 45 shows the state of the indicator device 404 at this time. As for the state at this time of the indicator devices other than this flash mode indicator 461, i.e. the frame number indicator 431, the exposure correction mode indicator 441, and the focus adjustment mode indicator 451, the current values of the parameters displayed thereon are stored in the storage device, and their indicator pointers 432, 442 and 452 are moved to point in predetermined directions having no connection with the present values of their parameters, in this case in the appropriate directions to point through the rotational axis 460 of the indicator pointer 462 of the flash mode indicator 461, which shows that the value displayed thereon is now alterable. On the other hand, when the display alteration mode is returned to the reset mode, then the indicator pointers 432, 442, and 452 are returned to their positions corresponding to the respective values which were stored in the storage device.

If the display alteration switch 408 is pressed in the flash mode alteration mode in which the value shown on the flash mode indicator 461 can be altered, each time said switch 408 is pressed, the indicator pointer 462 of said flash mode indicator 461 is rotated ninety degrees in the clockwise direction, so as to point at, in order in a cycle: the index mark 464 representing the no flash mode, the index mark 465 representing the forced flash mode, the index mark 466 representing the pre flash mode, and the index mark 463 representing the auto flash mode. In FIG. 45 as an example it is shown that the display alteration switch 408 has just been pressed for the first time, so that the indicator pointer 462 is enroute, moving towards the index mark 464 representing the no flash mode.

Figure 46:
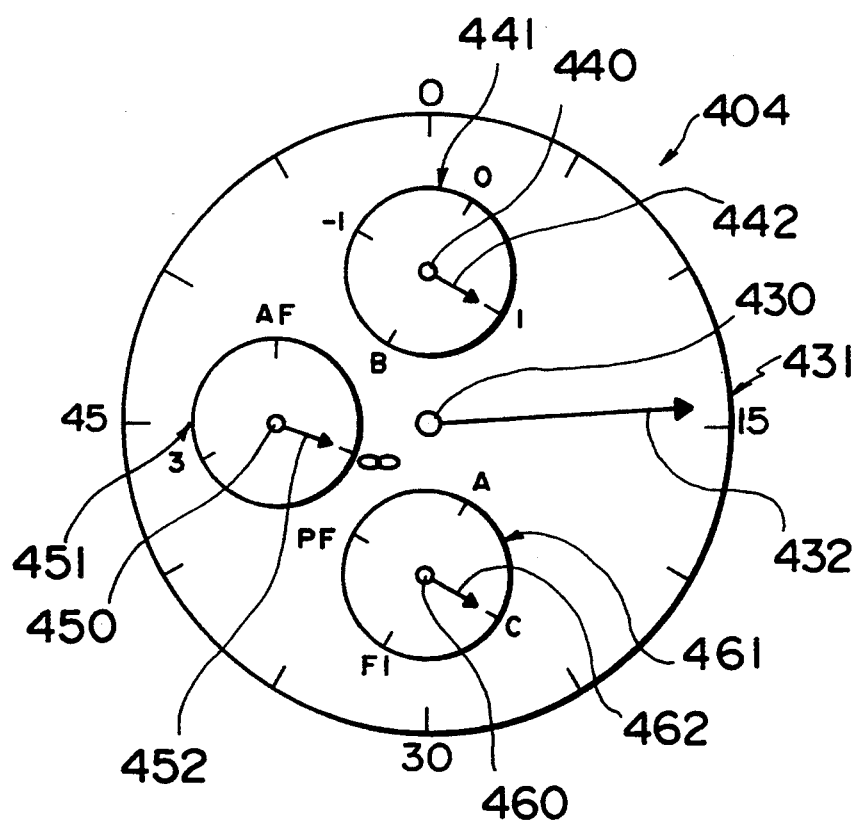
FIG. 46 is a figure showing the display state of the indicator device, when display change mode is switched over to reset mode.

If in the state shown in FIG. 45 the mode switch 407 is pressed once, then the flash mode is set to the no flash mode, and the reset mode is selected, in which the current values of the parameters displayed on the indicator devices other than the flash mode indicator 461, i.e. on the frame number indicator 431, on the exposure correction mode indicator 441, and on the focus adjustment mode indicator 451, are restored from their values which were stored in the storage device, so that their indicator pointers 432, 442 and 452 are moved again to point in the appropriate directions for the present values of their parameters. FIG. 46 shows the state of the indicator device 404 at this time, with (as an example) the frame number indicator 431 showing a frame number of 14, the exposure correction mode indicator 441 showing the one step of positive correction mode, the focus adjustment mode indicator 451 showing the infinity focus mode, and the flash mode indicator 461 showing the no flash mode.

Figure 47:
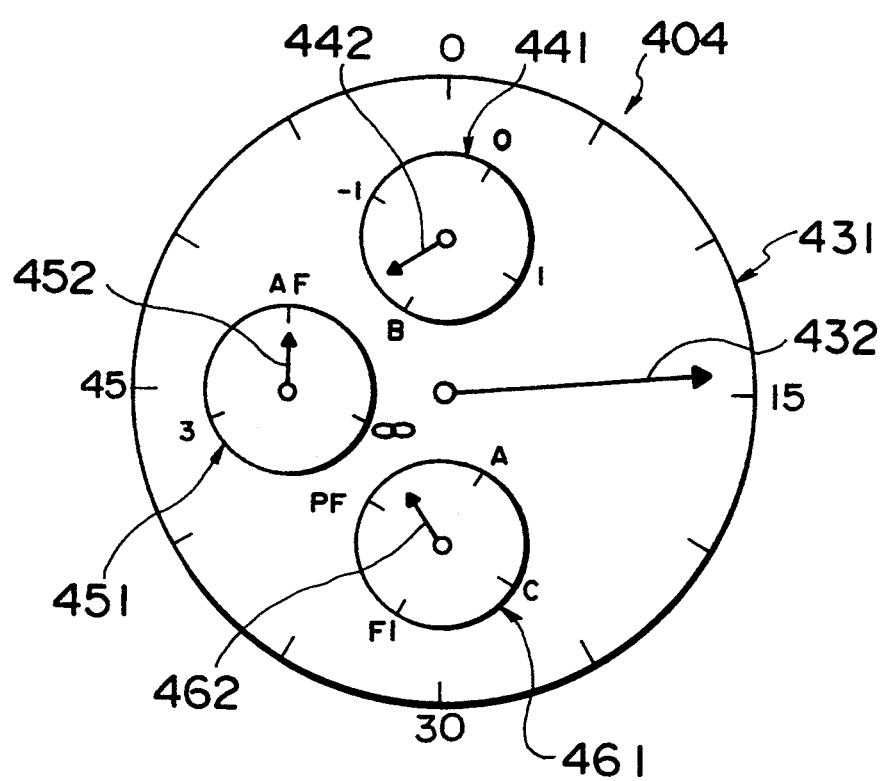
FIGS. 47 and 48 are examples of display on the indicator device, according to a variant of the fourth preferred embodiment, when display change mode for a focus adjustment mode portion is set.
Figure 48:
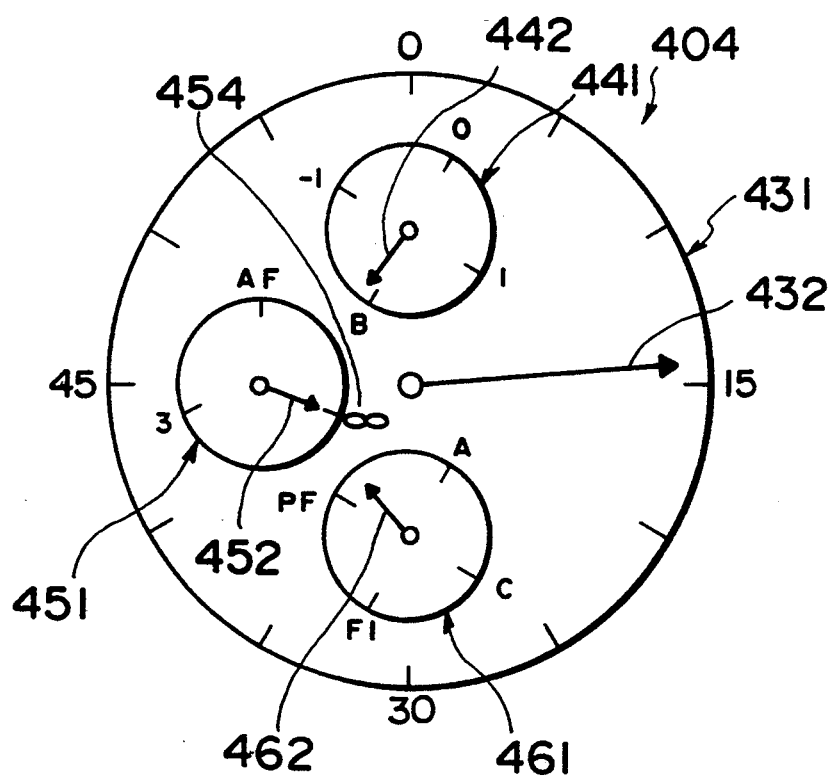
Figure 50B:
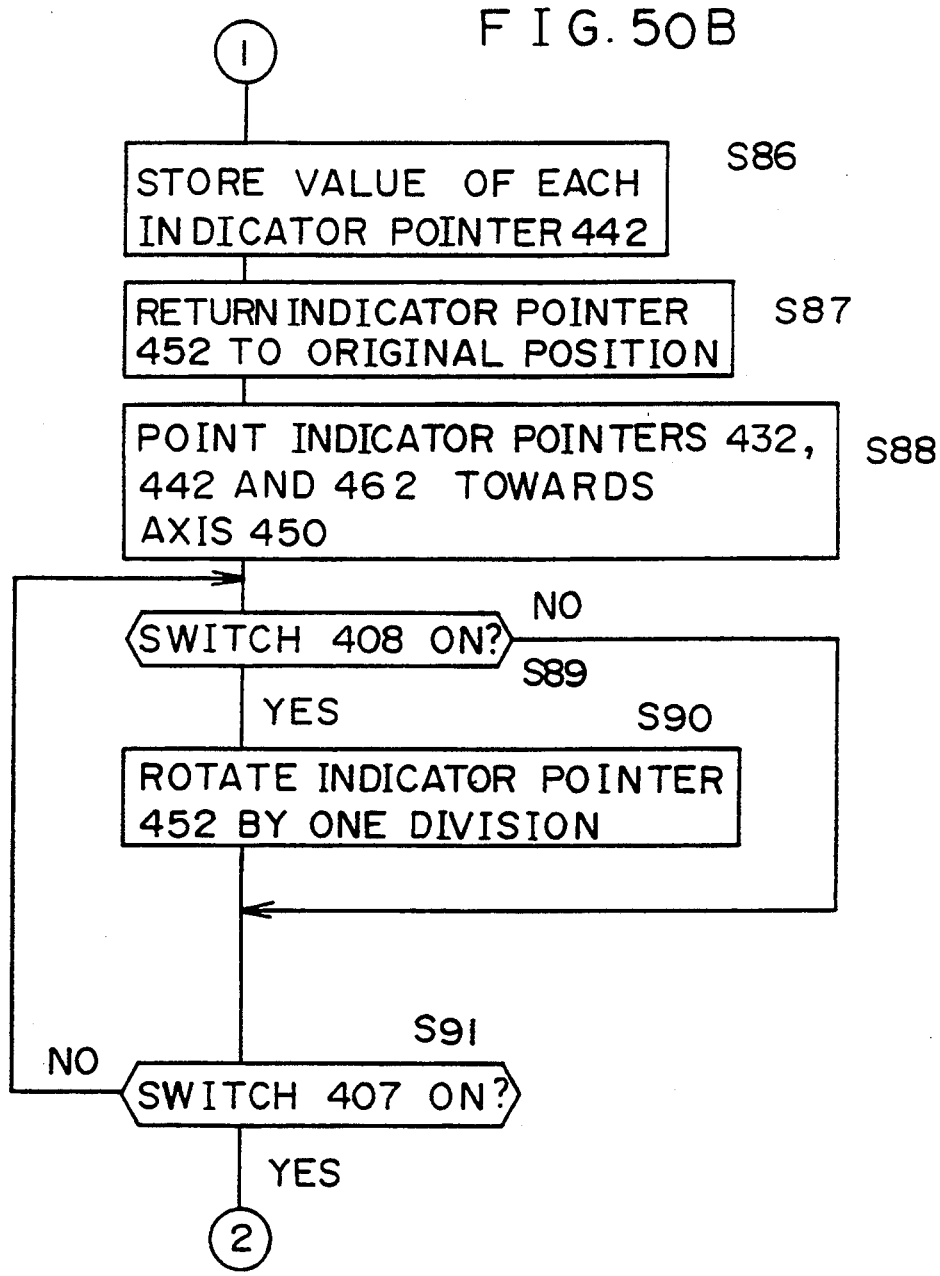
Figure 50D:
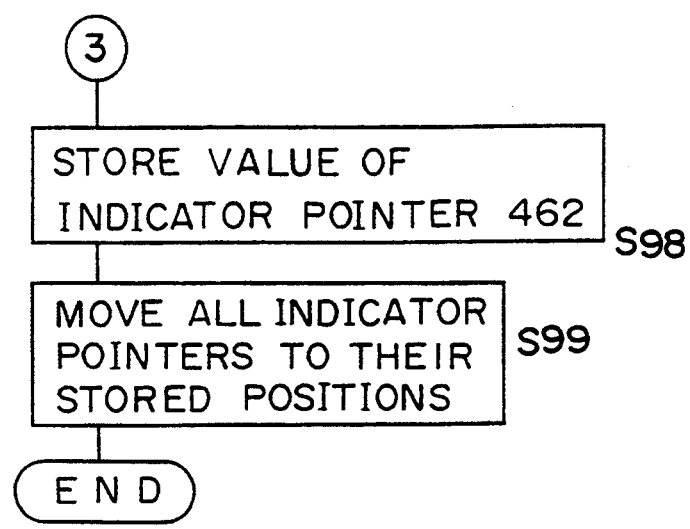
Figure 51B:
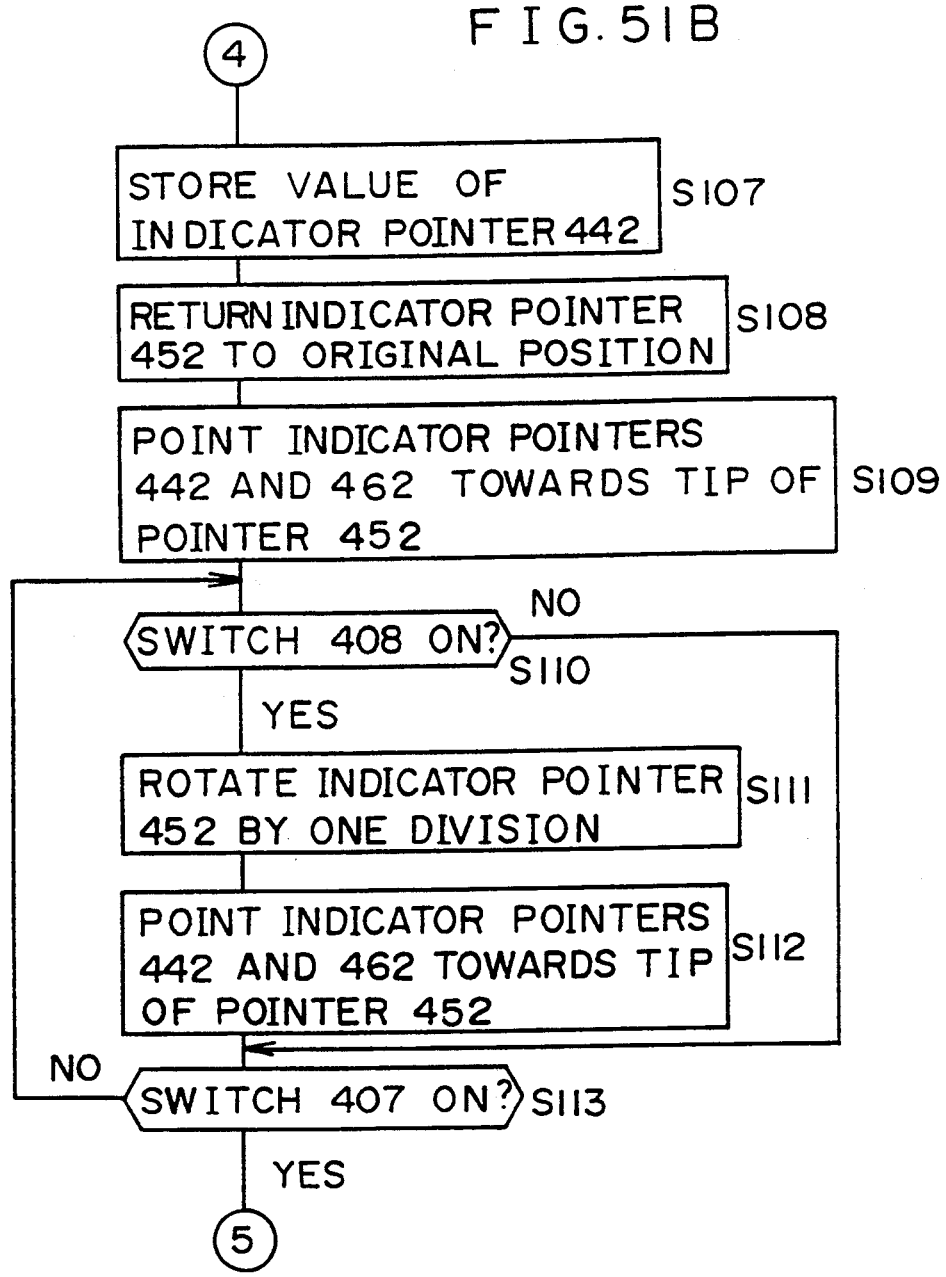
Figure 51D:
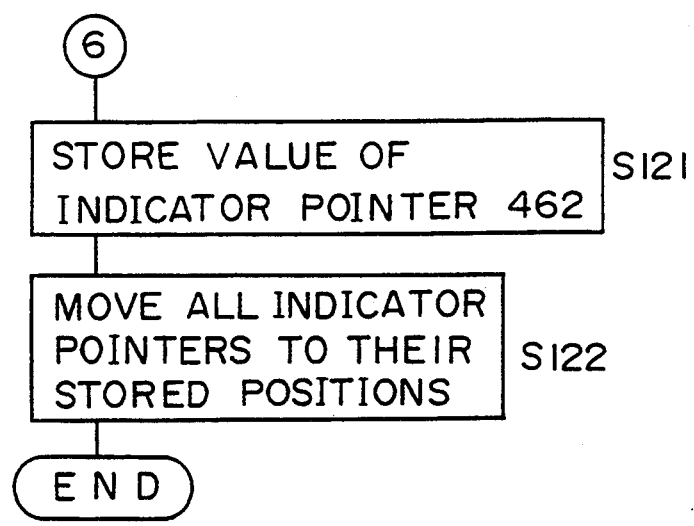

With this fourth preferred embodiment, the indicator pointers of the display portions relating to parameters other than the parameter whose contents are to be changed are pointed in the direction of the central rotational axis of the display pointer of the display portion relating to said parameter whose contents are to be changed, in order to indicate the active display portion for parameter change, i.e. the so called "live" display portion; but this is not to be considered as limitative of the present invention, and other possibilities are available: for instance, said other indicator pointers could all be pointed in the direction of the tip of said display pointer of said display portion relating to said parameter whose contents are to be changed. The operation of a variant embodiment of this type is shown in FIGS. 47 and 48 and will now be explained. Only the operation of altering the focus adjustment mode displayed on the focus adjustment mode indicator 451 will be explained, and the description of altering the parameters shown on the exposure correction mode indicator 441 and the flash mode indicator 461 will be omitted in the interests of brevity of description, since it may easily be supplemented by a person of ordinary skill in the relevant art based upon the disclosure herein.

FIGS. 47 and 48 show, for this variant of the fourth preferred embodiment, the condition of the indicator device 404 when by the use of the mode switch 407 the focus adjustment mode alteration mode is selected, in which the value of the parameter displayed on the focus adjustment mode indicator 451 can be altered. Initially, when the mode switch 407 is used to select the focus adjustment mode alteration mode for shifting the focus adjustment mode indicator 451, as shown in FIG. 47, the current positions of the indicator pointer 442 of the exposure correction mode indicator 441 and the indicator pointer 462 of the flash mode indicator 461 are stored in the storage device, and said pointers 452 and 462 are moved to point in predetermined directions having no connection with the present values of their displayed parameters, in the case of this variant embodiment so as to point at the tip of the indicator pointer 452 of the focus adjustment mode indicator 451. On the other hand, when the display alteration mode is returned to the reset mode, then the indicator pointers 442 and 462 are returned to their positions corresponding to the respective values which were previously stored in the storage device.

If the display alteration switch 408 is pressed once in the FIG. 47 state, then as shown in FIG. 48 each time said switch 408 is pressed, the indicator pointer 452 of the focus adjustment mode indicator 451 is rotated one hundred and twenty degrees in the clockwise direction, so as to point at the index mark 454 representing the infinity focus mode. At this time the indicator pointer 442 of the exposure correction mode indicator 441 and the indicator pointer 462 of the flash mode indicator 461 are also rotated, so that they continue to point at the tip of the indicator pointer 452 of the focus adjustment mode indicator 451 in its new position. And if the display alteration switch 408 is pressed again from this state, then again the indicator pointer 452 of the focus adjustment mode indicator 451 is rotated one hundred and twenty degrees in the clockwise direction, and again the indicator pointers 442 and 462 are also rotated so as still to point at the tip of said indicator pointer 452 in its new position. The remainder of the setting process for this variant embodiment is the same as that for the fourth preferred embodiment described above, and accordingly description thereof will be curtailed in the interests of brevity of disclosure.

FIG. 49 is a block diagram showing the construction of a camera equipped with an indicator device according to the fourth preferred embodiment.

A control circuit 420 comprises a microcomputer and its associated circuitry (neither of them particularly shown), and, along with performing sequence control for this camera and also various calculation functions, this control circuit 420 controls the indicator device 404 by executing a control program a flow chart for which will be described hereinafter.

To the control circuit 420 there are connected the mode switch 407 and the display alteration switch 408, a frame number determination device 421 which determines the number of frames of film which have been shot, a distance measurement device 422 which measures the photographic distance from this camera to the object which is to be photographed, and a memory device 423 which, as previously described, is used for storing the positions of the indicator pointers 432, 442, 452, and 462 of the indicator portions 431, 441, 451, and 461. Further, there are also connected to the control circuit 420 a stepper motor 424 which rotates the indicator pointer 432 of the frame number indicator 431, a stepper motor 425 which rotates the indicator pointer 442 of the exposure correction mode indicator 441, a stepper motor 426 which rotates the indicator pointer 452 of the focus adjustment mode indicator 451, and a stepper motor 427 which rotates the indicator pointer 462 of the flash mode indicator 461.

FIGS. 50A, 50B, 50C and 50D are flow charts showing the operation of a control program for display alteration mode which is executed by a microcomputer comprised in the control circuit 420 of FIG. 49. The operation of the fourth preferred embodiment will now be explained with reference to this flow chart.

Suppose that the indicator device 404 is in the condition shown in FIG. 42, i.e. is in the reset mode in which the values of none of the parameters displayed on the indicators 431, 441, 451, and 461 can be altered. If in this state the mode switch 407 is pressed, the control circuit 420 starts to execute the program whose flow charts are shown in FIGS. 50A, 50B, 50C and 50D.

After the start of operation, in the first step S81 of this program, the values of the parameters displayed by each of the indicator pointers 432, 442, 452, and 462 of the respective indicator devices 431, 441, 451, and 461 are stored in the memory device 423, and then the flow of control proceeds to the next step S82. In the step S82, since the exposure correction mode alteration mode is considered to have been selected from the reset mode by the single press of the mode switch 407 which has taken place, the stepper motor 424 is activated so as to move the indicator pointer 432 of the frame number indicator 431 so that it points in the direction of the rotational axis 440 of the indicator pointer 442 of the exposure correction mode indicator 441, and similarly the stepper motor 426 is activated so as to move the indicator pointer 452 of the focus adjustment mode indicator 451 so that it points in the direction of said rotational axis 440 and also the stepper motor 427 is activated so as to move the indicator pointer 462 of the flash mode indicator 461 so that it points in the direction of said rotational axis 440; and then the flow of control proceeds to the next decision step S83. In this step S83, a decision is made as to whether or not the display alteration switch 408 is ON. If the result of this decision is YES, then the flow of control passes next to the next step S84. On the other hand, if the result of this decision is NO, then the flow of control skips to the decision step S85. In the step S84, the stepper motor 425 is operated so as to move the indicator pointer 442 of the exposure correction mode indicator 441 through ninety degrees in the clockwise direction, i.e. to the next indication of said indicator 441, and then the flow of control proceeds to the next decision step S85.

Next, in the decision step S85, a decision is made as to whether or not the mode switch 407 is ON. If the result of this decision is YES, then the flow of control passes next to the next step S86. On the other hand, if the result of this decision is NO, then the flow of control returns back to the decision step S83 again. In the step S86, since it is considered that the exposure correction mode alteration mode has been terminated by the second press of the mode switch 407 and that the focus adjustment mode alteration mode has now been entered upon, the setting for the exposure correction mode indicated by the indicator pointer 442 of the exposure correction mode indicator 441 at this time is stored in the memory device 423, and then the flow of control proceeds to the next step S87. In this step S87, the stepper motor 426 is operated so as to return the indicator pointer 452 of the focus adjustment mode indicator 451 to its original position, as previously stored in the memory device 423 in the step S81, and then the flow of control proceeds to the next step S88.

In the step S88, since the focus adjustment mode alteration mode is considered to have been selected from the reset mode by the double press of the mode switch 407 which has taken place, the stepper motor 424 is activated so as to move the indicator pointer 432 of the frame number indicator 431 so that it points in the direction of the rotational axis 450 of the indicator pointer 452 of the focus adjustment mode indicator 451, and similarly the stepper motor 425 is activated so as to move the indicator pointer 442 of the exposure correction mode indicator 441 so that it points in the direction of said rotational axis 450 and also the stepper motor 427 is activated so as to move the indicator pointer 462 of the flash mode indicator 461 so that it points in the direction of said rotational axis 450; and then the flow of control proceeds to the next decision step S89. In this step S89, a decision is made as to whether or not the display alteration switch 408 is ON. If the result of this decision is YES, then the flow of control passes next to the next step S90. On the other hand, if the result of this decision is NO, then the flow of control skips to the decision step S91. In the step S90, the stepper motor 426 is operated so as to move the indicator pointer 452 of the focus adjustment mode indicator 451 through one hundred and twenty degrees in the clockwise direction, i.e. to the next indication of said indicator 451, and then the flow of control proceeds to the next decision step S91.

Next, in the decision step S91, a decision is made as to whether or not the mode switch 407 is ON. If the result of this decision is YES, then the flow of control passes next to the next step S92. On the other hand, if the result of this decision is NO, then the flow of control returns back to the decision step S89 again. In the step S92, since it is considered that the focus adjustment mode alteration mode has been terminated by the third press of the mode switch 407 and that the flash mode alteration mode has now been entered upon, the setting for the focus adjustment mode indicated by the indicator pointer 452 of the exposure correction mode indicator 451 at this time is stored in the memory device 423, and then the flow of control proceeds to the next step S93. In this step S93, the stepper motor 427 is operated so as to return the indicator pointer 462 of the flash mode indicator 461 to its original position, as previously stored in the memory device 423 in the step S81, and then the flow of control proceeds to the next step S94.

In the step S94, since the flash mode alteration mode is considered to have been selected from the reset mode by the triple press of the mode switch 407 which has taken place, the stepper motor 424 is activated so as to move the indicator pointer 432 of the frame number indicator 431 so that it points in the direction of the rotational axis 460 of the indicator pointer 462 of the focus adjustment mode indicator 461, and similarly the stepper motor 425 is activated so as to move the indicator pointer 442 of the exposure correction mode indicator 441 so that it points in the direction of said rotational axis 460 and also the stepper motor 426 is activated so as to move the indicator pointer 452 of the focus adjustment mode indicator 451 so that it points in the direction of said rotational axis 460; and then the flow of control proceeds to the next decision step S95. In this step S95, a decision is made as to whether or not the display alteration switch 408 is ON. If the result of this decision is YES, then the flow of control passes next to the next step S96. On the other hand, if the result of this decision is NO, then the flow of control skips to the decision step S97. In the step S96, the stepper motor 427 is operated so as to move the indicator pointer 462 of the flash mode indicator 461 through ninety degrees in the clockwise direction, i.e. to the next indication of said indicator 461, and then the flow of control proceeds to the next decision step S97.

Next, in the decision step S97, a decision is made as to whether or not the mode switch 407 is ON. If the result of this decision is YES, then the flow of control passes next to the next step S98. On the other hand, if the result of this decision is NO, then the flow of control returns back to the decision step S95 again. In the step S98, since it is considered that the flash mode alteration mode has been terminated by the fourth press of the mode switch 407 and that the reset mode has now been returned to, the setting for the flash mode indicated by the indicator pointer 462 of the flash mode indicator 461 at this time is stored in the memory device 423, and then the flow of control proceeds to the next step S99. In this step S99, the stepper motors 424, 425, 426, and 427 are operated so as to move the indicator pointers 432, 442, 452, and 462 respectively of the frame number indicator 431, the exposure correction mode indicator 441, the focus adjustment mode indicator 451, and the flash mode indicator 461 to their positions as stored in the memory device 423 in the previous program steps (possibly altered from the last time the reset mode was current, according to the operation of this control program), and then the operation of this control program terminates.

FIGS. 51A, 51B, 51C and 51D are flow charts showing the operation of an alternative control program which is executed by the control circuit 420 during focus display change mode, for realizing the variant of the fourth preferred embodiment whose operation is shown in FIGS. 47 and 48, in which the indicator pointers of the indicator devices for which the values of the parameters displayed thereon are not being altered are pointed, not at the rotational axis of the indicator pointer of the indicator device for which the value of the parameter displayed thereon is being altered, but rather at the tip of said indicator pointer. The operation of this variant of the fourth preferred embodiment will now be explained with reference to this flow chart.

Suppose that the indicator device 404 is in the condition shown in FIG. 42, i.e. is in the reset mode in which the values of none of the parameters displayed on the indicators 431, 441, 451, and 461 can be altered. If in this state the mode switch 407 is pressed, the control circuit 420 starts to execute the program whose flow charts are shown in FIGS. 51A, 51B, 51C and 51D.

After the start of operation, in the first step S101 of this program, the values of the parameters displayed by each of the indicator pointers 432, 442, 452, and 462 of the respective indicator devices 431, 441, 451, and 461 are stored in the memory device 423, and then the flow of control proceeds to the next step S102. In the step S102, since the exposure correction mode alteration mode is considered to have been selected from the reset mode by the single press of the mode switch 407 which has taken place, the stepper motor 426 is activated so as to move the indicator pointer 452 of the focus adjustment mode indicator 451 so that it points in the direction of the tip of the indicator pointer 442 of the exposure correction mode indicator 441, and similarly the stepper motor 427 is activated so as to move the indicator pointer 462 of the flash mode indicator 461 so that it points in the direction of said tip of said indicator pointer 442; and then the flow of control proceeds to the next decision step S103. In this step S103, a decision is made as to whether or not the display alteration switch 408 is ON. If the result of this decision is YES, then the flow of control passes next to the next step S104. On the other hand, if the result of this decision is NO, then the flow of control skips to the decision step S106. In the step S104, the stepper motor 425 is operated so as to move the indicator pointer 442 of the exposure correction mode indicator 441 through ninety degrees in the clockwise direction, i.e. to the next indication of said indicator 441, and then the flow of control proceeds to the next step S105. In this step S105, since now the tip of the indicator pointer 442 of the exposure correction mode indicator 441 has moved, again the stepper motor 426 is activated so as to move the indicator pointer 452 of the focus adjustment mode indicator 451 so that it points in the direction of the tip of said indicator pointer 442, and similarly the stepper motor 427 is activated so as to move the indicator pointer 462 of the flash mode indicator 461 so that it points in the direction of said tip of said indicator pointer 442; and then the flow of control proceeds to the next decision step S106.

Next, in the decision step S106, a decision is made as to whether or not the mode switch 407 is ON. If the result of this decision is YES, then the flow of control passes next to the next step S107. On the other hand, if the result of this decision is NO, then the flow of control returns back to the decision step S103 again. In the step S107, since it is considered that the exposure correction mode alteration mode has been terminated by the second press of the mode switch 407 and that the focus adjustment mode alteration mode has now been entered upon, the setting for the exposure correction mode indicated by the indicator pointer 442 of the exposure correction mode indicator 441 at this time is stored in the memory device 423, and then the flow of control proceeds to the next step S108. In this step S108, the stepper motor 426 is operated so as to return the indicator pointer 452 of the focus adjustment mode indicator 451 to its original position, as previously stored in the memory device 423 in the step S101, and then the flow of control proceeds to the next step S109.

In the step S109, since the focus adjustment mode alteration mode is considered to have been selected from the reset mode by the double press of the mode switch 407 which has taken place, the stepper motor 425 is activated so as to move the indicator pointer 442 of the exposure correction mode indicator 441 so that it points in the direction of the tip of the indicator pointer 452 of the focus adjustment mode indicator 451, and similarly the stepper motor 427 is activated so as to move the indicator pointer 462 of the flash mode indicator 461 so that it points in the direction of said tip of said indicator pointer 452; and then the flow of control proceeds to the next decision step S110. In this decision step S110, a decision is made as to whether or not the display alteration switch 408 is ON. If the result of this decision is YES, then the flow of control passes next to the next step S111. On the other hand, if the result of this decision is NO, then the flow of control skips to the decision step S113. In the step S111, the stepper motor 426 is operated so as to move the indicator pointer 452 of the focus adjustment mode indicator 451 through one hundred and twenty degrees in the clockwise direction, i.e. to the next indication of said indicator 451, and then the flow of control proceeds to the next step S112. In this step S112, since now the tip of the indicator pointer 452 of the focus adjustment mode indicator 451 has moved, again the stepper motor 425 is activated so as to move the indicator pointer 442 of the exposure correction mode indicator 441 so that it points in the direction of the tip of said indicator pointer 452, and similarly the stepper motor 427 is activated so as to move the indicator pointer 462 of the flash mode indicator 461 so that it points in the direction of said tip of said indicator pointer 452; and then the flow of control proceeds to the next decision step S113.

Next, in the decision step S113, a decision is made as to whether or not the mode switch 407 is ON. If the result of this decision is YES, then the flow of control passes next to the next step S114. On the other hand, if the result of this decision is NO, then the flow of control returns back to the decision step S110 again. In the step S114, since it is considered that the focus adjustment mode alteration mode has been terminated by the third press of the mode switch 407 and that the flash mode alteration mode has now been entered upon, the setting for the focus adjustment mode indicated by the indicator pointer 452 of the focus adjustment mode indicator 451 at this time is stored in the memory device 423, and then the flow of control proceeds to the next step S115. In this step S115, the stepper motor 427 is operated so as to return the indicator pointer 462 of the flash mode indicator 461 to its original position, as previously stored in the memory device 423 in the step S101, and then the flow of control proceeds to the next step S116.

In the step S116, since the flash mode alteration mode is considered to have been selected from the reset mode by the triple press of the mode switch 407 which has taken place, the stepper motor 425 is activated so as to move the indicator pointer 442 of the exposure correction mode indicator 441 so that it points in the direction of the tip of the indicator pointer 462 of the flash mode indicator 461, and similarly the stepper motor 426 is activated so as to move the indicator pointer 452 of the focus adjustment mode indicator 451 so that it points in the direction of said tip of said indicator pointer 462; and then the flow of control proceeds to the next decision step S117. In this decision step S117, a decision is made as to whether or not the display alteration switch 408 is ON. If the result of this decision is YES, then the flow of control passes next to the next step S118. On the other hand, if the result of this decision is NO, then the flow of control skips to the decision step S120. In the step S118, the stepper motor 427 is operated so as to move the indicator pointer 462 of the flash mode indicator 461 through ninety degrees in the clockwise direction, i.e. to the next indication of said indicator 461, and then the flow of control proceeds to the next step S119. In this step S119, since now the tip of the indicator pointer 462 of the flash mode indicator 461 has moved, again the stepper motor 425 is activated so as to move the indicator pointer 442 of the exposure correction mode indicator 441 so that it points in the direction of the tip of said indicator pointer 462, and similarly the stepper motor 426 is activated so as to move the indicator pointer 452 of the focus adjustment mode indicator 451 so that it points in the direction of said tip of said indicator pointer 462; and then the flow of control proceeds to the next decision step S120.

Next, in the decision step S120, a decision is made as to whether or not the mode switch 407 is ON. If the result of this decision is YES, then the flow of control passes next to the next step S121. On the other hand, if the result of this decision is NO, then the flow of control returns back to the decision step S117 again. In the step S121, since it is considered that the flash mode alteration mode has been terminated by the fourth press of the mode switch 407 and that the reset mode alteration mode has now been returned to, the setting for the flash mode indicated by the indicator pointer 462 of the flash mode indicator 461 at this time is stored in the memory device 423, and then the flow of control proceeds to the next step S122. In this step S122, the stepper motors 425, 426, and 427 are operated so as to move the indicator pointers 442, 452, and 462 respectively of the exposure correction mode indicator 441, the focus adjustment mode indicator 451, and the flash mode indicator 461 to their positions as stored in the memory device 423 in the previous program steps (possibly altered from the last time the reset mode was current, according to the operation of this control program), and then the operation of this control program terminates.

The above described fourth preferred embodiment of the indicator device of the present invention and its variant have the following especially notable features.

The exposure correction mode indicator 441, the focus adjustment mode indicator 451, and the flash mode indicator 461 are so arranged that none of their index marks lies on any of the three straight lines joining two of the following three points: the central rotational axis (or, alternatively, the tip) of the indicating pointer 442 of the exposure correction mode indicator 441, the central rotational axis (or, alternatively, the tip) of the indicating pointer 452 of the focus adjustment mode indicator 451, and the central rotational axis (or, alternatively, the tip) of the indicating pointer 462 of the flash mode indicator 461. In this manner, each of the display portions is so disposed that when changing the contents of the parameter shown thereon the indicator pointers of the other display portions the values of whose parameters are not being altered are at positions intermediate between one of their index marks and another, rather than pointing directly at any of their index marks. This is done in order that it should be easily possible for the user of the camera to tell which of the display portions among the plurality of display portions is the one for which the item whose contents are displayed therein is being altered. Thereby operation of the camera when setting items of photographic information is facilitated. Further, the frame number indicator 431, the exposure correction mode indicator 441, the focus adjustment mode indicator 451, and the flash mode indicator 461 are so arranged that not one of the index marks of any of the indicators 441, 451, and 461 lies on any one of the three straight lines joining the central rotational axis 430 of the indicator pointer 432 of the frame number indicator 431 to the central rotational axis of the indicator pointer 442 of the exposure correction mode indicator 441, or to the central rotational axis 450 of the indicator pointer 452 of the focus adjustment mode indicator 451, or to the central rotational axis 460 of the indicator pointer 462 of the flash mode indicator 461. By this arrangement, whatever may be the position of the indicator pointer 432 of the frame number indicator 431, it can never be superimposed over any one of the index pointers 442, 452, or 462 of the indicator devices 441, 451, or 461, and accordingly it is always easy for the user of the camera to perceive the values indicated by said indicator devices 441, 451, and 461.

Although in the above descriptions as an example the fourth preferred embodiment of the indicator device of the present invention was described under the assumption that the information related to conditions of photography displayed on the plurality of displays thereof was the exposure correction mode, the focus adjustment mode, and the flash mode, this is not to be taken as limitative, since other alternatives are possible within the scope of the present invention.

Preferred Embodiment 5

Figure 52:
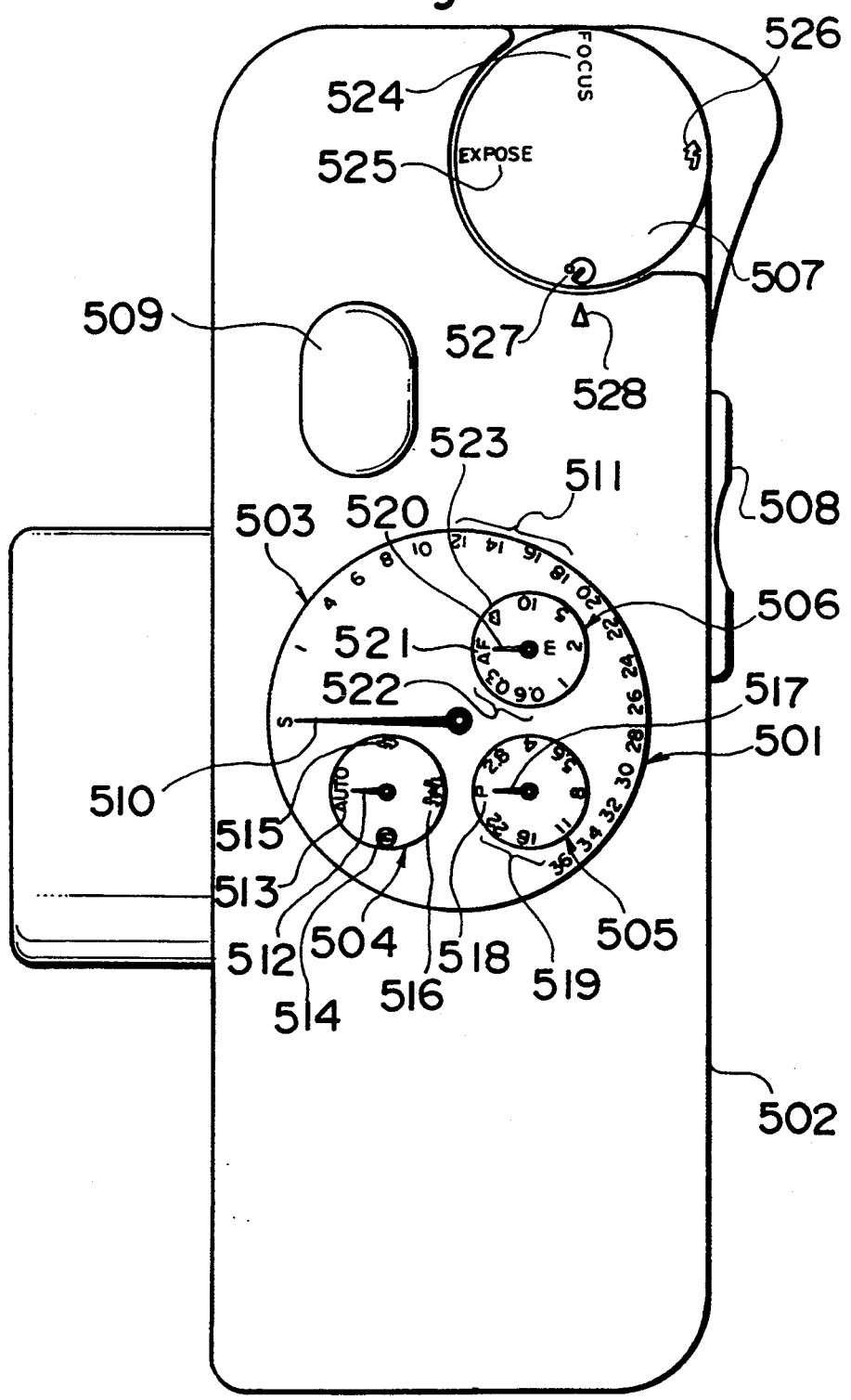
FIG. 52 is a plan view of a camera equipped with an indicator device according to the fifth preferred embodiment of the present invention.
Figure 53:
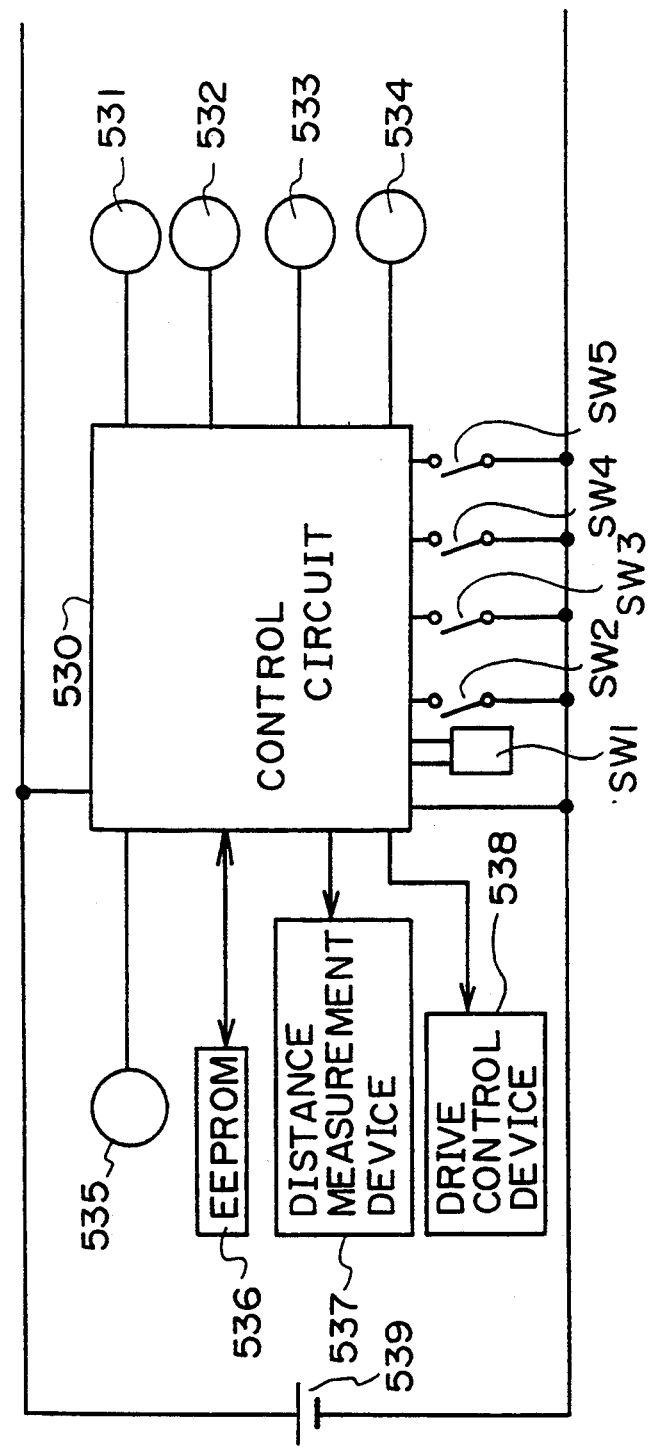
FIG. 53 is a block diagram showing the construction of the camera equipped with an indicator device according to the fifth preferred embodiment of the present invention shown in FIG. 52.

FIG. 52 is a plan view of a camera equipped with an indicator device according to the fifth preferred embodiment of the present invention, and FIG. 53 is a block diagram showing the construction of said camera.

An indicator device 501 is provided on the upper surface of the camera. The indicator device 501 of this fifth preferred embodiment comprises a frame number indicator 503, a flash mode indicator 504, an exposure indicator 505, and a range indicator 506, and further comprises a selection dial 507 which is used for selecting one or the other of the flash mode indicator 504, the exposure indicator 505, and the range indicator 506. Further, a control member 508 for indicator pointer operation is provided on the rear surface of the camera. This indicator pointer operation member 508 is operated by the camera user in order to determine the direction of rotation of the indicator pointer of the one of the flash mode indicator 504, the exposure indicator 505, and the range indicator 506 which is selected by the selection dial 507, and is also used for moving forwards or moving backwards said indicator pointer of said selected indicator by one step or division at a time. Further, a release button 509 is provided on the upper surface of the camera body.

The frame number indicator 503 comprises a rotatable indicator pointer 510 and a scale 511 over which the indicator pointer 510 moves with the tip of said indicator pointer 510 indicating one of a plurality of index marks which denote numbers of film frames shot. The indicator pointer 510 is rotationally driven by a stepper motor 531 (shown schematically in FIG. 53) in synchronism with the forwarding of a film loaded into the camera, so as to keep in step with the number of frames shot. The scale 511 includes the numerals "1", "2", ... "36" inscribed in order, as well as the character "S" which is inscribed at the twelve o'clock position, and when for example three frames of film have been shot and the camera is ready to shoot the fourth frame, then the indicator pointer 510 is driven by the stepper motor 531 so as to point at the numeral "4". Further, when the film cartridge, after having been rewound, is removed from the camera, then the indicator pointer 510 is driven by the stepper motor 531 so as to point at the character "S".

The flash mode indicator 504 comprises a rotatable indicator pointer 512 and a plurality of flash mode index marks 513 through 516, over which the indicator pointer 512 moves with the tip of said indicator pointer 512 indicating one of said plurality of flash mode index marks which denote various flash modes. The indicator pointer 512 is rotationally driven by a stepper motor 532, shown schematically in FIG. 53. The flash mode index mark 513 consists of the characters "AUTO" and means that the flash process is automatic; the flash mode index mark 514 is an icon denoting the no flash mode; the flash mode index mark 515 is an icon denoting the forced flash mode; and the flash mode index mark 516 is an icon denoting the pre flash mode, for reducing the so called red eye phenomenon.

The exposure indicator 505 comprises a rotatable indicator pointer 517, an index mark 518 consisting of the character "P" which denotes the program exposure mode, and a plurality of exposure mode index marks 519 consisting of values of aperture for the camera lens, exemplarily 2.8 . . . 22. The indicator pointer 517 is rotated with the tip of said indicator pointer 512 indicating one of said plurality of exposure mode index marks, so as to display the current exposure mode. The indicator pointer 517 is rotationally driven by a stepper motor 533, shown schematically in FIG. 53. When the indicator pointer 517 is pointing at the index mark 518 consisting of "P" for showing the program mode, then the camera is in the program exposure mode, while when the indicator pointer 517 is pointing at any one of the index marks 519 then the aperture of the lens of the camera is at the indicated value.

The range indicator 506 comprises an indicating pointer 520, an index mark 521 consisting of the characters "AF" which denotes the auto focus mode, a plurality of range index marks 522 consisting of values of distance of the object to be photographed, exemplarily 3 . . . 10, and an icon meaning that the object to be photographed is effectively at infinity. The indicator pointer 520 is rotated with the tip of said indicator pointer 520 indicating one of said plurality of range index marks, so as to display the current range (or auto focus mode). The indicator pointer 520 is rotationally driven by a stepper motor 534, shown schematically in FIG. 53. When the indicator pointer 520 is pointing at the index mark 521 consisting of "AF" for showing the auto focus mode, then the camera is in the auto focus mode, so that when the release button 509 is pressed the photographic distance from the camera to the object to be photographed is measured by a distance measurement device 537 described hereinafter, the camera lens is focused appropriately, and the indicator pointer 520 is moved to point at a one of the range index marks 522 which denotes said measured photographic distance.

The selection dial 507 is provided with four legends denoting settings: an index mark 524 consisting of the word "FOCUS", an index mark 525 consisting of the word "EXPOSE", an icon 526 denoting flash mode, and an icon 527 denoting self-timer mode. The body of the camera bears an indication mark 528 opposed to the edge of the selection dial 507. When the selection dial 507 is rotated so that the "FOCUS" index mark 524 is juxtaposed to the indication mark 528, then photography in the manual focus mode is enabled. When the selection dial 507 is rotated so that the "EXPOSE" index mark 525 is juxtaposed to the indication mark 528, then exposure value alteration mode is set, and it becomes possible to alter the value of exposure displayed by the exposure indicator 505, whereby either program exposure mode or aperture priority mode can be established. When the selection dial 507 is rotated so that the flash icon 526 is juxtaposed to the indication mark 528, then flash mode alteration mode is set, and it becomes possible to alter the flash mode displayed by the flash mode indicator 504, whereby the flash mode can be set to any desired one of the auto flash mode, the no flash mode, the pre flash mode, and the forced flash mode. And, when the selection dial 507 is rotated so that the self timer icon 527 is juxtaposed to the indication mark 528, then photography in the self timer mode is enabled.

FIG. 53 is a block diagram showing the construction of the camera equipped with an indicator device according to the fifth preferred embodiment of the present invention shown in FIG. 52. A control circuit 530 comprises a CPU, ROM, RAM and associated per se conventional hardware and circuitry etc., and receives supply of electrical power from a power supply 539. The stepping motors 531 through 534, which as described above rotate the indicator pointers of the respective indicator devices 503 through 506, are connected to this control circuit 530, as well as a film forwarding motor 535 and switches SW1 through SW5. The reference numeral 536 denotes a non volatile memory which may be an EEPROM or the like, and the current positions of the various stepper motors 531 through 534, i.e. of the indicator pointers of the respective indicator devices 503 through 506, are stored in this non volatile memory 536 at predetermined timings. Further, the reference numeral 537 denotes a distance measurement device for measuring the photographic distance from this camera to the object to be photographed, while 538 is a shutter and aperture drive control device.

The switch SW1 is a mode selection switch the motion of which is linked to the motion of the mode selection dial 507, and, when said mode selection dial 507 is rotated by one step (through ninety degrees) to the right or to the left, said mode selection switch SW1 sends a signal specific for the direction of such rotation to the control circuit 530. When the mode selection dial 507 is rotated so that the "FOCUS" index mark 524 is juxtaposed to the indication mark 528, then the control circuit 530 selects the manual focus mode; while, when the mode selection dial 507 is rotated so that the "EXPOSE" index mark 525 is juxtaposed to the indication mark 528, then the control circuit 530 selects the exposure value alteration mode. Further, when the mode selection dial 507 is rotated so that the flash icon 526 is juxtaposed to the indication mark 528, then the control circuit 530 selects the flash mode alteration mode; and, when the selection dial 507 is rotated so that the self timer icon 527 is juxtaposed to the indication mark 528, then the control circuit 530 selects the self timer mode.

The switches SW2 and SW3 are switches which are operated by the operation of the indicator pointer operation member 508. In detail, this indicator pointer operation member 508 is slidable by the camera user in the upwards direction as seen in FIG. 52, and further can be pushed in the leftwards direction as seen in FIG. 52. If the indicator pointer operation member 508 is slid in the upwards direction as seen in FIG. 52, then the switch SW2 is turned ON, and the camera is put into the mode in which the pointers of the various displays, when rotated, are turned in the clockwise rotational direction. On the other hand, if said indicator pointer operation member 508 is not slid in the upwards direction as seen in FIG. 52, then the switch SW2 is left OFF, and the camera is put into the mode in which the pointers of the various displays, when rotated, are turned in the anticlockwise rotational direction. Further, every time said indicator pointer operation member 508 is pushed in the leftwards direction as seen in FIG. 52, the switch SW3 is turned ON, and the pointer of the selected display is rotated by one step in a rotational direction determined as just described.

The switches SW4 and SW5 are switches which are normally OFF and which are turned ON when the release button 509 is, respectively, first stroke operated and second stroke operated; in other words, the normally OFF switch SW4 is turned ON when the camera user applies moderate pressure to the release button 509 so as to depress it through a first stroke, while the normally OFF switch SW5 is subsequently turned ON when the camera user applies somewhat harder pressure to said release button 509 so as further to depress it through a second stroke.

Figure 54B:
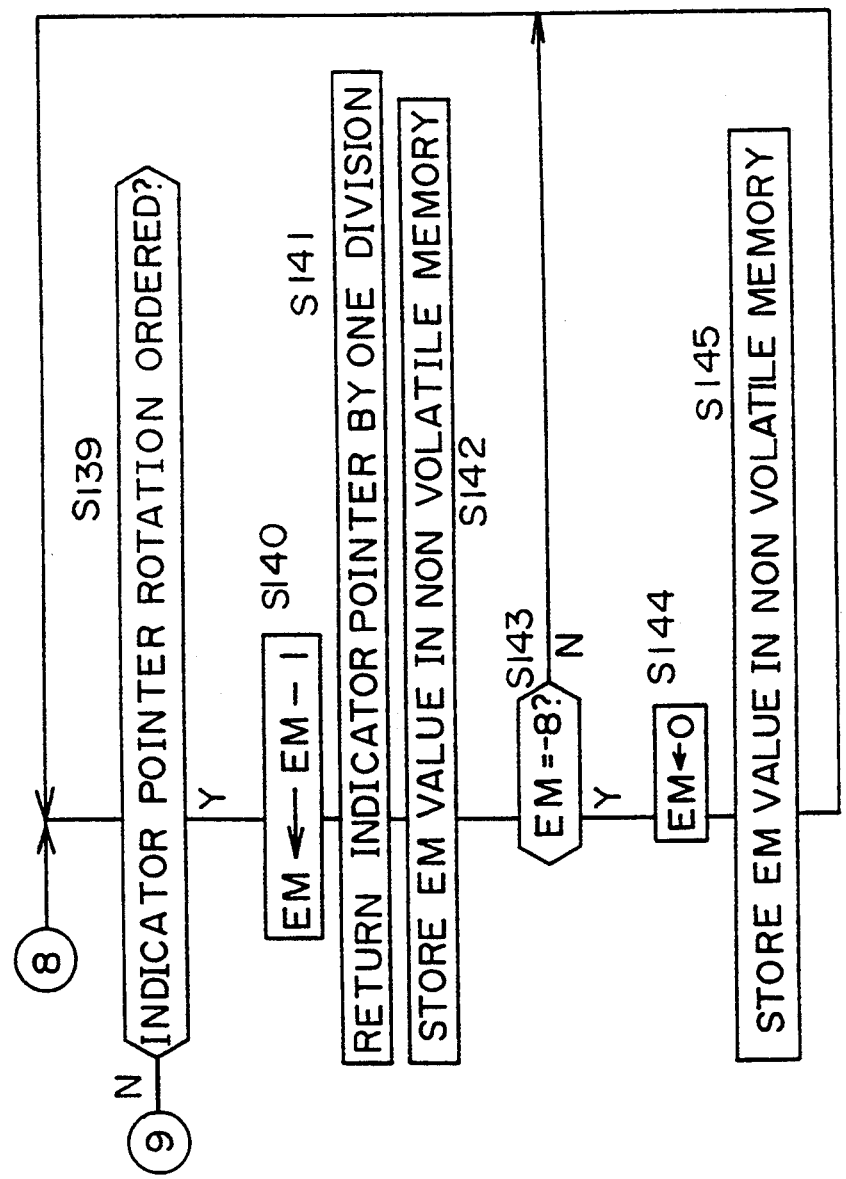

FIGS. 54A and 54B are flow charts showing the operation of a control program which is executed by the control circuit 530 for mode setting and for the display process. The operation of the fifth preferred embodiment will now be explained with reference to this flow chart.

When a power switch not shown in the figures is turned ON, the control circuit 530 starts to obey the flow charts of FIGS. 54A and 54B. First, in the decision step 130, a decision is made as to whether the mode selection dial 507 is positioned so that the "EXPOSE" index mark 525 is juxtaposed to the indication mark 528, in which case the exposure value alteration mode is selected, or said mode selection dial 507 is positioned so that the flash icon 526 is juxtaposed to said indication mark 528, in which case the flash mode alteration mode is selected. If the exposure value alteration mode is selected, then the flow of control passes next to the decision step S131, so as to operate the pointer of the exposure indicator 505. On the other hand, if the flash mode alteration mode is selected, then the flow of control passes next to the step S146, so as to operate the pointer of the flash mode indicator 504.

In the case of the exposure value alteration mode, in the decision step S131 a decision is made as to whether or not the rotational direction switch SW2 is ON, or not. If the result of this decision is YES, so that the required rotational direction is clockwise, then the flow of control passes next to the decision step S132. On the other hand, if the result of this decision is NO, so that the required rotational direction is anticlockwise, then the flow of control passes next to the decision step S139. In the decision step S132, a decision is made as to whether or not the forwarding switch SW3 has been switched to ON from the OFF condition, i.e. as to whether or not an order has been given by the camera user for clockwise indicator pointer rotation. If the result of this decision is YES, then the flow of control passes next to the step S133, while if the result of this decision is NO then this program terminates. In the step S133, the counted value EM of the exposure value counter is incremented by unity, and then the flow of control proceeds to the next step S134.

In the step S134, the stepper motor 533 is activated so as to rotate the indicating pointer 517 of the exposure indicator 505 forwards in the clockwise direction by just one step, i.e. by forty-five degrees, and then the flow of control proceeds to the next step S135, in which the incremented count value EM is transmitted to the non volatile memory 536 and is stored in an assigned exposure value count area therein. Here, along with maintaining correspondence between the aperture value counter for aperture priority mode and the counted value EM of the exposure value counter, correspondence is maintained between the counted value EM and the number of steps from a standard position of the stepper motor 533. Now, if in the program mode the counted value EM=0, then we stipulate that the standard position for the stepper motor 533 is when the indicator pointer 517 is indicating the index mark 518 consisting of "P" denoting the program mode, at which EM=0. With this definition, if while the clockwise rotational direction is set an indicator pointer rotation order is output from the forwarding switch SW3 exactly once, then EM becomes equal to 1, and the indicator pointer 517 indicates the index mark for the aperture value 2.8. On the other hand, if from the standard position an order for indicator pointer rotation in the anticlockwise direction is output seven times, then EM becomes equal to 7, and similarly the indicator pointer 517 indicates the index mark for the aperture value 2.8.

In this manner, even though the exposure indicator 505 is driven by a stepper motor, because the amount of operation of the stepper motor from a standard position to its present position is always kept in agreement with the exposure value counter, it is possible to set the exposure mode and the aperture value for the camera according to this count value EM. Further, even if the battery falls out of the camera so that the value shown by the exposure indicator 505 changes and it becomes impossible to read the most recently displayed exposure value, nevertheless when the battery is reloaded into the camera the previous exposure value in the counter area of the non volatile memory 536 is accessed, and the stepper motor 533 is driven according to the count value EM which is derived from this stored value, whereby when the battery is reloaded it is possible for the indicator pointer 517 to show the exposure value which was current just before the battery fell out. Further, it is possible accurately to resume the setting for exposure mode or aperture value for the camera, based upon the stored contents of the non volatile memory 536.

Next, in the decision step S136, a decision is made as to whether or not the exposure value counter EM is equal to eight, or not. If the result of this decision is YES, then the flow of control passes next to the step S137. On the other hand, if the result of this decision is NO, then the flow of control loops back to the decision step S132. In the step S137 the value of EM is set to zero, and next in the step S138 this zero value of EM is transmitted to the non volatile memory 536 and is stored in the previously mentioned assigned exposure value count area therein; and then the flow of control loops back to the decision step S132. In summary, the steps S136 and S137 are a procedure for accurately discriminating the indicator position, even if the indicator pointer 517 is rotated through at least one full revolution in the same direction.

On the other hand, if in the step S131 a decision is made that the rotational direction switch SW2 is OFF, then the flow of control proceeds to the next step S139, in which a decision is made as to whether or not the forwarding switch SW3 has been switched to OFF from the ON condition, i.e. as to whether or not an order has been given by the camera user for anticlockwise indicator pointer rotation. If the result of this decision is YES, then the flow of control passes next to the step S140, while if the result of this decision is NO then this program terminates. In the step S140, the counted value EM of the exposure value counter is decremented by unity, and then the flow of control proceeds to the next step S141, in which the stepper motor 533 is activated so as to rotate the indicating pointer 517 of the exposure indicator 505 forwards in the anticlockwise direction by just one step, i.e. by forty-five degrees, and then the flow of control proceeds to the next step S142, in which the decremented count value EM is transmitted to the non volatile memory 536 and is stored in an assigned exposure value count area therein. Next, in the decision step S143, a decision is made as to whether or not the exposure value counter EM is equal to 8, or not. If the result of this decision is YES, then the flow of control passes next to the step S144. On the other hand, if the result of this decision is NO, then the flow of control loops back to the decision step S139. In the step S144 the value of EM is set to zero, and next in the step S145 this zero value of EM is transmitted to the non volatile memory 536 and is stored in the previously mentioned assigned exposure value count area therein; and then the flow of control loops back to the decision step S139.

Further, since seven levels of aperture value are provided for the exposure indicator 505 in program mode and aperture priority mode, the exposure indicator 505 is constructed so that its indicator pointer 517 travels through eight steps in one full revolution. On the other hand, since four different types of flash mode are available, the flash mode indicator 504 is constructed so that its indicator pointer 520 travels through four steps in one full revolution. Accordingly, if the counted value for the flash mode indicator 504 be termed SM, it is appropriate to reset this counted value SM to zero when it becomes either +4 or −4.

The procedure for display of the photographic distance and the current frame number on the range indicator 506 and the frame number indicator 503 will now be explained with reference to the flow charts shown in FIGS. 55A and 55B.

Figure 55A:
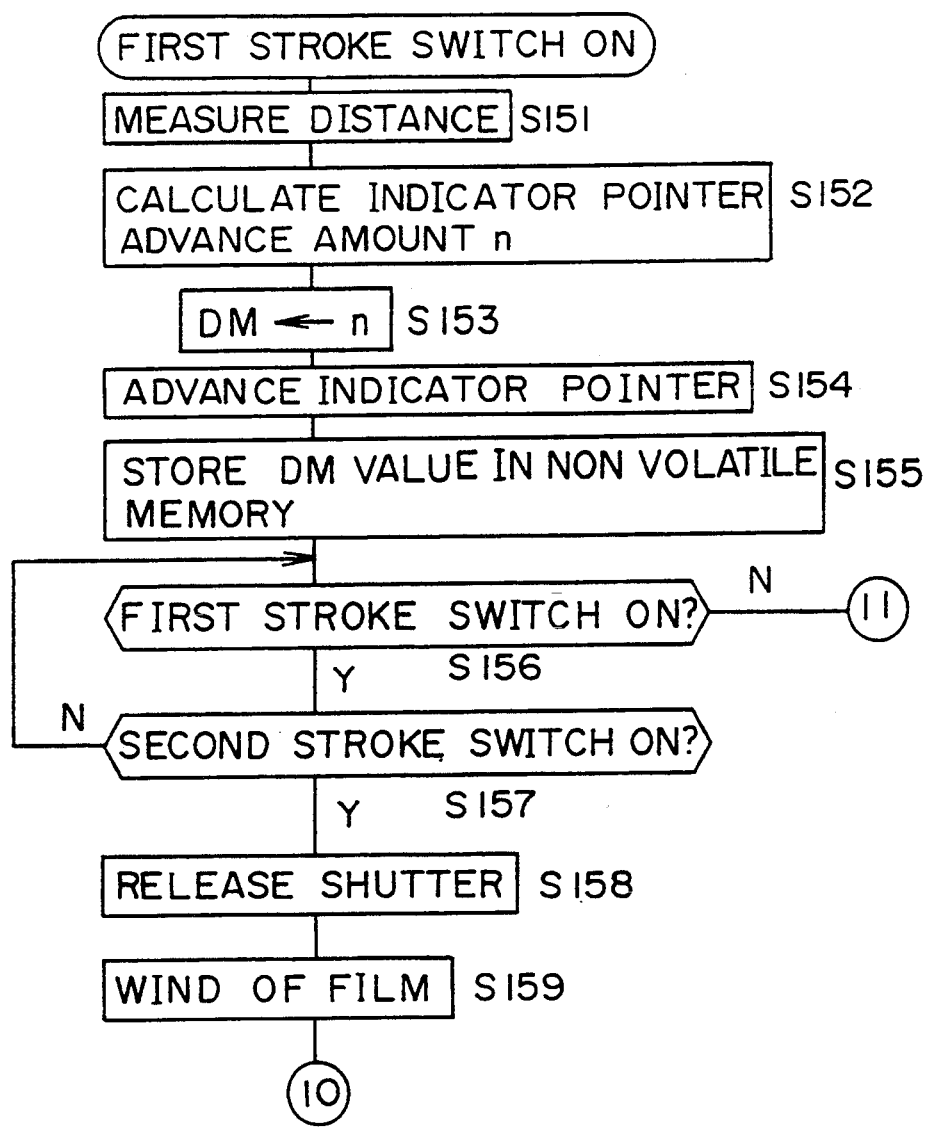

When the first stroke switch SW4 is turned ON by the camera user operating the release button 509 through its first stroke, the control circuit 530 starts to execute the program of FIGS. 55A and 55B. In the first step S151, the photographic distance from this camera to the object to be photographed is measured by the distance measurement device 537, and then the flow of control proceeds to the next step S152, in which based upon the result of photographic distance measurement the amount n by which the indicator pointer 520 should be moved rotationally onward is calculated. In the next step S153 this onward movement value n is stored in the non volatile memory DM, and then the flow of control proceeds to the next step S154, in which the indicator pointer 520 is moved rotationally onward by just an amount corresponding to the value of DM stored in the memory. In concrete terms, if the position of the AF index mark 521 is taken as the standard position of the range indicator 506 corresponding to DM=0, then the amount of rotational movement of the indicator pointer 520 from this standard position to each of the index marks for photographic distances of 0.3, 0.6, 1, 2, 5, and 10 meters is determined in advance. The amount of rotational movement n for the indicator pointer 520 corresponding to the index mark for the photographic distance which it is desired to display is calculated, and then by rotating the stepper motor 534 through n steps it is possible to bring said indicator pointer 520 to point at said index mark for the desired photographic distance.

In the next step S155, the photographic distance memory value DM is transmitted to the non volatile memory 536 and is stored in an assigned exposure value count area therein, and then the flow of control proceeds to the next decision step S156, in which a decision is made as to whether or not the first stroke switch SW4 is ON. If the result of this decision is YES, then the flow of control passes next to the decision step S157. On the other hand, if the result of this decision is NO, then this program terminates. In the decision step S157, a decision is made as to whether or not the second stroke switch SW5 is ON. If the result of this decision is YES, then the flow of control passes next to the step S158, while if the result of this decision is NO then the flow of control returns to loop back to the decision step S157 again. In the step S158, the shutter is released and a photograph is exposed, and then in the next step S159 the film forwarding motor 535 is activated so as to wind on the film by just the appropriate amount. At this time, the amount m by which the film is wound on is detected by a film forwarding amount detection device not shown in the figures, and in the next step S160 the detected frame number m is read in.

The flow of control proceeds to the next step S161, in which the frame number m is added into the count value Km of the film frame counter, and in the next step S162 the indicator pointer 510 is rotationally advanced by precisely the added frame number m. In concrete terms, because the count value KM of the film frame counter corresponds to the index marks "S", "1", . . . "36" for film frame numbers, the index mark "S" corresponding to KM=0 is taken as the standard position for the frame number indicator 503, and thus the correspondence between the number of steps (amount of movement) from the standard position for the stepper motor 531 and the count value Km is set in advance. The number of steps of the stepper motor 531 is calculated from the count value Km of the film frame counter, and, since the stepper motor 531 is operated to rotate through just the calculated number of steps, the indicator pointer 510 can be positioned to point just at the index mark corresponding to the frame number which it is desired to indicate.

In the next step S163, the film frame count value Km is transmitted to the non volatile memory 536 and is stored in an assigned frame number count area therein, and then the flow of control proceeds to the next step S164, in which the photographic distance memory value DM is cleared (set to zero); and next in the step S165 the stepper motor 531 is controlled so that the indicator pointer 520 of the range indicator 506 is returned to point at the index mark 521 for "AF". Finally, in the last program step S166, this zero photographic distance memory value DM is transmitted to the non volatile memory 536 and is stored therein.

According to the fifth preferred embodiment as described above, the amount of operation of the stepper motors from a standard position thereof, i.e. the values shown on the indicators, are stored in a non volatile memory, and therefore it is possible to set the various photographic modes for the camera based upon the contents of this memory. Further, since the values displayed upon these display devices are stored in the non volatile memory as they are being displayed, thereby, even if the positions of the stepper motors become unclear and the values shown by the indicators become changed or corrupted due to falling out of the battery from the camera or the like, nevertheless, when the battery is again reloaded into the camera, the indicators are made again to display the correct values from the moment just before the battery fell out, by appropriately driving the stepper motors based upon the values read out again from the non volatile memory.

Now, although the above described fifth preferred embodiment is so constituted that, when the indicator pointers are being driven, the amounts by which the stepper motors have been operated from their standard positions are repeatedly transmitted to the non volatile memory and are repeatedly refreshed, other alternatives are also possible. For example, it would also be acceptable for the above amounts of operation of the stepper motors to be transmitted to the non volatile memory upon the lid of the battery compartment being opened or closed, or upon the battery being checked, or upon the battery actually falling out of the camera, or the like.

With the fifth preferred embodiment as explained above, the values shown on the indicators were transmitted to a non volatile memory and were stored therein, but this is only one possible example. As an alternative, it would also be possible to use RAM or the like type of volatile memory for the storage means for the indicator values, and to provide a backup battery, and in such a case, when the supply of power from the main power supply is interrupted or when the amount of power supplied from the main power supply becomes insufficient to preserve the values recorded in the volatile memory, power is supplied from the backup battery to the memory in order to maintain the values therein. In this case, the amount of operation of the stepper motors from their standard positions is set when driving the indicators based upon the stored values in the volatile memory, and after moving the stepper motors the amount by which they have been moved from their standard positions is again refreshed into the memory.

Figure 56:
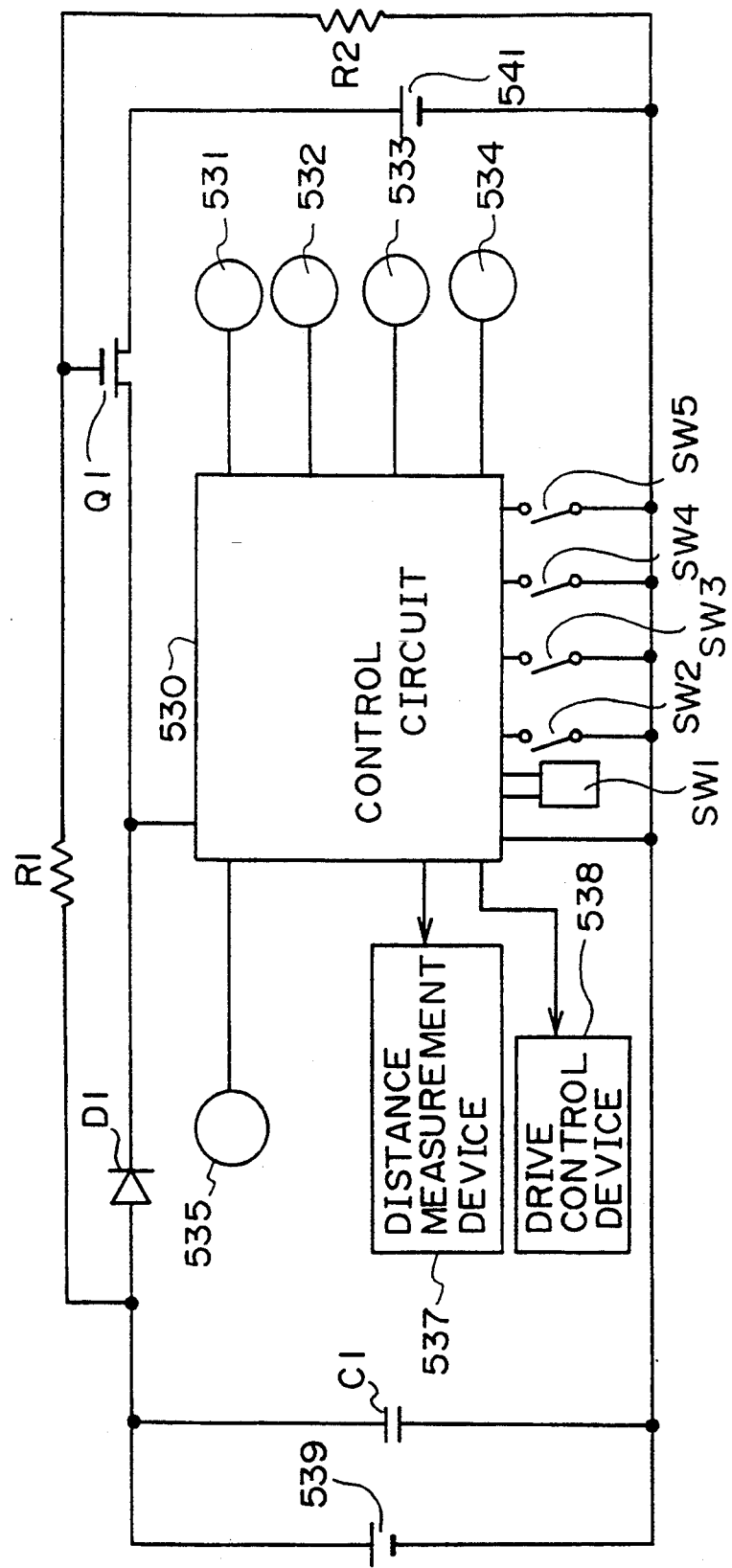
FIG. 56 is a block diagram showing the construction of a camera incorporating a variant of this fifth preferred embodiment.

FIG. 56 is a block diagram showing the construction of a camera incorporating a variant of this fifth preferred embodiment, in which a volatile memory is used as the storage means. Portions of the FIG. 56 camera which correspond exactly to portions of the already described FIG. 53 camera are denoted by like reference symbols, and description thereof will be curtailed in the interests of brevity of disclosure.

Electrical power is supplied to a stepper motor 535 etc. from a main power supply 539, and also said main power supply 539 supplies electrical power to a control circuit 530 which includes a volatile memory. Electrical power is supplied from the main power supply 539 to a gate comprising a field effect transistor Q1 (hereinafter referred to as a FET) via a bias circuit made up from resistances R1 and R2. When the voltage from the main power supply 539 is low, a diode D1 prevents inward flow of current from a backup power supply 541. Further, even if in the case of accident the supply of electric power to the volatile memory is interrupted, in an extremely short time a capacitor C1 ensures that supply of electrical power to the volatile memory is maintained, so that the contents thereof are not lost.

When the voltage from the main power supply 539 is sufficiently high, the gate comprising the FET Q1 is supplied with high voltage, so that the FET Q1 is OFF, and the power supply circuit from the backup power supply 541 to the control circuit 530 is open circuit. However, if and when the voltage from the main power supply 539 drops to a level which is insufficient to maintain the values stored in the volatile memory, then the FET Q1 is turned ON, and supply of electrical power from the backup power supply 541 to the volatile memory starts to be provided. In summary, since supply of electrical power from the backup power supply 541 to the volatile memory is provided even if the main power supply 539 fails, becomes exhausted, or becomes disconnected, thereby at such a time the values stored in said volatile memory are not lost, and accordingly the functioning of the camera is not deteriorated.

Now, instead of the bias circuit including the resistors R1 and R2 and the FET Q1, it would also be acceptable to provide a voltage detection means for detecting the voltage from the main power supply 539, and to use a power changeover means for changing over between the main power supply 539 and the backup power supply 541, so as to start supply of electrical power from the backup power supply 541, when the voltage of the power supplied from the main power supply 539 becomes lower than a predetermined value. In such a case it is desirable, from the point of view of saving the backup power supply and thus preserving the contents of the volatile memory, for the construction to be such that supply of electrical power from the backup power supply 541 is stopped, after it has been detected that the voltage of the power supplied from the main power supply 539 has become higher than a predetermined value.

Preferred Embodiment 6

Figure 57A:
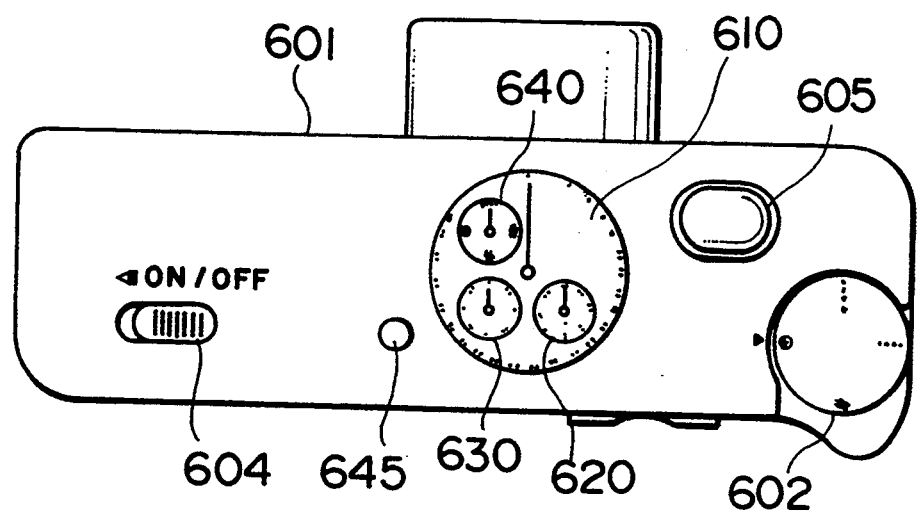
FIG. 57A is a plan view of a camera equipped with an indicator device according to the sixth preferred embodiment of the present invention.
Figure 57B:
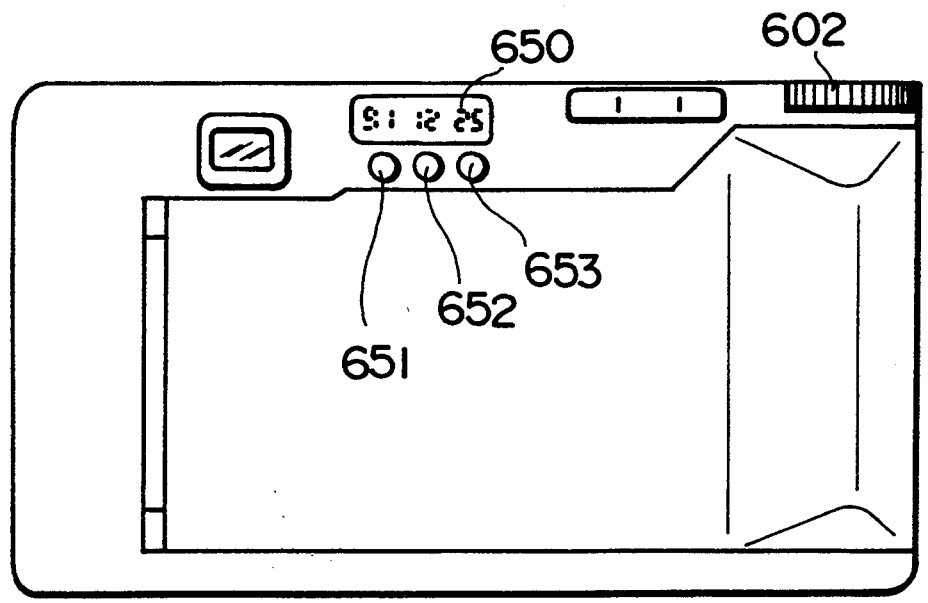
FIG. 57B is a rear view of the FIG. 57A camera.
Figure 58:
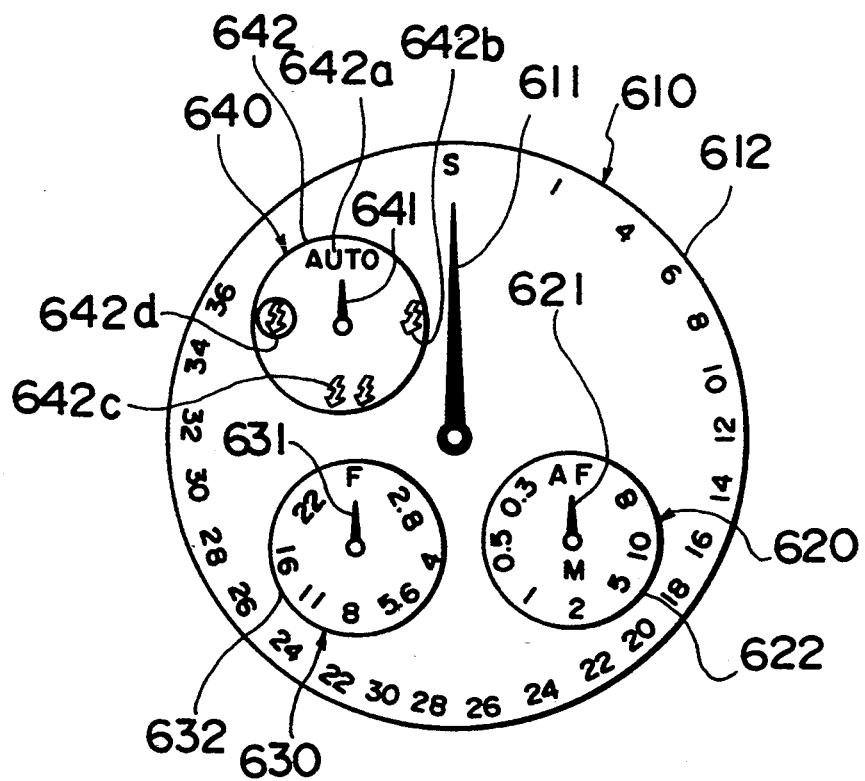
FIG. 58 is an enlarged plan view of the indicator device of the camera shown in FIGS. 57A and 57B.

FIG. 57A is a plan view of a camera, denoted by the reference numeral 601, equipped with an indicator device according to the sixth preferred embodiment of the present invention, and FIG. 57B is a rear view of this camera 601, while FIG. 58 is an enlarged plan view of said sixth preferred embodiment indicator device.

Indicator devices 610, 620, 630, and 640, which are for displaying information related to photography other than the date and the time by the movement of their indicator pointers across inscribed scale plates, are provided on the upper surface of the camera 601. The frame number indicator 610 comprises an indicator pointer 611 which is rotationally driven by a stepper motor 614 not shown in this figure over an inscribed scale plate 612, so as to show the number of frames of film that have been shot by pointing to numerals inscribed on said scale plate 612. The range indicator 620 comprises an indicating pointer 621 which is rotationally driven by a stepper motor 624 not shown in this figure over an inscribed scale plate 622 according to the photographic distance from this camera to the object to be photographed as determined by a photographic distance measurement device 671 which will be described hereinafter, said scale plate 622 bearing index marks denoting values of distance of the object to be photographed. The aperture indicator 630 comprises an indicating pointer 631 which is rotationally driven over an inscribed scale plate 632 by a stepper motor 634 not shown in this figure according to the current luminance level as determined by a luminance measurement device 672 which will be described hereinafter, said scale plate 632 bearing index marks denoting values of aperture for the camera lens. And the flash mode indicator 640 comprises an indicating pointer 641 which is rotationally driven over an inscribed scale plate 642 by a stepper motor 644 not shown in this figure according to the current flash mode as set by the user of the camera by the use of a flash mode changeover button 645, said scale plate 642 bearing index marks denoting the various flash modes for this camera.

In detail: the legend 642a consisting of the word "AUTO" inscribed on the scale plate 642 denotes the auto flash mode in which flash illumination is performed automatically; the icon 642b inscribed on said scale plate 642 denotes the forced flash mode in which flash illumination is compulsorily performed; the icon 642c inscribed on said scale plate 642 denotes the pre flash mode in which a pre flash is performed before the main flash, for the purpose of reducing the so called red eye phenomenon; and the icon 642d inscribed on said scale plate 642 denotes the no flash mode in which flash illumination is prohibited. Each time that the flash mode changeover button 645 is pressed by the user of this camera, the indicator pointer 641 of the flash mode indicator 640 is rotated through ninety degrees in the clockwise direction over the scale plate 642, and thereby the flash mode for the camera is cycled through these four modes. For this particular flash mode to be operative, a mode selection dial 602 provided on the upper surface of the camera should be turned to the flash photography mode.

On the rear surface of the camera 601 there are provided a external date/time indicator 650 (which may be a liquid crystal type display or the like) for displaying the date and/or the time, a date/time mode changeover button 651 for changing over the display mode of said indicator 650, an alteration entry changeover button 652 for changing over the entry of said date and/or time which is to be the subject of alteration, and an entry alteration button 653 for actually altering the displayed value of said entry which is to be altered, all of which will now be explained.

Figure 59:
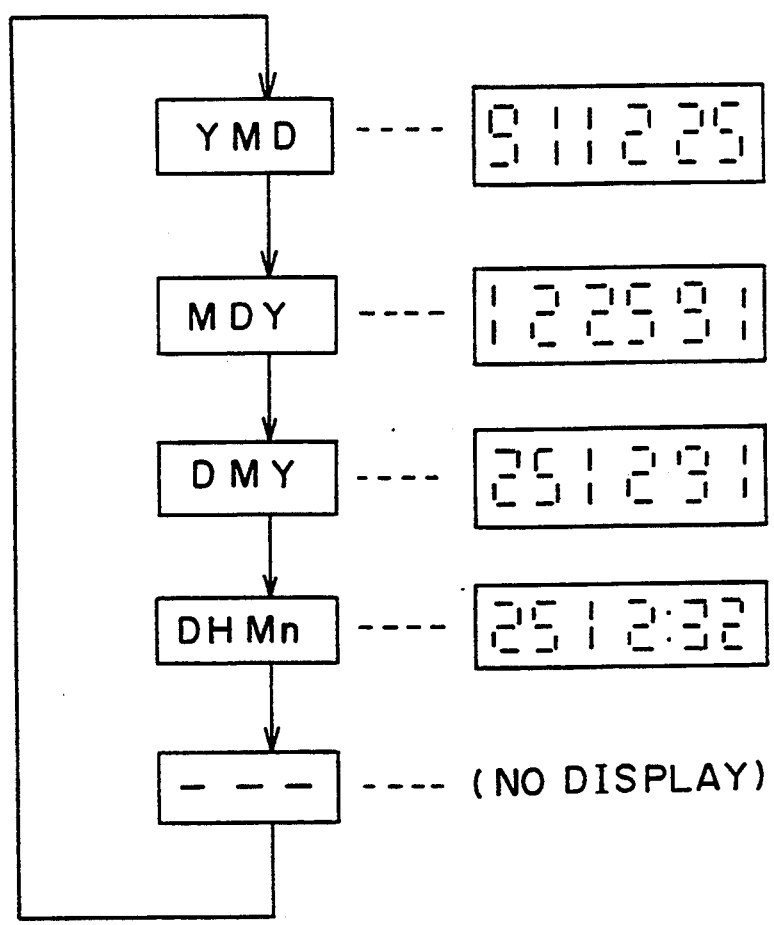
FIG. 59 shows examples of display of photographic date and time in various formats on an external display device.

FIG. 59 shows examples of the display of the photographic date and/or time in various formats on the external date/time indicator 650. As shown in this figure, each time the date/time mode changeover button 651 is pressed, the display mode for the external date/time indicator 650 is switched over in a cycle, and in each display mode the format of the information on said external date/time indicator 650 is different. Further, in the D-H-Mn (day-hour-minute) display mode, a colon is shown between the entry for the current hour and the entry for the current minute, in order to prevent any ambiguity arising.

After the desired display mode has been selected by the appropriate number of pushes of the date/time mode changeover button 651, if it is necessary to change the value of any of the three entries displayed (the date and/or the time information), this may be done by the use of the alteration entry changeover button 652 and the entry alteration button 653 in the following manner. As an example, if in the Y-M-D (year-month-day) display mode it is required to alter the value shown for the entry corresponding to the day, then first by the operation of the alteration entry changeover button 652 the entry for the day (the third entry, consisting of two digits) is set to be the entry to be altered. Each time the alteration entry changeover button 652 is pressed, the entry which is to be the subject of alteration, which is flashed repeatedly in order to distinguish it, is cycled between the three entries displayed on the external date/time indicator 650. In this case, pressing the alteration entry changeover button 652 changes over the flashing indication between the year entry, the month entry, and the day entry in a cycle. After checking that the value for the day entry is flashing, the camera user presses the entry alteration button 653 an appropriate number of times, and each time this is done the value of the day entry is increased by one in a cycle up through 31 back to 1 again in order (and it continues to flash). After the value of the day entry has been corrected, when a predetermined period of time has elapsed, the day entry value stops flashing to show that it is no longer the subject of correction, and instead remains steadily illuminated. Thereby the corrected data can be verified.

Figure 60:
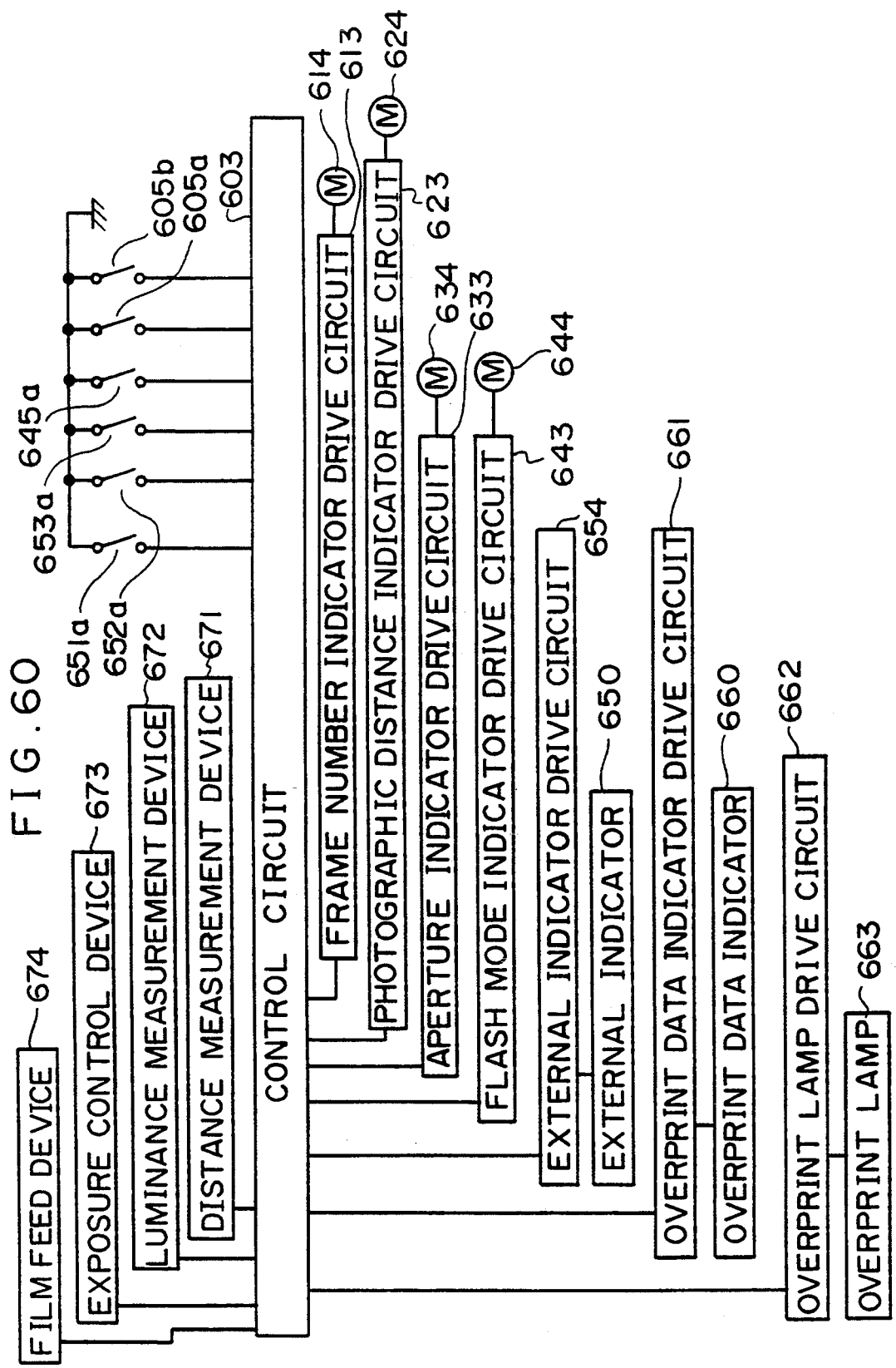
FIG. 60 is a block diagram showing the construction of the camera equipped with an indicator device according to the sixth preferred embodiment of the present invention shown in FIGS. 57A and 57B.

FIG. 60 is a block diagram showing the construction of this camera equipped with an indicator device according to the sixth preferred embodiment of the present invention shown in the above figures.

Referring to this figure, a control circuit 603 comprises a microcomputer and its associated circuitry (neither of them particularly shown), and, along with performing sequence control for the camera 601 and also various calculation functions, this control circuit 603 controls the previously described indicator devices 610, 620, 630, 640 and 650, as well as an overprint data indicator 660, by executing a control program a flow chart for which will be described hereinafter. A frame number indicator drive circuit 613 drives a stepper motor 614 so as to rotate the indicator pointer 611 of the frame number indicator 610. A photographic distance indicator drive circuit 623 drives a stepper motor 624 so as to rotate the indicator pointer 621 of the range indicator 620. An aperture indicator drive circuit 633 drives a stepper motor 634 so as to rotate the indicator pointer 631 of the aperture indicator 630. And a flash mode indicator drive circuit 643 drives a stepper motor 644 so as to rotate the indicator pointer 641 of the flash mode indicator 640. The type of stepper motor used for these indicators may desirably be the type used for a clock or a watch.

An external indicator drive circuit 654 drives the external date/time indicator 650 so as to cause it to display the appropriate combination of date and/or time information for the current mode setting thereof, and an overprint data indicator drive circuit 661 drives the overprint data indicator 660 so as to display thereon the same date and/or time information as that displayed by the external date/time indicator 650. An overprint lamp 663 is driven by an overprint lamp drive circuit 662 so as to illuminate at an appropriate instant the date/time information displayed on the overprint data indicator 660, and thereby this date/time information is overprinted on each frame of the film as it is shot or as it is wound on after having been shot. On the other hand, when by the use of the above described date/time mode changeover button 651 the overprint mode is set to nil, then both of the external date/time indicator 650 and the overprint data indicator 660 remain blank and do not display any information, and the overprint lamp 663 is not illuminated, so no film overprinting is performed.

A distance measurement device 671 measures the photographic distance from this camera to the object to be photographed, and a luminance measurement device 672 measures the level of luminance of the object to be photographed. An exposure control device 673 drive controls a shutter mechanism not shown in the figures, and an iris mechanism for the camera lens, also not shown, and thereby controls exposure and film shooting. And a film feed device 674 drive controls a film forwarding motor not shown in the figures, so as to wind on a film loaded in the camera, and so as to rewind said film when appropriate.

A switch 651a is provided which is turned ON when the date/time mode changeover button 651 is pressed, a switch 652a is provided which is turned ON when the alteration entry changeover button 652 is pressed, and a switch 653a is provided which is turned ON when the entry alteration button 653 is pressed. A switch 645a is provided which is turned ON when the flash mode changeover button 645 is pressed, a switch 605a is provided which is turned ON by the camera user operating the release button 605 shown in FIG. 57A through its first stroke, and a switch 605b is provided which is turned ON by the camera user further operating said release button 605 through its second stroke.

Figure 61:
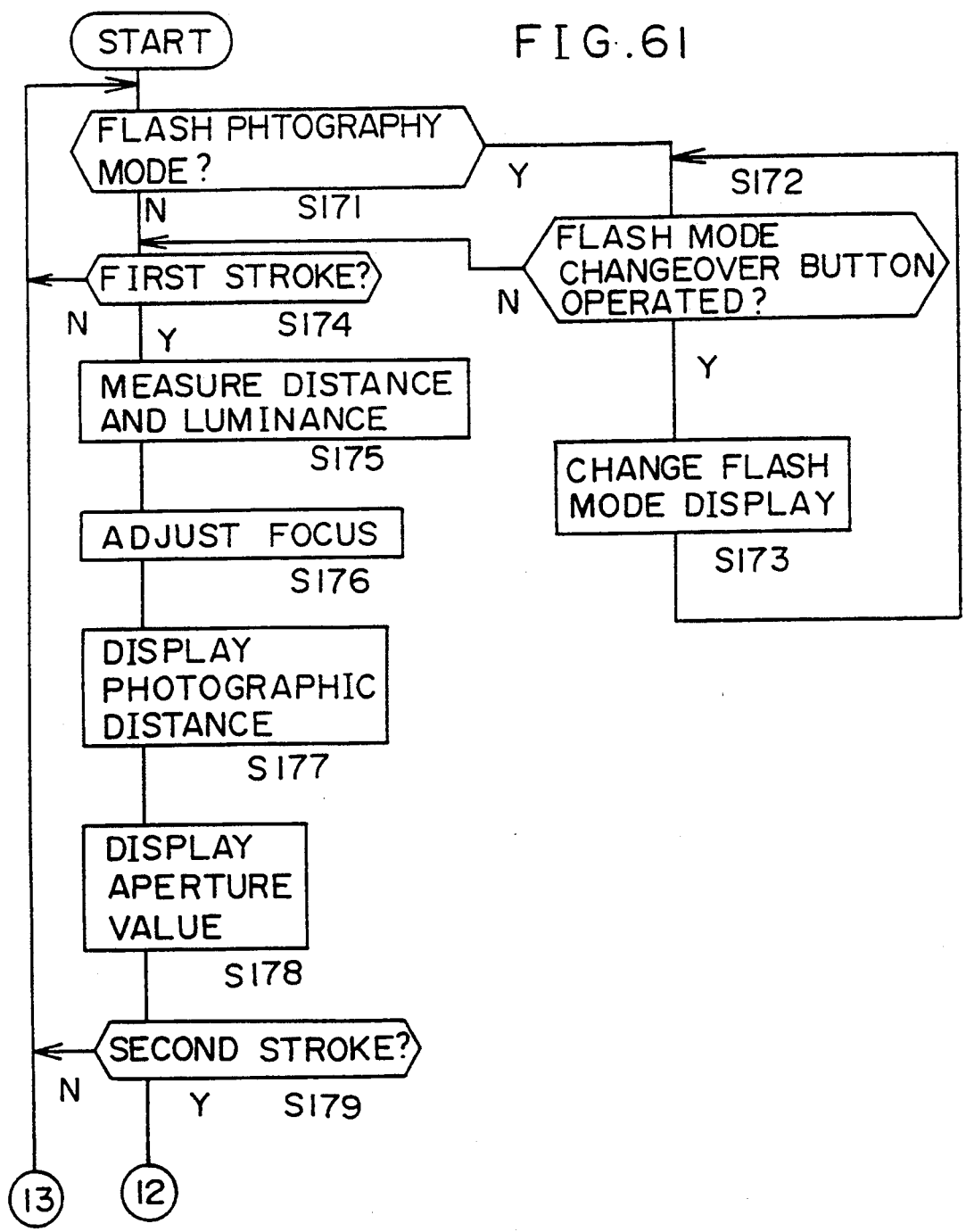
FIGS. 61 and 62 are flow charts showing the operation of a control program which is executed by a control circuit incorporating a microcomputer, comprised in the camera of FIGS. 57A and 57B.
Figure 62:
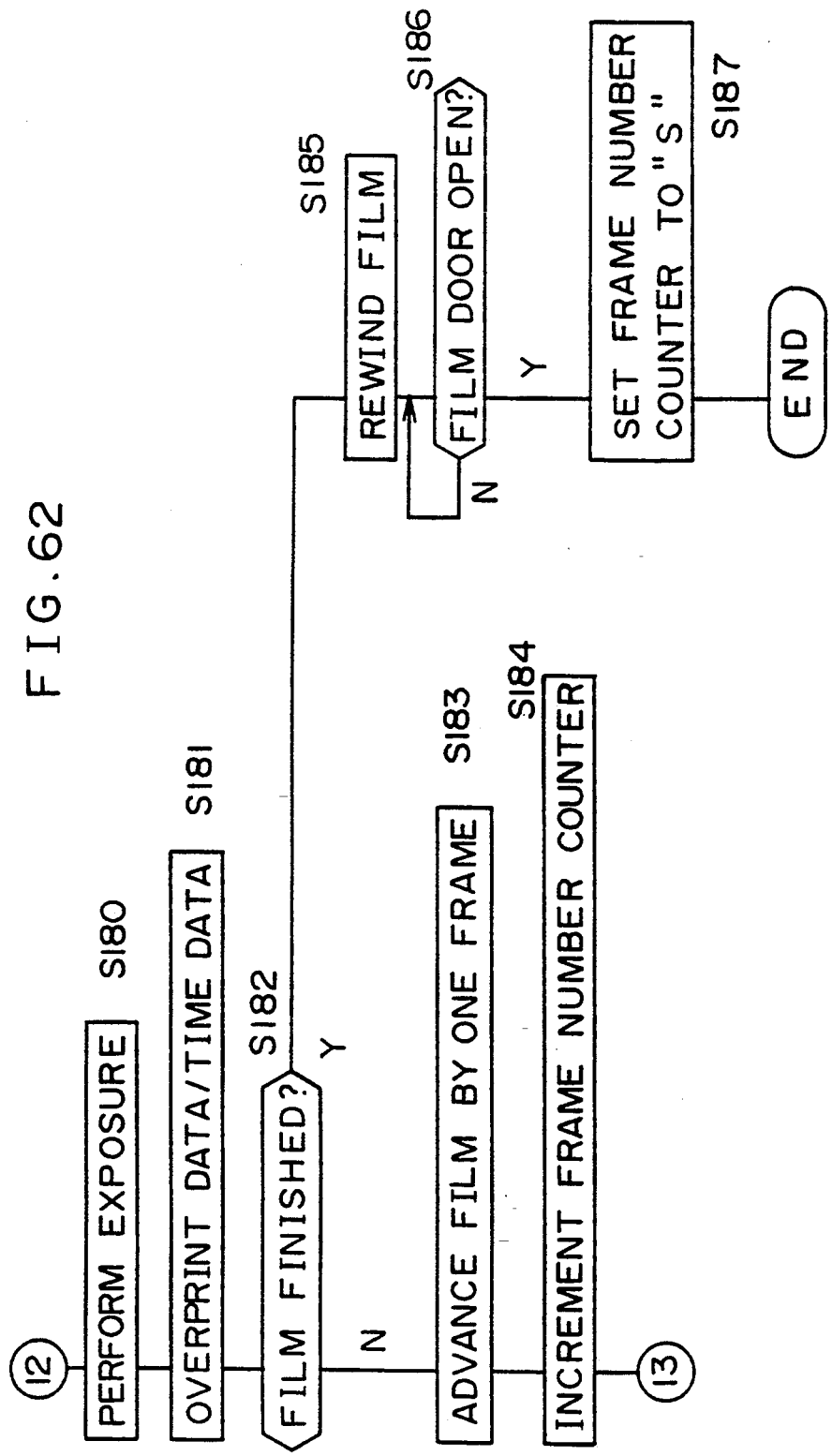

FIGS. 61 and 62 are exemplary flow charts showing the operation of a control program which is executed by the microcomputer incorporated in the control circuit 603, in order to realize the sixth preferred embodiment of the present invention. The operation of the indicator devices 610, 620, 630, 640, 650, and 660 will now be explained with reference to these flow charts.

When the main power switch 604 of the camera 601 is turned ON, the control circuit 630 starts to obey its control program which initially starts at the head of the FIG. 61 flow chart. In the first decision step S171, a decision is made as to whether or not the mode selection dial 602 provided on the upper surface of the camera 601 is set to the flash photography mode in which a flash device, not shown in the figures, is used for illuminating the photographic field. If the result of this decision is YES, then the flow of control passes next to the decision step S172. On the other hand, if the result of this decision is NO, then the flow of control passes next to the decision step S174. In the decision step S172, a decision is made based upon the output of the switch 645a as to whether or not the flash mode changeover button 645 has been pressed. If the result of this decision is YES, then the flow of control passes next to the step S173. On the other hand, if the result of this decision is NO, then the flow of control passes next to the decision step S174. In the step S173, the flash mode indicator drive circuit 643 is controlled so as to activate the stepper motor 644 to rotate the indicator pointer 641 of the flash mode indicator 640 by ninety degrees in the clockwise direction, and then the flow of control loops back to the decision step S172 again. Again in the decision step S172 a decision is made as to whether or not the flash mode changeover button 645 has been pressed, and if the result of this decision is YES, then in the step S173 the indicator pointer 641 of the flash mode indicator 640 is rotated by a further ninety degrees in the clockwise direction. On the other hand, if in the decision step S172 it is decided that the flash mode changeover button 645 has not been pressed, then the evaluation is made that the currently displayed flash mode on the flash mode indicator 640 is the selected flash mode, and the flow of control passes next to the decision step S174. After the flash mode has been thus set, in this decision step S174 a decision is made based upon the output of the switch 605a as to whether or not the shutter release button 605 has been operated through its first stroke. If the result of this decision is YES, then the flow of control passes next to the step S175. On the other hand, if the result of this decision is NO, then the flow of control loops back to the decision step S171.

In the step S175, where it has been decided that the shutter release button 605 has been first stroke operated, the distance to the object to be photographed and the luminance thereof are measured by, respectively, the distance measurement device 671 and the luminance measurement device 672, and then the flow of control proceeds to the next step S176. In this step S176, based upon the photographic distance as measured in the step S175, a focus adjustment device not shown in the figures adjusts the focal length of the lens (also not shown) of the camera 601, and then the flow of control proceeds to the next step S177. In this step S177, the photographic distance indicator drive circuit 623 is controlled so as to activate the stepper motor 624 to rotate the indicator pointer 621 of the range indicator 620 so as to point said indicator pointer 621 at the appropriate index mark on the scale plate 622 which denotes the photographic distance as measured in the step S175, and then the flow of control proceeds to the next step S178. In this step S178, the appropriate aperture value for the camera lens is calculated based upon the luminance value as measured in the step S175, and then the aperture indicator drive circuit 633 is controlled so as to activate the stepper motor 634 to rotate the indicator pointer 631 of the aperture indicator 630 so as to point said indicator pointer 631 at the appropriate index mark on the scale plate 632 which denotes said calculated aperture value, and then the flow of control proceeds to the next decision step S179.

In this decision step S179, a decision is made based upon the output of the switch 605b as to whether or not the shutter release button 605 has been operated through its second stroke. If the result of this decision is YES, then the flow of control passes next to the step S180 (see the FIG. 62 flow chart which continues on from the FIG. 61 flow chart). On the other hand, if the result of this decision is NO, then the flow of control loops back to the step S171.

In the step S180 of FIG. 62, the exposure control device 673 is controlled so as to operate the iris mechanism (not shown) to set the aperture of the camera lens to the value just calculated and displayed on the aperture indicator 630, and so as immediately thereafter to operate the shutter mechanism (also not shown) of the camera 601 so as to perform photography, and then the flow of control proceeds to the next step S181. In this step S181, the overprint lamp drive circuit 662 is controlled so as to illuminate the overprint lamp 663 for a predetermined time period, and thereby the information previously set on the overprint data indicator 660 relating to the date and/or time of shooting this photograph is overprinted on the film frame that has just been shot. At this time, the same data as indicated by said overprint data indicator 660 are displayed to the user of the camera on the external date/time indicator 650. When the overprinting of the date and/or time data has been completed, the flow of control proceeds to the next decision step S182, in which a decision is made as to whether or not the film has been finished, i.e. as to whether or not the frame which has just been shot was the last available frame on the film currently loaded in the camera 601. If the result of this decision is YES, then the flow of control passes next to the step S185. On the other hand, if the result of this decision is NO, then the flow of control passes next to the step S183. In the step S183, at which point it has been decided that the film has not yet been finished, the film feed device 674 is activated so as to wind on the film by one frame, and then the flow of control proceeds to the next step S184, in which the frame number indicator drive circuit 613 is controlled so as to activate the stepper motor 614 to rotate the indicator pointer 611 of the frame number indicator 610 clockwise through a certain angle so as to point said indicator pointer 611 at the next index mark on the scale plate 612 which denotes the number of the next frame to be shot, and then the flow of control loops back to the decision step S171 of FIG. 61.

On the other hand, if in the decision step S182 it is decided that the film has been finished, then the flow of control passes next to the step S185, in which the film feed device 674 is activated so as to rewind the film into its cartridge (not shown in the figures), and then the flow of control proceeds to the next decision step S186, in which based upon the output signal from a film door sensor switch (not shown in the figures) a decision is made as to whether or not the film door (also not shown) of the camera 601 is open. If the result of this decision is NO, then the flow of control loops back to this decision step S186 in a tight loop; but, when the film door is opened and the result of this decision becomes YES, then the flow of control passes next to the step S187. In this step S187, it is deemed that the completely shot film has been removed from the camera 601 through the now open film door, and therefore the frame number indicator drive circuit 613 is controlled so as to activate the stepper motor 614 to rotate the indicator pointer 611 of the frame number indicator 610 so as to point said indicator pointer 611 at the index mark "S" on the scale plate 612 which denotes that no film is loaded into the camera 601, and then the operation of this control program terminates.

In this manner, since with this sixth preferred embodiment of the present invention described above the information related to photographic date and/or time which is overprinted on the film by the date/time overprinting device is digitally displayed on the external date/time indicator 650 (which may be of a liquid crystal type or the like) in the same format as that in which it is overprinted on the film, thereby it is possible to check the display format of said date/time information which is being overprinted on the film by the use of said external date/time indicator. Further, since with the construction disclosed above the various information related to photographic conditions other than the abovementioned date/time information for film overprinting is displayed via the use of the indicators 610 through 640 which comprise rotating indicator pointers which point at index marks on scale plates denoting values of photographic parameters, reading of such information is facilitated, and the limited space available on the surface of the camera is rationally used, whereby a compact display device for a camera can be made available.

Furthermore it should be understood that, although with the above described sixth preferred embodiment the information related to photographic conditions other than the overprinting information which was displayed via the use of the indicators comprising rotating indicator pointers which pointed at index marks on scale plates denoting values of photographic parameters was the film frame number, the photographic distance, the aperture value, and the flash mode, in fact the present invention is not to be considered as limited by these illustrative examples of possible information to be thus displayed, and this information related to photographic conditions other than the overprinting information relating to photographic date and/or time which is displayed on the rotatory indicators of this type could be any type of photographic information, such as for example shutter speed or the like.

Further, the arrangement of the indicator devices comprising rotating indicator pointers which point at index marks on scale plates is not to be considered as being limited to the arrangement disclosed above. Further, neither the above disclosed display format for digitally displaying the date/time data, nor the above disclosed method of changing over between said displayed data for alteration thereof, nor the above disclosed method of alteration for said displayed data, should be considered as limitative of the present invention.

Yet further, although the above described sixth preferred embodiment of the present invention has been described by way of example in terms of a camera equipped with a data overprinting device, in fact the indicator device of the present invention can also be applied to a camera not equipped with such a data overprinting device.

Preferred Embodiment 7

Figure 63:
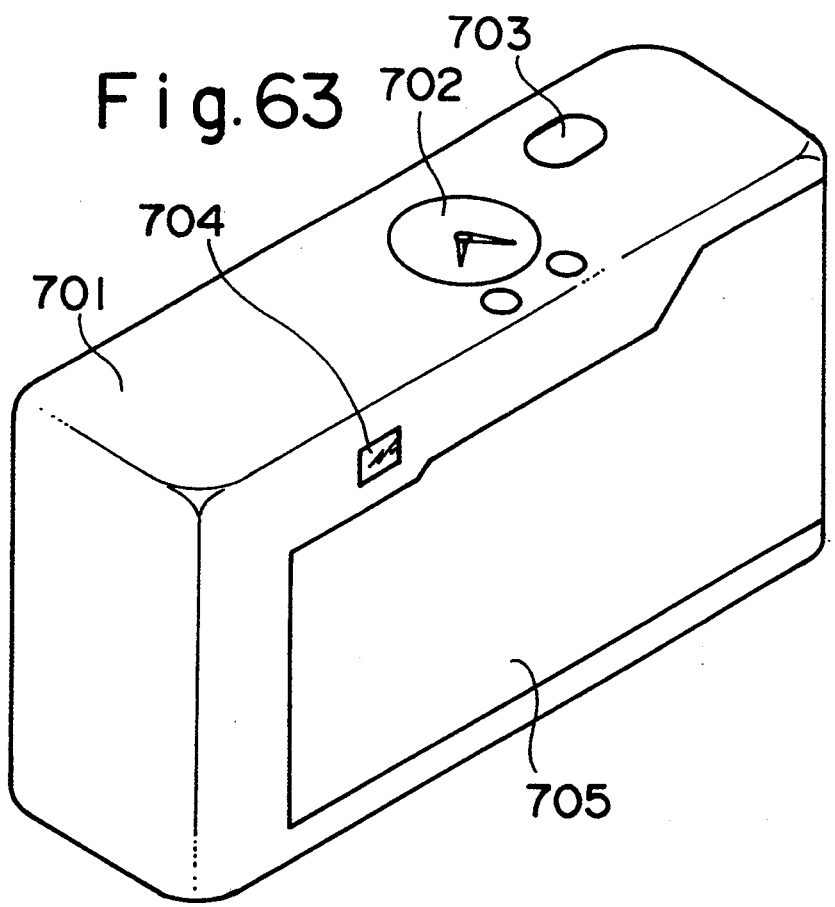
FIG. 63 is a perspective view as seen from the rear of a camera equipped with an indicator device according to the seventh preferred embodiment of the present invention.
Figure 64:
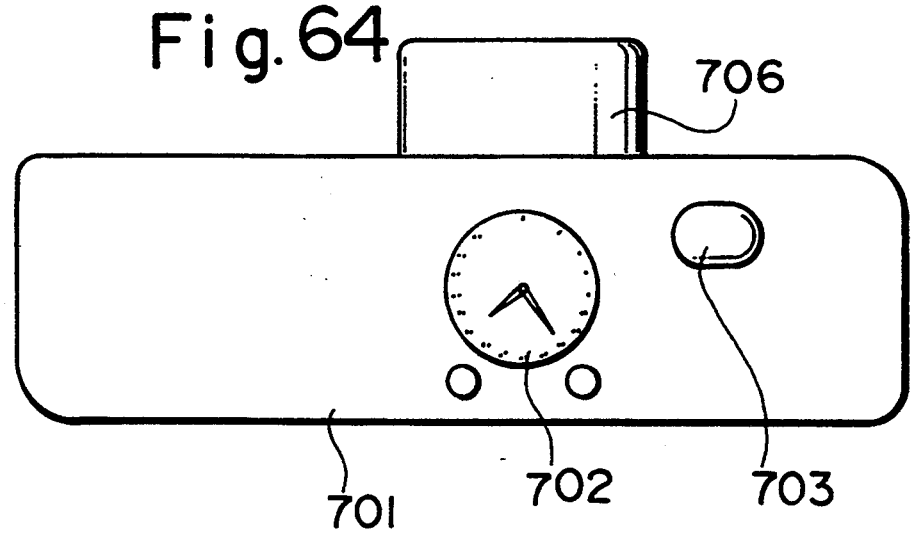
FIG. 64 is a view of the upper surface of the camera shown in FIG. 63.

FIG. 63 is a perspective view as seen from the rear of a camera, denoted as 701, equipped with an indicator device according to the seventh preferred embodiment of the present invention, and FIG. 64 is a view of the upper surface of said camera 701.

On the upper surface of the camera 701 there are provided an analog type indicator device 702 which serves as a film frame number counter, and a release button 703. Further, at the upper portion of the rear side of the camera 701 there are provided a viewfinder 704 and a film lid 705. On the front surface of the camera 701 there is provided a tubular lens housing 706 which supports a photographic lens not shown in the figures.

Figure 65:
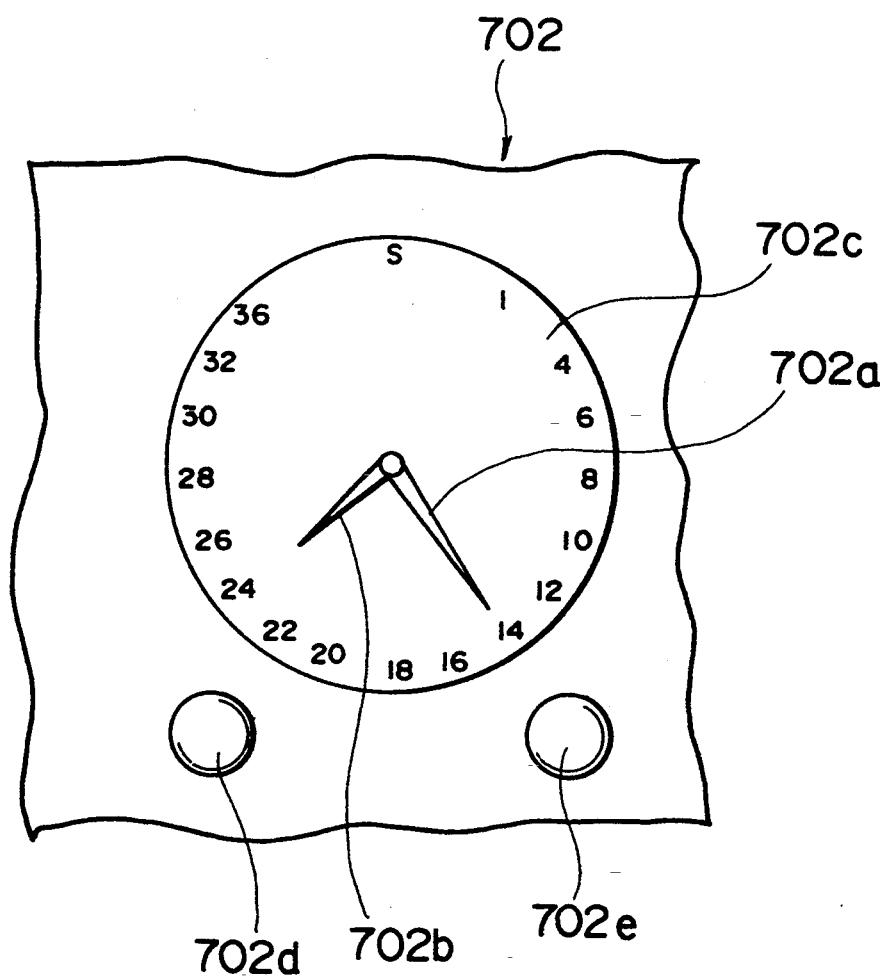
FIG. 65 is an enlarged plan view of a film counter shown in FIGS. 63 and 64.

FIG. 65 is an enlarged plan view of the film frame number counter 702 shown in FIGS. 63 and 64.

The frame number counter 702 comprises a pair of indicator pointers, namely a long indicator pointer 702a and a short indicator pointer 702b, and further comprises an inscribed scale plate 702c over which said indicator pointers 702a and 702b rotate, which is inscribed, around a circular track thereon, with the character "S" and with a subset of the integers from 1 through 36 for denoting film frame numbers. Further, said frame number counter 702 comprises an up setting button 702d which is for moving the short indicator pointer 702b ahead by one frame number every time said up setting button 702d is pressed, and a down setting button 702e which is for moving the short indicator pointer 702b back by one frame number every time said down setting button 702e is pressed.

The long indicator pointer 702a is for indicating the number of frames of film that have been shot, while the short indicator pointer 702b is for indicating the total number of frames on the film. This seventh preferred embodiment will be described under the assumption that it is a 24 frame type film which has been loaded into the camera. Further, if the user of the camera wishes to stop photography after a previously determined limit number of frames of film have been shot, he or she should use the up setting button 702d and the down setting button 702e so as to move the short indicator pointer 702b to point at the numeral denoting that limit frame number, and when the long indicator pointer 702a reaches this position of the short indicator pointer 702b in its movement the release button 703 becomes locked, so that shooting any further frames of film becomes impossible.

Although in the description of this seventh preferred embodiment it has been postulated as an example that the frame number counter 702 is of an analog type, it would be acceptable, as an alternative, for the character "S" and the subset of the integers from 1 through 36 which denote film frame numbers to be disposed along a straight track, rather than along a circular one; and in such a case the number of film frames shot and the total number of film frames available should be displayed by bar graph type indicators. Further, it would also be acceptable for the frame number counter 702 of FIG. 65 to be realized in the form of a liquid crystal type display or the like, rather than as a mechanical indicator device.

Figure 66:
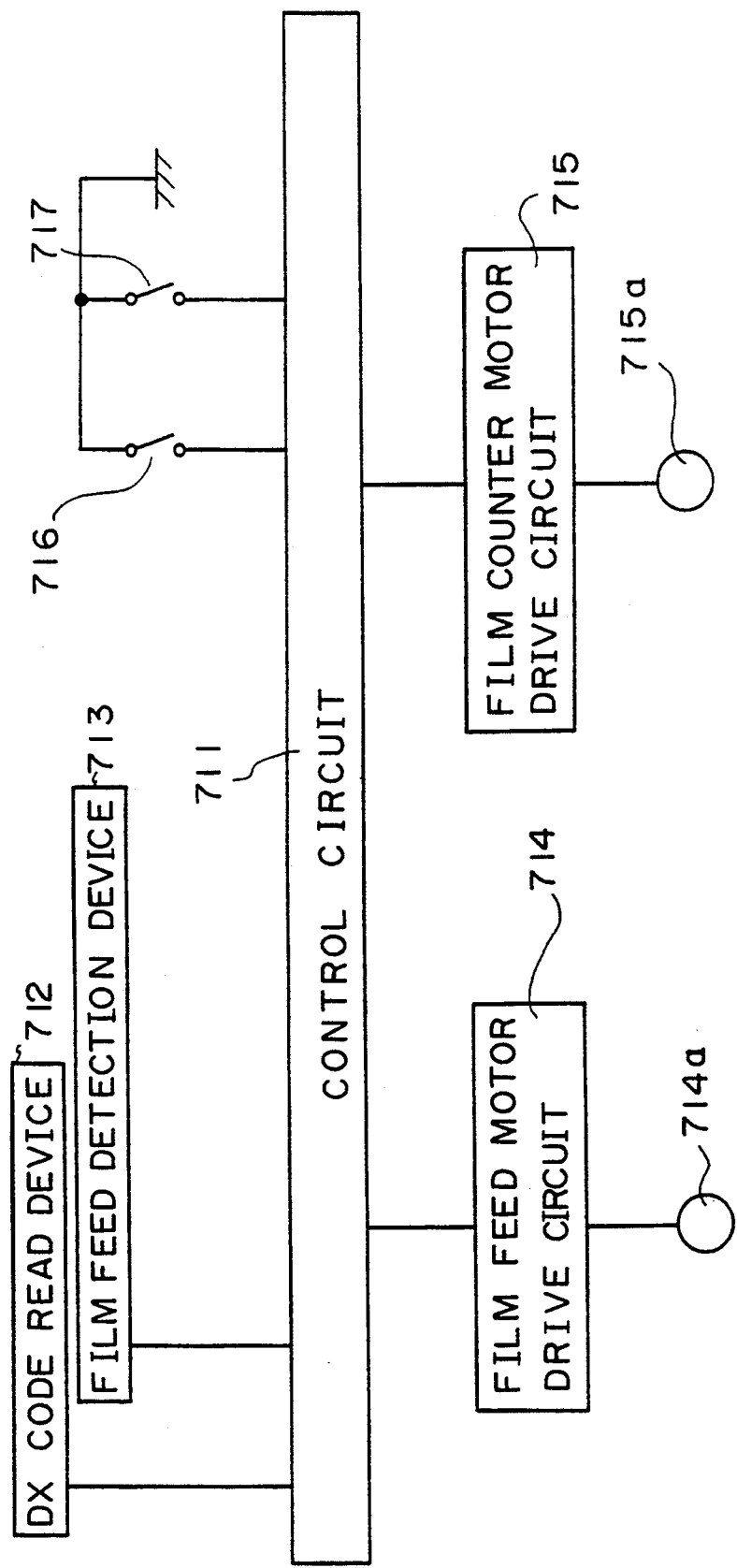
FIG. 66 is a block diagram showing the construction of the camera equipped with an indicator device according to the seventh preferred embodiment of the present invention shown in FIGS. 63 and 64.

FIG. 66 is a block diagram showing the construction of the camera 701 equipped with an indicator device according to the seventh preferred embodiment of the present invention shown in FIGS. 63 and 64. Referring to this figure, a control circuit 711 comprises a microcomputer and its associated circuitry (neither of them particularly shown), and, along with performing sequence control for the camera 701 and also various calculation functions, this control circuit 711 controls the previously described frame number counter 702 by executing a control program a flow chart for which will be described hereinafter. To this control circuit 711 there are connected a DX code read device 712, a film feed detection device 713, a film feed motor drive circuit 714, a film counter motor drive circuit 715, and switches 716 and 717.

The DX code read device 712 reads the per se conventional DX code that is provided on the surface of the film cartridge (not particularly shown) which is loaded into the camera 701, and transmits the information encoded by said DX code related to total number of film frames on this film to the control circuit 711. The film feed detection device 713 detects the amount of feeding onward of the film and the final end of the film if it is arrived at, and outputs the result to the control circuit 711. The film feed motor drive circuit 714 winds onward the film by driving a film feed motor 714a, and when required rewinds the film back into the film cartridge. The film counter motor drive circuit 715 drives a stepper motor 715a so as to rotate the long indicator pointer 702a and the short indicator pointer 702b of the frame number counter 702 across the inscribed scale plate 702c thereof, so as to indicate film frame numbers as will be explained shortly. If any kind of accident or problem occurs with camera operation, the stepper motor 715a is driven so as to drive the long indicator pointer 702a and the short indicator pointer 702b of the frame number counter 702 repeatedly to and fro, and by thus vibrating them provides a visual indication of trouble. The switch 716 is ON if the film lid 705 of the camera 701 is open and is OFF if the film lid is closed, while the switch 717 is ON if the release button 703 for taking a photograph with the camera 701 is pressed.

Figure 67:
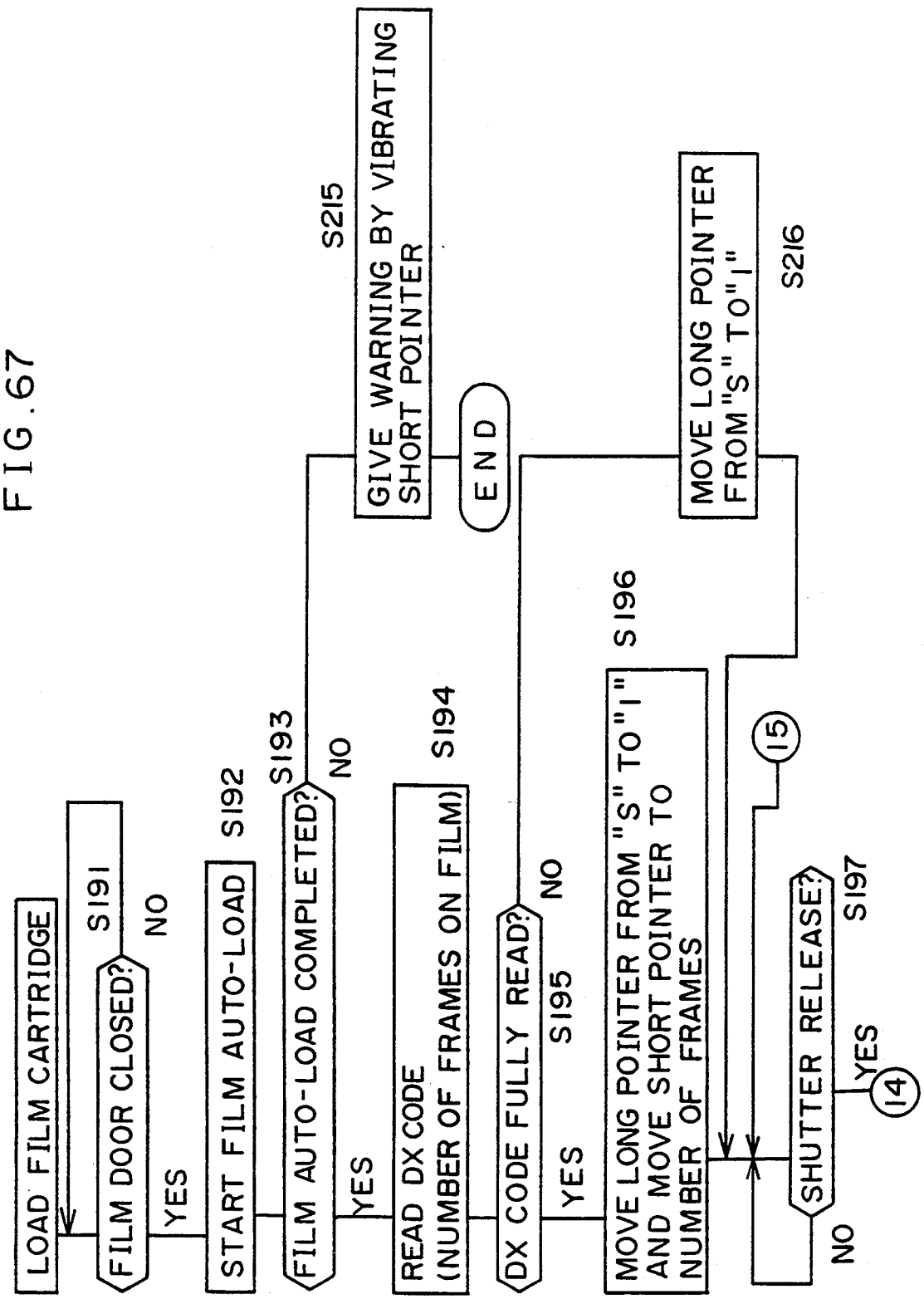
FIGS. 67 and 68 are flow charts showing the operation of a film counter indicator control program which is executed by a control circuit incorporating a microcomputer, comprised in the camera of FIGS. 63 and 64.
Figure 68:
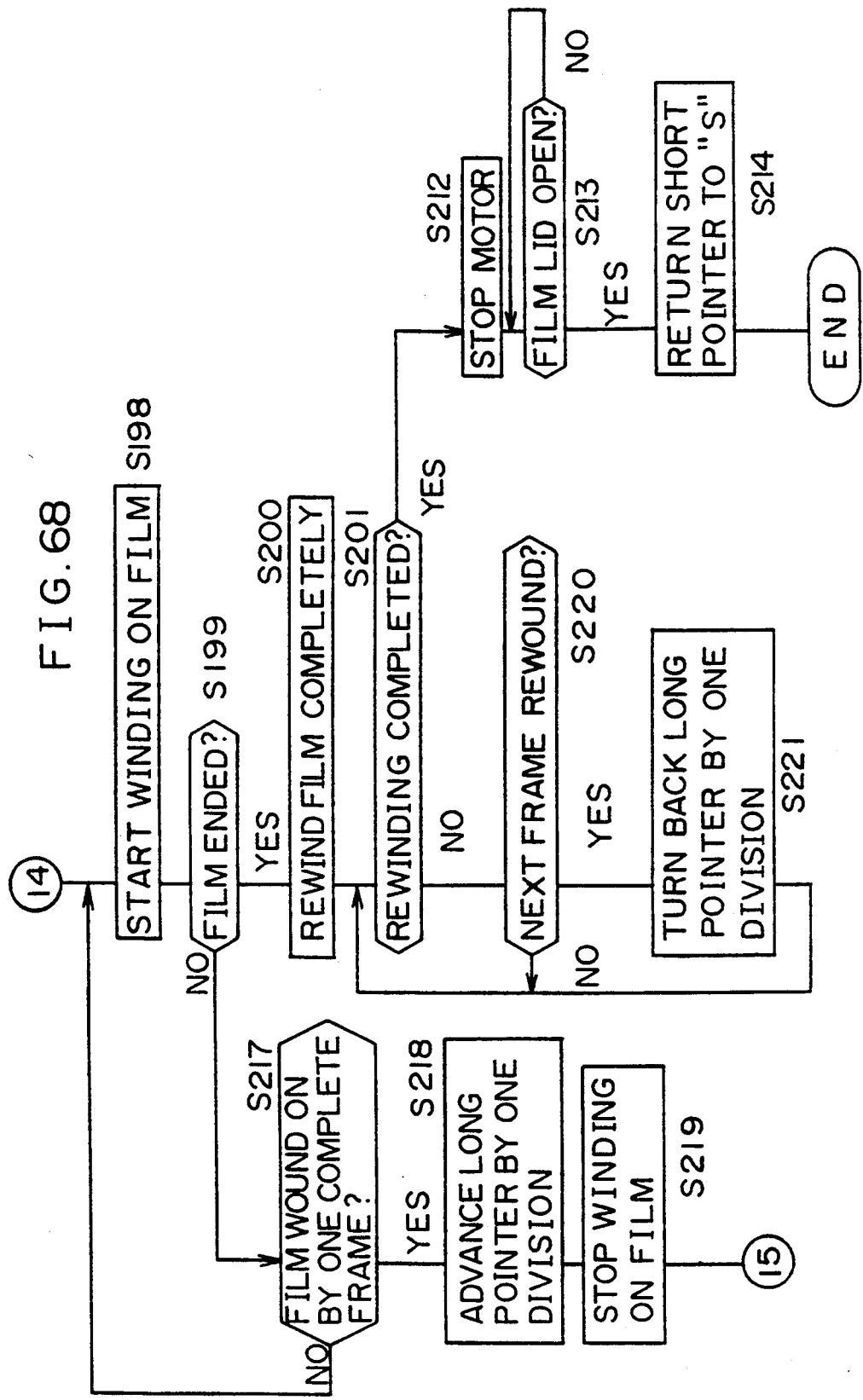

FIGS. 67 and 68 are flow charts showing the operation of a film counter indicator control program which is executed by the microcomputer incorporated in the control circuit 711 shown in FIG. 66. The operation of the indicator device according to the seventh preferred embodiment of the present invention will now be explained with reference to these flow charts.

The control circuit 711 starts to execute this control program when a film cartridge is loaded into the camera 701. At this time, both the long indicator pointer 702a and the short indicator pointer 702b of the frame number counter 702 are pointing at the character "S" inscribed on the inscribed scale plate 702c thereof.

First, in the first decision step S191, a decision is made based upon the output of the switch 716 as to whether or not the film lid 705 of the camera is closed. If the result of this decision is NO, then the flow of control returns back to this decision step S191 again in a tight loop. On the other hand, when the film lid 705 is closed and the result of this decision becomes YES, then the flow of control passes next to the step S192, in which the film feed motor drive circuit 714 is controlled so as to operate the film feed motor 714a to start the film auto loading process. This film auto loading process causes the leading end of the film to be taken up by the winding spool therefor so that the film is fed along until the first frame thereof is positioned in a predetermined position suitable for photography. The flow of control then proceeds to the decision step S193, in which a decision is made as to whether or not the film auto loading process has been satisfactorily completed without any problem. If the result of this decision is YES, then the flow of control passes next to the step S194, while if the result of this decision is NO and a problem has occurred then the flow of control passes next to the step S215, in which a warning is given to the camera user of this problem for a certain predetermined time period by the short indicator pointer 702b of the frame number counter 702 being vibrated to and fro about the position of the character "S" inscribed on the inscribed scale plate 702c thereof; and then the operation of this control program terminates.

On the other hand, if the film auto loading process is completed satisfactorily, then in the step S194 the DX code read device 712 is controlled so as to cause it to read the DX code which is written on the film cartridge which has just been loaded into the camera 701, and then the flow of control proceeds to the next decision step S195, in which a decision is made as to whether or not the DX code has been properly and fully read in. If the result of this decision is YES, then the flow of control passes next to the step S196, while if the result of this decision is NO, then the flow of control passes next to the step S216.

If the DX code was properly read in, then in the step S196 the film counter motor drive circuit 715 is activated and controlled so as to rotate the long indicator pointer 702a of the frame number counter 702 in the clockwise direction across the inscribed scale plate 702c from its original position in which its tip was pointing at the legend "S" to a new position in which its tip is pointing at the numeral "1", and so as also to move the short indicator pointer 702b of said frame number counter 702 in the clockwise direction across said inscribed scale plate 702c from its original position in which its tip was pointing at the legend "S" to a new position in which its tip is pointing at the numeral—exemplarily illustrated in FIG. 65 as being 24—corresponding to the total number of frames on the film which has just been loaded into the camera, which was read in the previous step S195 by the DX code read device 712. On the other hand, if in the step S194 the DX code was not properly read in, then in the step S216 the film counter motor drive circuit 715 is activated and controlled so as only to rotate the long indicator pointer 702a of the frame number counter 702 in the clockwise direction across the inscribed scale plate 702c from its original position in which its tip was pointing at the legend "S" to the new position in which its tip is pointing at the numeral "1", while not moving the short indicator pointer 702b of said frame number counter 702. In either case, the flow of control next proceeds to the decision step S197.

In this decision step S197, based upon the output from the switch 717, a decision is made as to whether or not the shutter of the camera is being released. If the result of this decision is YES, then the flow of control passes next to the step S198 of FIG. 68. On the other hand, if the result of this decision is NO, then the flow of control loops back to this decision step S198 in a tight loop. In the step S198, the film feed motor drive circuit 714 is activated to start winding on the film, and then the flow of control proceeds to the next decision step S199, in which a decision is made as to whether or not the final end of the film has come, based upon the output from the film feed detection device 713. If the result of this decision is YES, then the flow of control passes next to the step S200. On the other hand, if the result of this decision is NO, then the flow of control passes next to the decision step S217, in which, again based upon the output of the film feed detection device 713, a decision is made as to whether or not the film has been wound on yet by a full frame, so that the next frame of the film is in the predetermined place behind the shutter of the camera waiting to be shot. If the result of this decision is NO, then the flow of control loops back to the step S198 again. On the other hand, if the result of this decision is YES, then the flow of control passes next to the step S218, in which the long indicator pointer 702a of the frame number counter 702 is rotated in the clockwise direction across the inscribed scale plate 702c to its next position, in which its tip is pointing at the numeral one greater than the one it was pointing at before, thus now indicating the new number of film frames that have been shot, one greater than the old number thereof. Then the flow of control proceeds to the next step S219, in which the winding on of the film is stopped; and then the flow of control returns to the step S197 of FIG. 67.

If on the other hand in the decision step S199 it is deemed that the final end of the film has arrived, then the flow of control proceeds to the next step S200, in which the film feed motor drive circuit 714 is activated to rotate the motor 714a in the reverse rotational direction, so as to start rewinding the film. Then the flow of control proceeds to the next step S201, in which, based upon the output from the film feed detection device 713, a decision is made as to whether or not the film has been completely rewound. If the result of this decision is YES, then the flow of control passes next to the step S212. On the other hand, if the result of this decision is NO, then the flow of control passes next to the decision step S220. In this decision step S220, a decision is made as to whether or not the next frame of the film has been rewound, again based upon the output from the film feed detection device 713. If the result of this decision is YES, then the flow of control passes next to the step S221. On the other hand, if the result of this decision is NO, then the flow of control loops back to the decision step S201 again. And in the step S221 the long indicator pointer 702a of the frame number counter 702 is rotated in the anticlockwise direction across the inscribed scale plate 702c to its previous position, so as to indicate the previous frame number; and then the flow of control loops back to the decision step S201 again.

On the other hand, if in the decision step 201 a YES decision is reached, so that the film has now been completely rewound, then the flow of control proceeds to the next step S212, in which the film feed motor drive circuit 714 is controlled to stop operating the film forwarding motor 714a, and then the flow of control proceeds to the next decision step S213, in which, based upon the output signal from the switch 716, a decision is made as to whether or not the film lid 705 is open. If the result of this decision is NO, then the flow of control loops back to this decision step S213 in a tight loop. On the other hand, if the result of this decision is YES, then the flow of control passes next to the step 214, in which the short indicator pointer 702b of the frame number counter 702 is rotated across the inscribed scale plate 702c to its position to point at the symbol "S"; and then the operation of this program terminates.

In this manner, since this construction utilizes the inscribed scale plate 702c on which a plurality of legends are disposed in order indicating film frame numbers, with the long indicator pointer 702a being utilized to show the number of the next film frame to be shot, and the short indicator pointer 702b is utilized to show the total number of film frames available for being shot, thereby it becomes easy for the user of the camera to check not only the number of film frames that have been shot up until the present moment but also the total number of frames of film that were available on the film that is currently loaded into the camera. Further, from the angle made between the long indicator pointer 702a and the short indicator pointer 702b, the number of film frames remaining that can be shot can be directly intuitively perceived by the user of the camera with no need for explicit calculation thereof.

Preferred Embodiment 8

Figure 69:
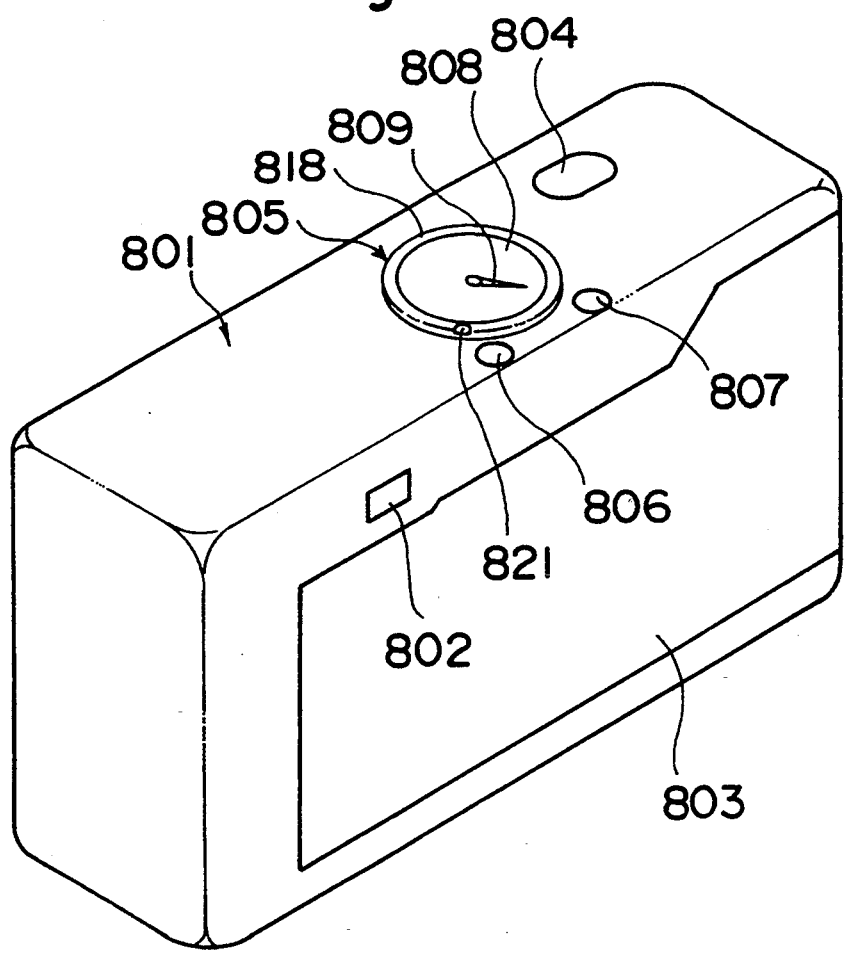
FIG. 69 is a perspective view as seen from the rear of a camera equipped with an indicator device according to the eighth preferred embodiment of the present invention.
Figure 70:
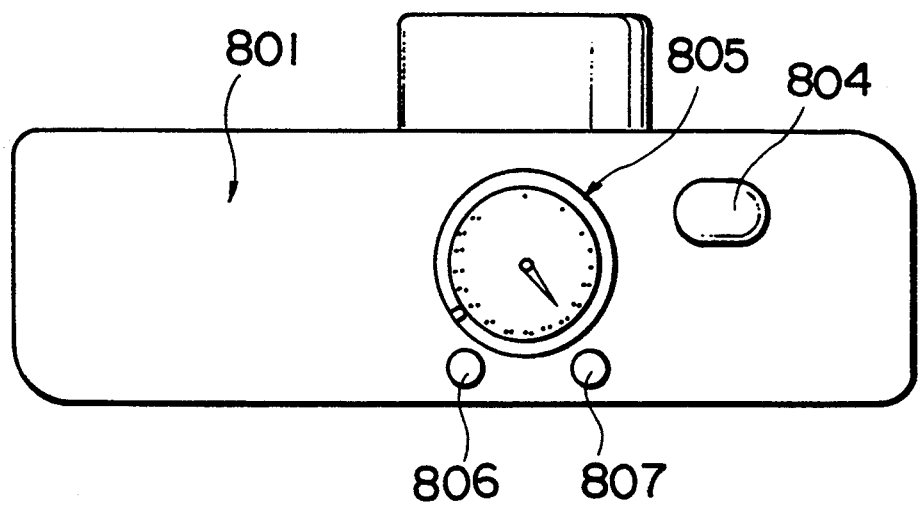
FIG. 70 is a plan view of the camera shown in FIG. 69.

FIG. 69 is a perspective view as seen from the rear of a camera, denoted as 801, equipped with an indicator device according to the eighth preferred embodiment of the present invention, and FIG. 70 is a view of the upper surface of said camera 801.

At the upper portion of the rear side of the camera 801 there are provided a viewfinder 802 and a film lid 803. Further, on the upper surface of the camera 801 there are provided a release button 804, and an indicator device 805 which serves as a film frame number counter. Further, adjacent to the frame number counter 805, there are provided a warning setting button 806 and a warning cancellation button 807 which will be described hereinafter.

Figure 71:
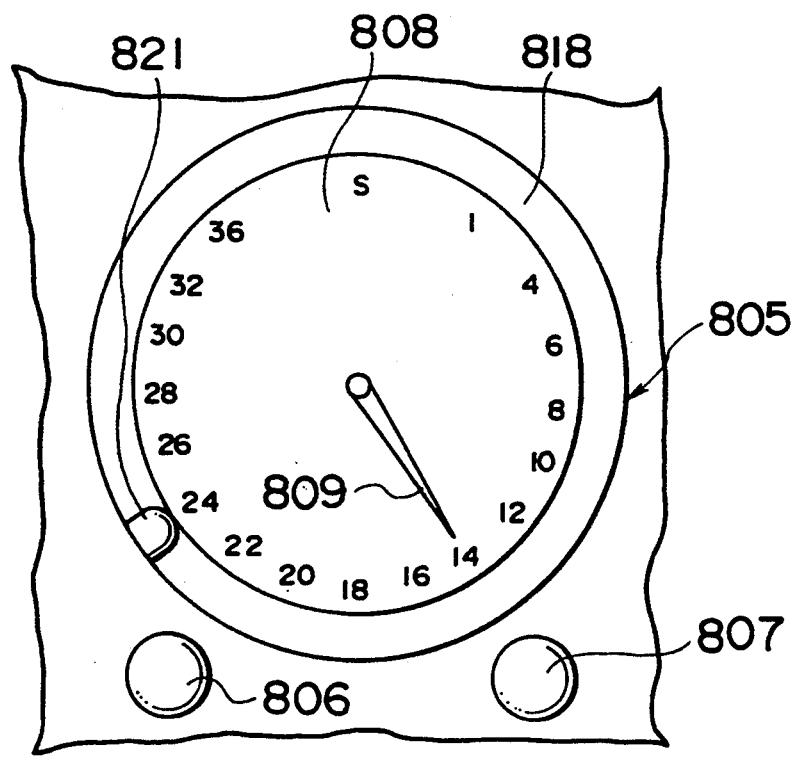
FIG. 71 is an enlarged view of a photographic frame counter indicator device incorporated in the camera shown in FIGS. 69 and 70.
Figure 72:
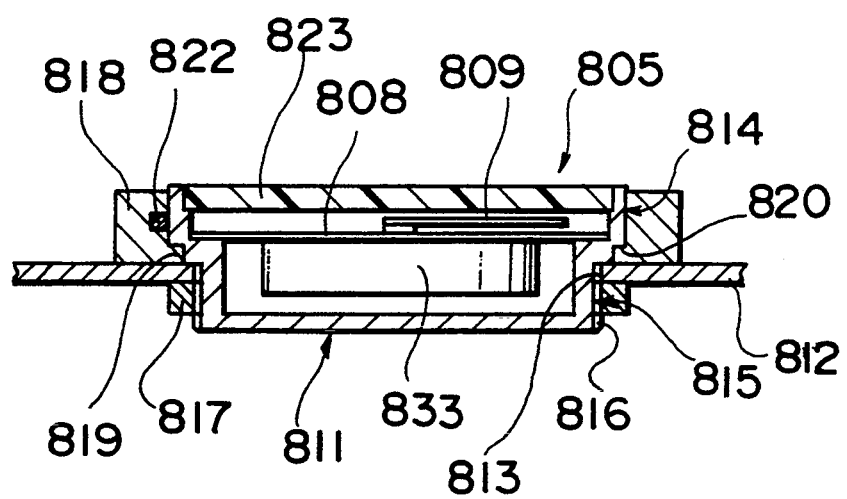
FIG. 72 is a sectional view of the photographic frame counter indicator device shown in FIG. 71.

FIG. 71 is an enlarged view of the frame number counter 805, and FIG. 72 is a sectional view thereof. The reference numeral 808 denotes an inscribed scale plate, on which a series of numerals denoting film frame numbers in the range from 1 to 36 inclusive, as well as the character "S", are written at intervals around a circular track. One end of an indicator pointer 809 is rotatably pivoted through the scale plate 808 substantially at the center of said circular track, i.e. in the middle of the scale plate 808. The other end of the indicator pointer 809 points at one or another of the numerals etc. on the scale plate 808, and thereby the current film frame number is indicated. When the film lid 803 is opened and a film (not shown in the figures) is charged into the camera 801, then the indicator pointer 809 is pointed at the character "S" on the scale plate 808; but when an initial winding on process has been performed and the film has been wound forward through a predetermined distance so that its first frame is available for being shot, then said indicator pointer 809 is rotated so as now to point at the numeral "1" on said scale plate 808. After this, each time one frame of film is shot the indicator pointer 809 is rotated in the clockwise direction by a suitable amount to point at the numeral representing the serial number of the next film frame to be shot (or, if no such numeral is inscribed on the scale plate 808, to a position on said scale plate 808 intermediate between the nearest numeral on said scale plate 808 below and the nearest numeral on said scale plate 808 above said next film frame serial number).

The inscribed scale plate 808, as shown in FIG. 72, is received within a tubular case 811, and this case 811 is inserted into a through hole 813 formed in a transparent cover 812, made of glass, fitted to the main body of the camera 801. The tubular case 811 is formed with a large diameter portion 814 and a small diameter portion 815, and the small diameter portion 815 is inserted through the through hole 813 formed in the cover 812, while the large diameter portion 814 is too large to fit into said through hole 813. The small diameter portion 815 is formed with a screw portion 816 around it, and the tubular case 811 is fixed to the transparent cover 812 by a nut element 817 being screwed over its said screw portion 816 down against the rear surface of said tubular case 811, so as to pinch the portion of the cover 812 peripheral to the through hole 813 between said nut element 817 and the large diameter portion 814 of said tubular case 811. A rotatable ring 818 is freely rotatably fitted over the outer peripheral surface of said large diameter portion 814 of said tubular case 811. On the end surface of said rotatable ring 818 which faces towards and slides against the transparent cover 812 there is formed an inwardly projecting ring shaped rim portion 819 which is snugly and slidably held in a circular groove 820 formed in the edge of the large diameter portion 814 of the tubular case 811 by being sandwiched between said large diameter portion 814 and the transparent cover 812, whereby said rotatable ring 818 is held in position while being free to rotate relative to the transparent cover 812. On this rotatable ring 818, as shown in FIG. 71, there is formed a visible indicator portion 821 which, by the rotatable ring 818 being rotated relative to the transparent cover 812 of the camera 801, can be opposed to any one of the numerals inscribed on the scale plate 808 denoting film frame numbers, so as to indicate said numeral to the user of the camera. At the radially inner end of this indicator portion 821, as shown in FIG. 72, there is inset into the rotatable ring 818 a reed switch 822, which goes closed circuit when the indicator pointer 809 arrives at a position where its tip portion directly points at said indicator portion 821. A transparent cover 823 is fitted over the upper side of the scale plate 808.

Figure 73:
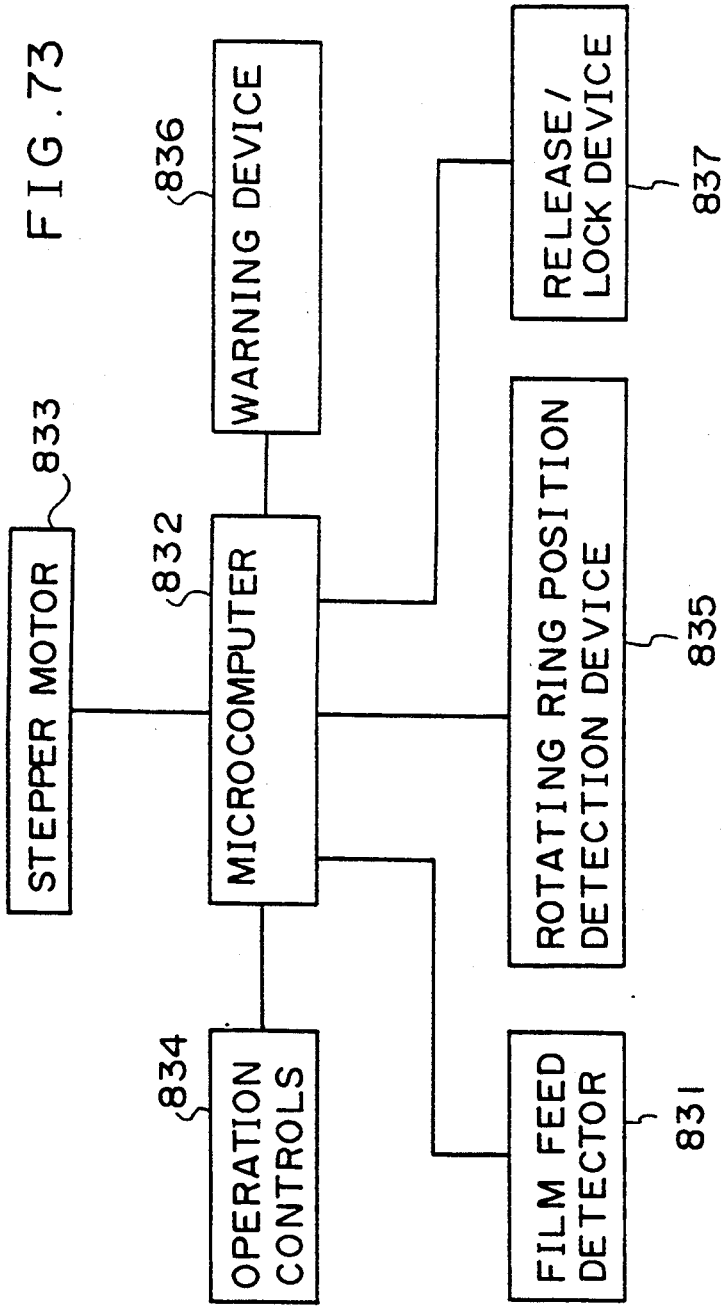
FIG. 73 is a block diagram showing the construction of the camera equipped with an indicator device according to the eighth preferred embodiment of the present invention shown in FIGS. 69 and 70.

FIG. 73 is a block diagram showing the construction of this camera 801 equipped with an indicator device according to the eighth preferred embodiment of the present invention.

With this frame number counter 805, the feeding of the film is detected by a film feed detector 831 which for example may rotate together with a free sprocket of the camera or the like, and, when a microcomputer 832 makes a decision that the film frame number has increased, it activates a stepper motor 833 so as to rotate the indicator pointer 809 in the clockwise direction through exactly a predetermined angular distance. On the other hand, when the film is being rewound by the stepper motor 833 being operated to rotate in the reverse direction, the indicator pointer 809 is rotated in the anticlockwise direction. The reference numeral 834 denotes an control device which controls whether or not a predetermined warning is given, and this control device 834 comprises the previously mentioned warning setting button 806 and warning cancellation button 807. When the warning setting button 806 is pressed, warning mode is set in which a predetermined warning is given, while when the warning cancellation button 807 is pressed this warning mode is cancelled. With this eighth preferred embodiment, with the warning mode set, when a rotating ring position detection device 835 detects that the indicator pointer 809 has reached the angular position of the indicator portion 821, a warning indication consisting of a warning sound or light or the like is emitted by a warning device 836, and also the release button 804 is locked by a release/lock device 837. In this eighth preferred embodiment, the rotating ring position detection device 835 is implemented by the end of the indicator pointer 809 being magnetized, so that, when said indicator pointer 809 comes to the same angular position as the indicator portion 821 fitted to the rotatable ring 818, i.e. comes to point at said indicator portion 821, then the magnetic influence of the tip of said indicator pointer 809 causes the reed switch 822 to go closed circuit, thereby sending a detection signal to the microcomputer 832.

In this manner, since in the above described eighth preferred embodiment of the present invention the rotatable ring 818 is provided as substantially freely rotatable around the outer circumference of the scale plate 808, with the indicator portion 821 being provided on said rotatable ring 818 so as to be opposable by the rotation of said rotatable ring 818 against and thus pointing at any one of the numerals written on said scale plate 808 for denoting film frame numbers, therefore the indication given by the indicator pointer 809 and also the indication given by the indicator portion 821 can be inspected at substantially the same time, whereby it is possible to check both the current film frame number and also at substantially the same time the total amount of frames available on the film for shooting, or indeed any desired limit frame number that the user of the camera may set; and thereby it is possible for the user of the camera easily and immediately to see how many frames for shooting are left on the film.

Further, since this construction is such that, together with providing an audible or visible warning, the release button 804 of the camera is also locked when it is detected that the indicator pointer 809 has reached the position of the indicator portion 821 as set by the rotation of the rotatable ring 818, thereby it is possible to prevent a greater number of frames of film being shot than a desired limit frame number that the user of the camera has set, by being able automatically to check for the number of frames of film shot reaching either the predetermined total number of film frames available on the film for shooting or alternatively said desired said limit frame number for shooting as set by the user of the camera.

Figure 74:
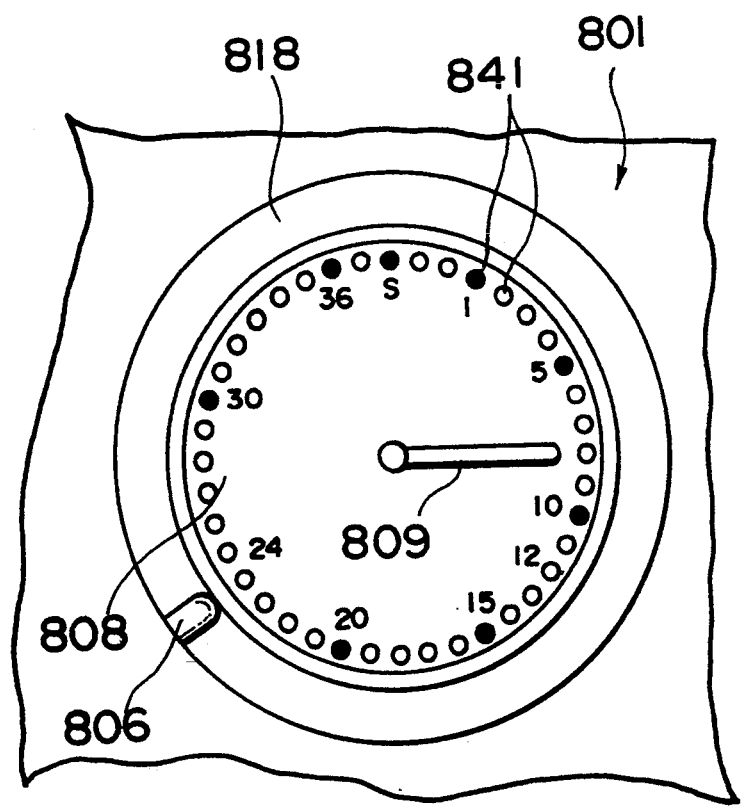
FIG. 74 is a plan view of a photographic frame counter indicator device incorporated in a variant of the eighth preferred embodiment.
Figure 75:
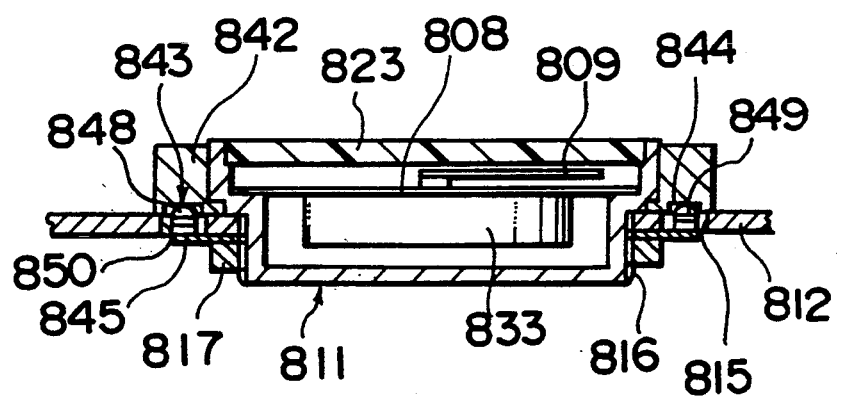
FIG. 75 is a sectional view of the photographic frame counter indicator device shown in FIG. 74.
Figure 76:
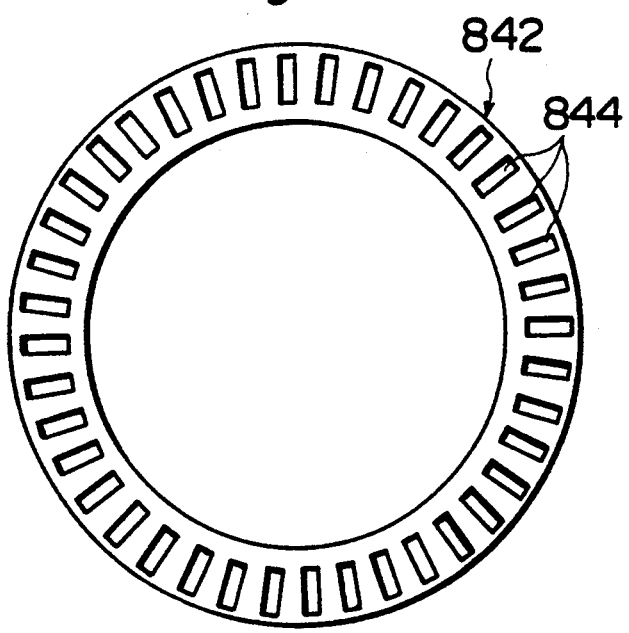
FIG. 76 is a rear view of a rotating ring incorporated in the photographic frame counter indicator device shown in FIGS. 74 and 75.
Figure 77:
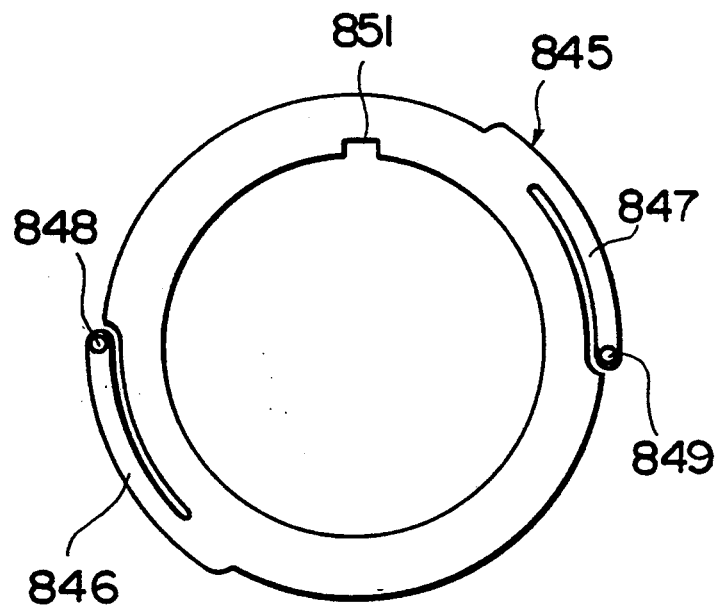
FIG. 77 is a plan view of a click member incorporated in the photographic frame counter indicator device shown in FIGS. 74 and 75.

FIG. 74 is a plan view of a frame number indicator device according to a variant of the eighth preferred embodiment of the present invention, and FIG. 75 is a sectional view of said frame number indicator device shown in FIG. 74. Further, FIG. 76 is a rear view of a rotating ring incorporated in the frame number indicator device shown in FIGS. 74 and 75, and FIG. 77 is a plan view of a click member also incorporated therein.

In this variant embodiment, as shown in FIG. 74, around the outer periphery of the front face of the scale plate 808 there are printed a series of round marks 841 at an angular pitch corresponding to the angular distance moved by the indicator pointer 809 when one frame of film is shot. On the rear surface of the rotatable ring 842, which corresponds to the rotatable ring 818 of the first variant of this eighth preferred embodiment described above, a number of concave grooves 844 are formed in rectangular shapes, as shown in FIG. 76. These concave grooves 844 are disposed in series all around the rotatable ring 842 at the same pitch as that of the round marks 841 shown in FIG. 74 inscribed on the front face of the scale plate 808. Further, as shown in FIG. 75, a click mechanism 843 is provided which clicks each time the rotatable ring 842 is rotated through a predetermined angle. This click member 845 of the click mechanism 843, as shown in plan view in FIG. 77, is formed in a ring shape, and on both sides of said click member 845 spring plate portions 846 and 847 are unitarily formed as integral extensions of said click member 845 in substantially the circumferential direction thereof. On the ends of the spring plate portions 846 and 847 projecting portions 848 and 849 are formed, and these projecting portions 848 and 849 project through hole shapes 850 provided to pierce through the cover 812, so as to press against the rear surface of the rotatable ring 842 and to engage into the concave grooves 844 formed thereon. Further, on the internal circumference of the click member 845 there is formed a concave keyway 851 which engages with a key not shown in the figure formed in the cover 812, and thereby the click member 845 is prevented from rotating. Thereby, each time the rotatable ring 842 is rotated through the predetermined angle corresponding to the angular distance moved by the indicator pointer 809 when one frame of film is shot, the projecting portions 848 and 849 at the ends of the spring plate portions 846 and 847 click into new ones of the concave grooves 844 formed on the rear surface of the rotatable ring 842, and thereby said rotatable ring 842 is positively positioned to one of a series of angular positions thereof which are spaced angularly apart at said pitch.

According to the indicator device of this construction, the same functions and effects are obtained as with the indicator device shown in FIGS. 71 and 72, with the additional benefit being available that, when the rotatable ring 842 is rotated, because the projecting portions 848 and 849 at the ends of the spring plate portions 846 and 847 provided to the click member 845 press against the rear surface of the rotatable ring 842 and positively engage with a detent action into the concave grooves 844 formed thereon, thereby it is positively ensured that the indicator portion 821 formed on the rotatable ring 842 always is in an appropriate angular position directly to oppose the round marks 841 inscribed on the scale plate 808.

Figure 78:
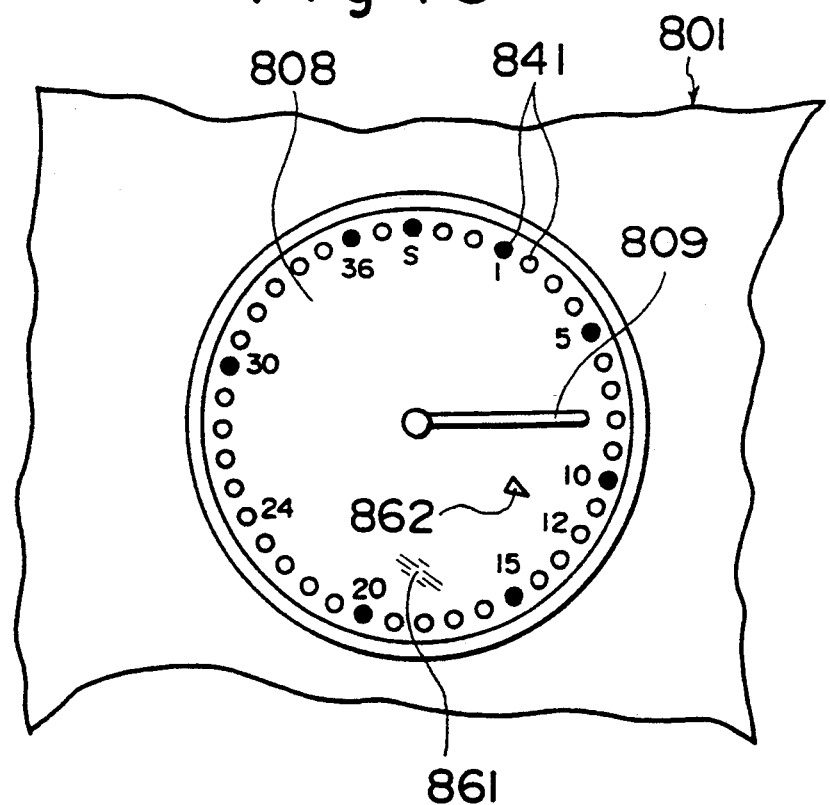
FIG. 78 is a plan view of a photographic frame counter indicator device incorporated in another variant of the eighth preferred embodiment.
Figure 79:
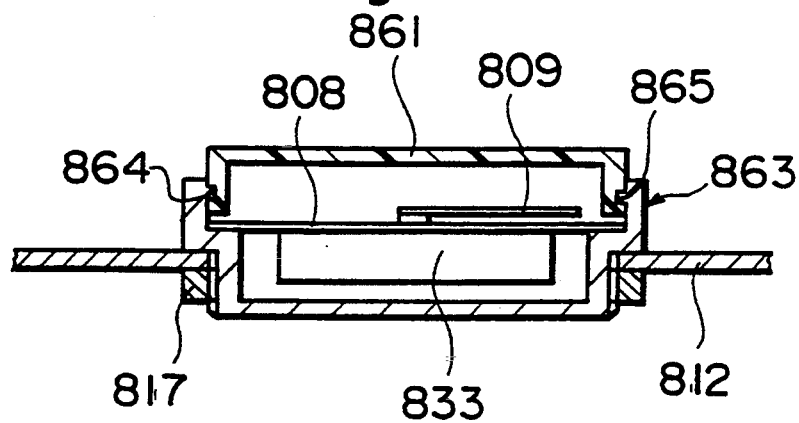
FIG. 79 is a sectional view of the photographic frame counter indicator device shown in FIG. 78.

FIG. 78 is a plan view of a frame number indicator device according to another variant of the eighth preferred embodiment of the present invention, and FIG. 79 is a sectional view of said frame number indicator device shown in FIG. 78.

In this second variant embodiment, a transparent cover 861 provided, freely rotatably mounted over the scale plate 808 and covering said scale plate 808, and an indicator portion 862 is formed on this transparent cover 861. By rotating said transparent cover 861, it is possible to bring said indicator portion 862 over any one of the legends on the scale plate 808, so that it indicates said legend. The scale plate 808 is housed, as shown in FIG. 79, in a tubular case 863, and the transparent cover 861, which may be made of glass or the like material, is provided over the front face of said scale plate 808. On the inside surface of the tubular case 863 there is formed a circumferentially extending ring shaped ridge 864, and this ring shaped ridge 864 is slidably engaged into a corresponding circumferentially extending ring shaped groove formed around the outer surface of the transparent cover 861, so as thereby to mount said transparent cover 861 to the tubular case 863 in a substantially freely rotatable manner.

In this second variant embodiment it is possible to provide the indicator portion 862 on the transparent cover 861 either by a combination of a process of inscription (molding or scribing or the like) and a process of printing or tinting performed subsequently, or as an alternative by only a process of inscription, or as another alternative by only a process of printing. Further, the indicator portion 862 may be provided either on the front or on the back of the transparent cover 861; either is acceptable.

According to the indicator device of this second variant construction, the same functions and effects are obtained as with the indicator device shown in FIGS. 71 and 72 and with the indicator device shown in FIGS. 74 and 75, with the additional benefit being available that, since the indicator portion 862 is provided on the transparent cover 861, it is even easier for the camera user to discern the legend indicated by said indicator portion 862.

It should be understood that, although in the above description of the eighth preferred embodiment of the present invention the means for moving the indicator pointer has been assumed by way of example to be a stepper motor, this should not be considered as limitative of the present invention, and other drive means for the indicator pointer could also be conceived of without departing from the principles of the present invention. For example, a servo motor and gear such as used on a per se conventional and well known type of camera might be employed as a drive means for driving the indicator pointer. The present invention has been shown and described in terms of several preferred embodiments thereof, but is not to be considered as limited by any of the perhaps quite fortuitous details of said embodiments or of the drawings, but only by the terms of the appended claims, which follow.

What is claimed is:

1. An indicator device for a camera comprising a drive means, for displaying information related to conditions for photography, comprising:
   (a) an indicator means comprising an indicator pointer and a scale plate, said indicator means displaying said information related to conditions for photography by the position of said indicating pointer which is rotationally driven against said scale plate by said drive means;
   (b) an operation member which when operated by a user of the camera puts the camera into the condition ready to shoot a photograph; and
   (c) a drive control means which:
      (c1) drives said indicator pointer so as to display said information related to conditions for photography, when by the operation of said operation member the camera is put into the condition ready to take a photograph; and
      (c2) drives said indicator pointer according to the passage of time when the camera is not put into the condition ready to take a photograph.

2. An indicator device for a camera according to claim 1, further comprising a count means for counting the number of frames of film shot, wherein said drive control means:
   (a) when by the operation of said operation member the camera is put into the condition ready to take a photograph, rotates said indicator pointer six degrees in the clockwise direction for each frame of film shot as counted by said count means; and
   (b) when the camera is not put into the condition ready to take a photograph, rotates said indicator pointer six degrees in the clockwise direction during the passage of each one of a conventional unit of time period measurement less than an hour.

3. An indicator device for a camera according to claim 2, wherein said drive control means moves said indicator pointer when displaying said information related to conditions for photography in a different manner from when displaying time.

4. An indicator device for a camera according to claim 1, further comprising a selection means for selecting bulb photographic mode, wherein said drive control means, even when by the operation of said operation member the camera is put into the condition ready to take a photograph, when bulb mode is selected by said selection means, rotates said indicator pointer six degrees in the clockwise direction during the passage of each one of a conventional unit of time period measurement less than an hour.

5. An indicator device for a camera according to claim 1, wherein said indicator means comprises a plurality of indicating pointers, and wherein, when the camera is not put into the condition ready to take a photograph, said plurality of indicating pointers display the time of day in cooperation with one another.

6. An indicator device for a camera according to claim 1, wherein said drive means is a stepper motor.

7. An indicator device for a camera comprising a drive means, for displaying information related to conditions for photography, comprising:
   (a) a plurality of indicator means, each comprising an indicator pointer and a scale plate, and each of said indicator means displaying information related to conditions for photography by the position of its said indicating pointer which is rotationally driven against its said scale plate by said drive means;
   (b) a first operation member for selection, from said plurality of indicator means, of a one thereof for which the value of the information which it displays related to conditions for photography should be changed;
   (c) a selection means which selects a one from said plurality of indicator means in a predetermined order, according to the operation of said first operation member;
   (d) a second operation member for changing the value of the information displayed by said indicator means selected by said selection means; and
   (e) a drive control means which, after it has moved the indicator pointer of said indicator means selected by said selection means in a manner different from when displaying said information related to conditions for photography, drives said indicator pointer according to the operation of said second operation member, when said second operation member is operated.

8. An indicator device for a camera according to claim 7, wherein said manner for moving said indicator pointer of said indicator means selected by said selection means different from when displaying said information related to conditions for photography is to position said indicator pointer to a position intermediate between a one index mark inscribed on said scale plate and another.

9. An indicator device for a camera according to claim 7, wherein said manner for moving said indicator pointer of said indicator means selected by said selection means different from when displaying said information related to conditions for photography is rotationally to move said indicator pointer repeatedly to and fro forwards and backwards from an index mark inscribed on said scale plate.

10. An indicator device for a camera according to claim 7, wherein said manner for moving said indicator pointer of said indicator means selected by said selection means different from when displaying said information related to conditions for photography is rotationally to move said indicator pointer steadily in an unchanging rotational direction.

11. An indicator device for a camera according to claim 7, wherein said drive means is a stepper motor.

12. An indicator device for a camera comprising a drive means, for displaying information related to conditions for photography, comprising:
   (a) a plurality of indicator means, each comprising an indicator pointer and a scale plate, and each of said indicator means displaying information related to conditions for photography by the position of its said indicating pointer which is rotationally driven against its said scale plate by said drive means;
   (b) a first operation member for selection, from said plurality of indicator means, of a one thereof for which the value of the information which it displays related to conditions for photography should be changed;

(c) a selection means which selects a one from said plurality of indicator means in a predetermined order, according to the operation of said first operation member;

(d) a second operation member for changing the value of the information displayed by said indicator means selected by said selection means; and (e) a drive control means which, after it has moved the indicator pointers of the indicator means other than said indicator means selected by said selection means in predetermined directions which do not depend upon the current contents of the parameters displayed on them, drives said indicator pointer according to the operation of said second operation member, when said second operation member is operated.

13. An indicator device for a camera according to claim 12, wherein said predetermined directions are towards the rotational center of the indicator pointer of said indicator means selected by said selection means.

14. An indicator device for a camera according to claim 12, wherein said predetermined directions are towards the tip of the indicator pointer of said indicator means selected by said selection means.

15. An indicator device for a camera according to claim 12, further comprising a storage means for storing values of the parameters displayed on said plurality of indicator means, wherein said drive control means, after completion of the changing by the operation of said second operation member of the value of the information displayed by said indicator means selected by said selection means, moves the indicator pointers of the indicator means other than said indicator means selected by said selection means to positions according to values of the parameters displayed thereon stored by said storage means.

16. An indicator device for a camera according to claim 12, wherein said plurality of indicator means consists of said first indicator means and other indicator means provided within the scale plate of said first indicator means; and the index marks of said other indicator means are disposed at locations not lying on the straight lines joining the rotational center of the indicator pointer of said first indicator means and the rotational centers of the indicator pointers of said other indicator means.

17. An indicator device for a camera according to claim 12, wherein said drive means is a stepper motor.

18. An indicator device for a camera, for displaying information related to conditions for photography, comprising:

(a) an indicator means., comprising an indicator pointer, a scale plate, and a stepper motor which rotationally drives said indicating pointer over said scale plate so as to display said information related to conditions for photography by the position of said indicating pointer against said scale plate;

(b) a battery electrical power source for providing activating electrical power for said stepper motor;

(c) a setting means which sets a rotational position for said stepper motor;

(d) a stepper motor control means which drive controls said stepper motor so as to rotationally position it to the rotational position set on said setting means; and (e) a storage means which stores the amount of operation of said stepper motor from a standard rotational position, said storage means not losing said amount of operation even if not supplied with electrical power from said battery electrical power source.

19. An indicator device for a camera according to claim 18, wherein said storage means comprises a nonvolatile storage means.

20. An indicator device for a camera according to claim 18, wherein said storage means comprises a volatile storage means, and further comprising an auxiliary electrical power source which supplies electrical power to said volatile storage means when the supply of electrical power to said storage means from said battery electrical power source is not available.

21. An indicator device for a camera according to claim 18, further comprising a storage control means which renews the amount of operation stored in said storage means, during the operation of manually changing the rotational position of said stepper motor.

22. An indicator device for a camera according to claim 18, further comprising an auxiliary storage means which stores the amount of operation of said stepper motor from the standard rotational position; and a storage control means which transmits the amount of operation stored in said auxiliary storage means during the operation of manually changing over said battery electrical power source.

23. An indicator device for a camera according to claim 18, further provided with a storage control means which, when a predetermined manual operation is performed, reads out the stored value from said storage means and sets the rotational position of said stepper motor based upon said read out stored value.

24. An indicator device for a camera according to claim 23, wherein said predetermined manual operation is the turning on of electrical power supplied from said battery electrical power source.

25. In a camera comprising a photographic data overprinting device which overprints according to a certain format data relating to date and time of taking a photograph onto a film loaded into said camera, an indicator device for said camera, for displaying information related to conditions for photography, comprising:

(a) a first display portion which digitally displays said photographic data in the same format; and:

(b) a second display portion, comprising a scale plate, an indicating pointer, and a means for rotationally driving said indicating pointer against said scale plate so as to display information related to conditions for photography other than said photographic data.

26. An indicator device for a camera according to claim 25, wherein said means for rotationally driving said indicating pointer is a stepper motor.

27. An indicator device for a camera, comprising:

(a) a drive means;

(b) a plate on which a plurality of characters representing film frame numbers are disposed in a serial manner;

(c) a first film frame number determination device which determines the number of frames of a film loaded into said camera that have been shot;

(d) a first indicator pointer, driven by said drive means, which points at a number on said plate corresponding to the number of frames shot as detected by said first film frame number determination device;

(e) a second film frame number determination device which determines the number of frames of said film which remain to be shot; and:

(f) a second indicator pointer, driven by said drive means, which points at a number on said plate corresponding to the number of film frames which remain to be shot as detected by said second film frame number determination device.

28. An indicator device for a camera according to claim 27, wherein said drive means for rotationally driving said first and second indicator pointers is a stepper motor.

29. An indicator device for a camera, for displaying information related to conditions for photography, comprising:

(a) a first scale plate, on which a first set of index marks is inscribed;

(b) a second scale plate arranged within said first scale plate, and on which a second set of index marks is inscribed;

(c) a first drive means and a second drive means;

(d) a first display means comprising a first indicating pointer which is rotationally driven over said first scale plate by said first drive means so as to display information related to conditions for photography by pointing at said first set of index marks inscribed on said first scale plate; and (e) a second display means comprising a second indicating pointer which is rotationally driven by said second drive means over said second scale plate so as to display information related to conditions for photography by pointing at said second set of index marks inscribed on said second scale plate;

(f) wherein each of said second set of index marks on said second scale plate does not lie on a straight line joining a rotational center of said first pointer and a rotational center of said second pointer, and wherein said second drive means drives said second pointer so that said second pointer does not stop in line with said straight line.

30. An indicator device for a camera, comprising:

(a) an electrical driving source;

(b) a plate on which a plurality of characters representing film frame numbers are disposed around a circular path;

(c) an indicator pointer driven by said electrical driving source to rotate about a rotational axis substantially passing through a center of said circular path, and which points at a number on said plate corresponding to a number of film frames shot; and (d) a manually rotatable transparent cover disposed over said plate, an indicator portion formed on said transparent cover and being apposable against any one of said set of numbers on said plate by manual rotation of said transparent cover relative to said plate.

31. An indicator device for a camera, comprising:

(a) a drive means;

(b) a plate on which a plurality of characters representing film frame numbers are disposed around a circular path;

(c) an indicator pointer driven by said drive means to rotate about a rotational axis substantially passing through a center of said circular path, and which points at a number on said plate corresponding to a number of film frames shot;

(d) a movable indicator member, which can be manually moved so as to indicate any one of a set of numbers on said plate;

(e) a determination means for determining whether said indicator pointer has attained the number on said plate indicated by said movable indicator member; and (f) a means for preventing photography when and after, as determined by said determination means, said indicator pointer has attained the number on said plate indicated by said movable indicator member.

32. An indicator device for a camera according to claim 31, wherein said drive means is a stepper motor.

33. An indicator device for a camera having a motor, said indicator device for displaying information related to conditions for photography and comprising:

(a) an indicator comprising an indicator pointer and a scale plate, said indicator displaying said information related to conditions for photography by the position of said indicator pointer which is rotationally driven against said scale plate by said motor;

(b) a main switch which when operated by a user of the camera places the camera into a condition ready to shoot a photograph; and (c) a controller adapted to:

(c2) drive said indicator pointer so as to display said information related to conditions for photography, when by the operation of said main switch the camera is put into the condition ready to take a photograph; and (c2) drive said indicator pointer according to the passage of time when the camera is not put into the condition ready to take a photograph.

34. An indicator device for a camera according to claim 33, further comprising a frame counter to count a number of frames of film shot, wherein said controller is further adapted to:

(a) when by the operation of said main switch the camera is placed into the condition ready to take a photograph, rotate said indicator pointer six degrees in a clockwise direction for each frame of film shot as counted by said frame counter; and (b) when the camera is not put into the condition ready to take a photograph, rotate said indicator pointer six degrees in the clockwise direction during the passage of each one of a conventional unit of time period measurement less than an hour.

35. An indicator device for a camera according to claim 34, wherein said controller moves said indicator pointer when displaying said information related to conditions for photography in a different manner from when displaying time.

36. An indicator device for a camera according to claim 33, further comprising a selector switch to select bulb photographic mode, wherein said controller, even when by the operation of said main switch the camera is placed into the condition ready to take a photograph, when bulb mode is selected by said selector switch, is adapted to rotate said indicator pointer six degrees in a clockwise direction during the passage of each one of a conventional unit of time period measurement less than an hour.

37. An indicator device for a camera according to claim 33, wherein said indicator comprises a plurality of indicator pointers, and wherein, when the camera is not put into the condition ready to take a photograph, said plurality of indicator pointers display the time of day in cooperation with one another.

38. An indicator device for a camera according to claim 33, wherein said motor is a stepper motor.

39. An indicator device for a camera having a motor, said indicator device for displaying information related to conditions for photography and comprising:
   (a) a plurality of indicators, each comprising an indicator pointer and a scale plate, and each of said indicators displaying information related to conditions for photography by the position of its said indicator pointer which is rotationally driven against its said scale plate by said motor;
   (b) a first switch for selection, from said plurality of indicators, of a one thereof for which the value of the information which it displays related to conditions for photography should be changed;
   (c) a first controller adapted to select a one from said plurality of indicators in a predetermined order, according to the operation of said first switch;
   (d) a second switch to change the value of the information displayed by said indicator selected by said first controller; and
   (e) a second controller adapted to drive said indicator pointer according to the operation of said second switch, when said second switch is operated, after said second controller has moved the indicator pointer of said indicator selected by said first controller in a manner different from when displaying said information related to conditions for photography.

40. An indicator device for a camera according to claim 39, wherein said manner for moving said indicator pointer of said indicator selected by said first controller different from when displaying said information related to conditions for photography is to position said indicator pointer to a position between a one index mark inscribed on said scale plate and another.

41. An indicator device for a camera according to claim 39, wherein said manner for moving said indicator pointer of said indicator selected by said first controller different from when displaying said information related to conditions for photography is rotationally to move said indicator pointer repeatedly to and fro forwards and backwards from an index mark inscribed on said scale plate.

42. An indicator device for a camera according to claim 39, wherein said manner for moving said indicator pointer of said indicator selected by said first controller different from when displaying said information related to conditions for photography is rotationally to move said indicator pointer steadily in an unchanging rotational direction.

43. An indicator device for a camera according to claim 39, wherein said motor is a stepper motor.

44. An indicator device for a camera having a motor, said indicator device for displaying information related to conditions for photography and comprising:
   (a) a plurality of indicators, each comprising an indicator pointer and a scale plate, and each of said indicators displaying information related to conditions for photography by the position of its said indicator pointer which is rotationally driven against its said scale plate by said motor;
   (b) a first switch for selection, from said plurality of indicators, of a one thereof for which the value of the information which it displays related to conditions for photography should be changed;
   (c) a first controller adapted to select a one from said plurality of indicators in a predetermined order, according to the operation of said first switch;
   (d) a second switch to change the value of the information displayed by said indicator selected by said first controller; and
   (e) a second controller adapted to drive said indicator pointer according to the operation of said second switch, when said second switch is operated, after said second controller has moved the indicator pointers of the indicators other than said indicator selected by said first controller in predetermined directions which do not depend upon the current contents of the parameters displayed on them.

45. An indicator device for a camera according to claim 44, wherein said predetermined directions are towards the rotational center of the indicator pointer of said indicator selected by said first controller.

46. An indicator device for a camera according to claim 44, wherein said predetermined directions are towards the tip of the indicator pointer of said indicator selected by said first controller.

47. An indicator device for a camera according to claim 44, further comprising a memory that stores values of the parameters displayed on said plurality of indicators, wherein said second controller, after completion of the changing by the operation of said second switch of the value of the information displayed by said indicator selected by said first controller, is adapted to move the indicator pointers of the indicator other than said indicator selected by said first controller to positions according to values of the parameters displayed thereon stored by said memory.

48. An indicator device for a camera according to claim 44, wherein said plurality of indicators includes said first indicator and other indicators provided within the scale plate of said first indicator; and the index marks of said other indicators are disposed at locations not lying on straight lines joining a rotational center of the indicator pointer of said first indicator and the rotational centers of the indicator pointers of said other indicators.

49. An indicator device for a camera according to claim 44, wherein said motor is a stepper motor.

50. An indicator device for a camera, for displaying information related to conditions for photography, comprising:
   (a) a first scale plate, on which a first set of index marks is inscribed;
   (b) a second scale plate arranged within said first scale plate, on which a second set of index marks is inscribed;
   (c) a first motor and a second motor;
   (d) a first indicator, comprising a first indicator pointer which is rotationally driven over said first scale plate by said first motor so as to display information related to conditions for photography by pointing at said first set of index marks inscribed on said first scale plate;
   (e) a second indicator, comprising a second indicator pointer which is rotationally driven by said second motor over said second scale plate so as to display information related to conditions for photography by pointing at said second set of index marks inscribed on said second scale plate; and:
   (f) wherein each of said second set of index marks on said second scale plate does not lie on a straight line joining a rotational center of said first pointer and a rotational center of said second pointer, and wherein said second motor drives said second pointer so that said second pointer does not stop in line with said straight line.

51. An indicator device for a camera, for displaying information related to conditions for photography, comprising:
    (a) an indicator, comprising an indicator pointer, a scale plate, and a stepper motor which rotationally drives said indicator pointer over said scale plate so as to display said information related to conditions for photography by the position of said indicator pointer against said scale plate;
    (b) a battery for providing activating electrical power for said stepper motor;
    (c) a setting switch which sets a rotational position for said stepper motor;
    (d) a stepper motor controller adapted to drive control said stepper motor so as to rotationally position said stepper motor to the rotational position set on said setting switch; and
    (e) a memory which stores the amount of operation of said stepper motor from a standard rotational position, said memory not losing said amount of operation even if not supplied with electrical power from said battery.

52. An indicator device for a camera according to claim 51, wherein said memory comprises a non-volatile memory.

53. An indicator device for a camera according to claim 51, wherein said memory comprises a volatile memory, and further comprising an auxiliary battery which supplies electrical power to said volatile memory when the supply of electrical power to said volatile memory from said battery is not available.

54. An indicator device for a camera according to claim 51, further comprising a controller adapted to renew the amount of operation stored in said memory during the operation of manually changing the rotational position of said stepper motor.

55. An indicator device for a camera according to claim 51, further comprising an auxiliary memory which stores the amount of operation of said stepper motor from the standard rotational position; and a controller adapted to transmit the amount of operation stored in said auxiliary memory during the operation of manually changing over said battery.

56. An indicator device for a camera according to claim 51, further comprising a controller adapted to read out the stored value from said memory and set the rotational position of said stepper motor based upon said read out stored value when a predetermined manual operation is performed.

57. An indicator device for a camera according to claim 56, wherein said predetermined manual operation is the turning on of electrical power supplied from said battery.

58. In a camera comprising a photographic data overprinting device, which overprints according to a certain format, data relating to date and time of taking a photograph onto a film loaded into said camera, an indicator device for said camera, for displaying information related to conditions for photography, comprising:
    (a) a first indicator which digitally displays said photographic data in the same format; and
    (b) a second indicator, comprising a scale plate, an indicator pointer, and a motor to rotationally drive said indicator pointer against said scale plate so as to display information related to conditions for photography other than said photographic data digitally displayed by said first indicator.

59. An indicator device for a camera according to claim 58, wherein said motor is a stepper motor.

60. An indicator device for a camera, comprising:
    (a) a motor;
    (b) a plate on which a plurality of characters representing film frame numbers are disposed in a serial manner;
    (c) a first detector which detects a number of frames of a film loaded into said camera that have been shot;
    (d) a first indicator pointer, driven by said motor, which points at a number on said plate corresponding to the number of frames shot as detected by said first detector;
    (e) a second detector which detects a number of frames of said film which remain to be shot; and
    (f) a second indicator pointer, driven by said motor, which points at a number on said plate corresponding to the number of film frames which remain to be shot as detected by said second detector.

61. An indicator device for a camera according to claim 60, wherein said motor is a stepper motor.

62. An indicator device for a camera, comprising:
    (a) a motor;
    (b) a plate on which a plurality of characters representing film frame numbers are disposed around a circular path;
    (c) an indicator pointer driven by said motor to rotate about a rotational axis substantially passing through a center of said circular path, and which points at a number on said plate corresponding to a number of film frames shot; and
    (d) a manually rotatable transparent cover, disposed over said plate, an indicator portion formed on said transparent cover being apposable against any one of said set of numbers on said plate by manual rotation of said transparent cover relative to said plate.

63. An indicator device for a camera, comprising:
    (a) a motor;
    (b) a plate on which a plurality of characters representing film frame numbers are disposed around a circular path;
    (c) an indicator pointer driven by said motor to rotate about a rotational axis substantially passing through a center of said circular path, and which points at a number on said plate corresponding to a number of film frames shot;
    (d) a manually rotatable transparent cover, disposed over said plate, an indicator portion formed on said transparent cover being apposable against any one of said set of numbers on said plate by the manual rotation of said transparent cover relative to said plate;
    (e) a detector which detects whether said indicator pointer has attained the number on said plate indicated by said manually rotatable transparent cover; and
    (f) a controller adapted to prevent photography when and after, as detected by said detector, said indicator pointer has attained the number on said plate indicated by said transparent cover.

64. An indicator device for a camera according to claim 63, wherein said motor is a stepper motor.

65. An indicator device for displaying information having a motor and comprising:
  (a) a plurality of indicators, each comprising an indicator pointer and a scale plate, each of said indicators displaying information by the position of its said indicator pointer which is rotationally driven against its said scale plate by said motor;
  (b) a first switch for selection, from said plurality of indicators, of a one thereof for which the value of the information which it displays should be changed;
  (c) a first controller adapted to select a one from said plurality of indicators in a predetermined order, according to the operation of said first switch;
  (d) a second switch to change the value of the information displayed by said indicator selected by said first controller; and
  (e) a second controller adapted to drive said indicator pointer according to the operation of said second switch, when said second switch is operated, after said second controller has moved the indicator pointer of said indicator selected by said first controller in a manner different from when displaying said information.

66. An indicator device for displaying information having a motor and comprising:
  (a) a plurality of indicators, each comprising an indicator pointer and a scale plate, and each of said indicators displaying information by the position of its said indicator pointer which is rotationally driven against its said scale plate by said motor;
  (b) a first switch for selection, from said plurality of indicators, of a one thereof for which the value of the information which it displays should be changed;
  (c) a first controller adapted to select a one from said plurality of indicators in a predetermined order, according to the operation of said first switch;
  (d) a second switch to change the value of the information displayed by said indicator selected by said first controller; and
  (e) a second controller adapted to drive said indicator pointer according to the operation of said second switch, when said second switch is operated, after said second controller has moved the indicator pointers of the indicators other than said indicator selected by said first controller in predetermined directions which do not depend upon the current contents of the parameters displayed on them.

67. An indicator device for displaying information, comprising:
  (a) a first scale plate, on which a first set of index marks is inscribed;
  (b) a second scale plate arranged within said first scale plate, on which a second set of index marks is inscribed;
  (c) a first motor and a second motor;
  (d) a first indicator, comprising a first indicator pointer which is rotationally driven over said first scale plate by said first motor so as to display information by pointing at said first set of index marks inscribed on said first scale plate;
  (e) a second indicator, comprising a second indicator pointer which is rotationally driven by said second motor over said second scale plate so as to display information by pointing at said second set of index marks inscribed on said second scale plate; and
  (f) wherein each of said second set of index marks on said second scale plate does not lie on a straight line joining a rotational center of said first pointer and a rotational center of said second pointer, and wherein said second motor drives said second pointer so that said second motor does not stop in line with said straight line.

68. An indicator device for displaying information, comprising:
  (a) an indicator having an indicator pointer, a scale plate, and a stepper motor which rotationally drives said indicator pointer over said scale plate so as to display said information by the position of said indicator pointer against said scale plate;
  (b) a battery for providing activating electrical power for said stepper motor;
  (c) a setting switch which sets a rotational position for said stepper motor;
  (d) a stepper motor controller adapted to drive control said stepper motor so as to rotationally position said stepper motor to the rotational position set on said setting switch; and
  (e) a memory which stores the amount of operation of said stepper motor from a standard rotational position, said memory not losing said amount of operation even if not supplied with electrical power from said battery.

* * * * *